United States Patent [19]

Imai et al.

[11] Patent Number: 5,555,512
[45] Date of Patent: Sep. 10, 1996

[54] PICTURE PROCESSING APPARATUS FOR PROCESSING INFRARED PICTURES OBTAINED WITH AN INFRARED RAY SENSOR AND APPLIED APPARATUS UTILIZING THE PICTURE PROCESSING APPARATUS

[75] Inventors: Takayuki Imai; Motohiko Naka, both of Kawasaki; Takehiko Shida, Yokohama; Masaaki Sato; Kunio Yoshida, both of Kawasaki; Ikuo Akamine, Kusatsu; Makoto Shimizu, Kyoto; Yoshiaki Uchida, Ootsu, all of Japan

[73] Assignee: Matsushita Electric Industrial Co., Ltd., Osaka, Japan

[21] Appl. No.: 273,168

[22] Filed: Jul. 25, 1994

[30] Foreign Application Priority Data

Aug. 19, 1993 [JP] Japan ..................................... 5-204998

[51] Int. Cl.$^6$ ...................................................... G01J 5/10
[52] U.S. Cl. ........................................... 364/550; 250/342
[58] Field of Search ........................... 250/342; 364/550; 382/103

[56] References Cited

U.S. PATENT DOCUMENTS

| | | | |
|---|---|---|---|
| 4,849,737 | 7/1989 | Kirihata et al. | 340/567 |
| 4,912,748 | 3/1990 | Horii et al. | 250/221 |
| 4,999,614 | 3/1991 | Ueda et al. | 340/588 |
| 5,027,413 | 6/1991 | Barnard | 382/103 |
| 5,055,685 | 10/1991 | Sugimoto et al. | 250/342 |
| 5,059,796 | 10/1991 | Nakamura | 250/330 |
| 5,133,605 | 7/1992 | Nakamura | 374/124 |
| 5,134,292 | 7/1992 | Segawa et al. | 250/342 |
| 5,153,560 | 10/1992 | Ichikawa | 340/522 |
| 5,446,285 | 8/1995 | Choi | 250/338.2 |

FOREIGN PATENT DOCUMENTS 21430476  6/1990  Japan.

OTHER PUBLICATIONS

"Waveform Data Processing for Scientific Measurement" published by CQ Inc.; Feb., 1986; pp., 90–102 (w/partial English translation).

"Image Analysis Handbook" published by Tokyo university Shuppankai; Jan. 17, 1991; pp. 689–691 (w/partial English translation).

*Primary Examiner*—Edward R. Cosimano
*Attorney, Agent, or Firm*—Lowe, Price, LeBlanc & Becker

[57] ABSTRACT

A picture processing apparatus is composed of an infrared ray sensor for producing an infrared picture in which a heat distribution of a measured area is recorded, a picture processing section for processing the infrared picture to extract pieces of personal characteristic data and environmental characteristic data from the infrared picture, and a picture information detecting section composed of a neural network for detecting pieces of personal information and environmental information according to the characteristic data. To be concrete, one or more human-areas respectively recording one or more persons are picked out from the infrared picture, and representative points of the human-areas, the number of human-areas, the number of pixels in each of the human-areas and shapes of the human-areas are extracted as the personal characteristic data. Also, the number of persons in each of the human-areas, foot positions of the persons, person's postures, skin temperatures of the persons and the volume of person's clothes are detected as the personal information according to the personal and environmental characteristic data.

27 Claims, 25 Drawing Sheets

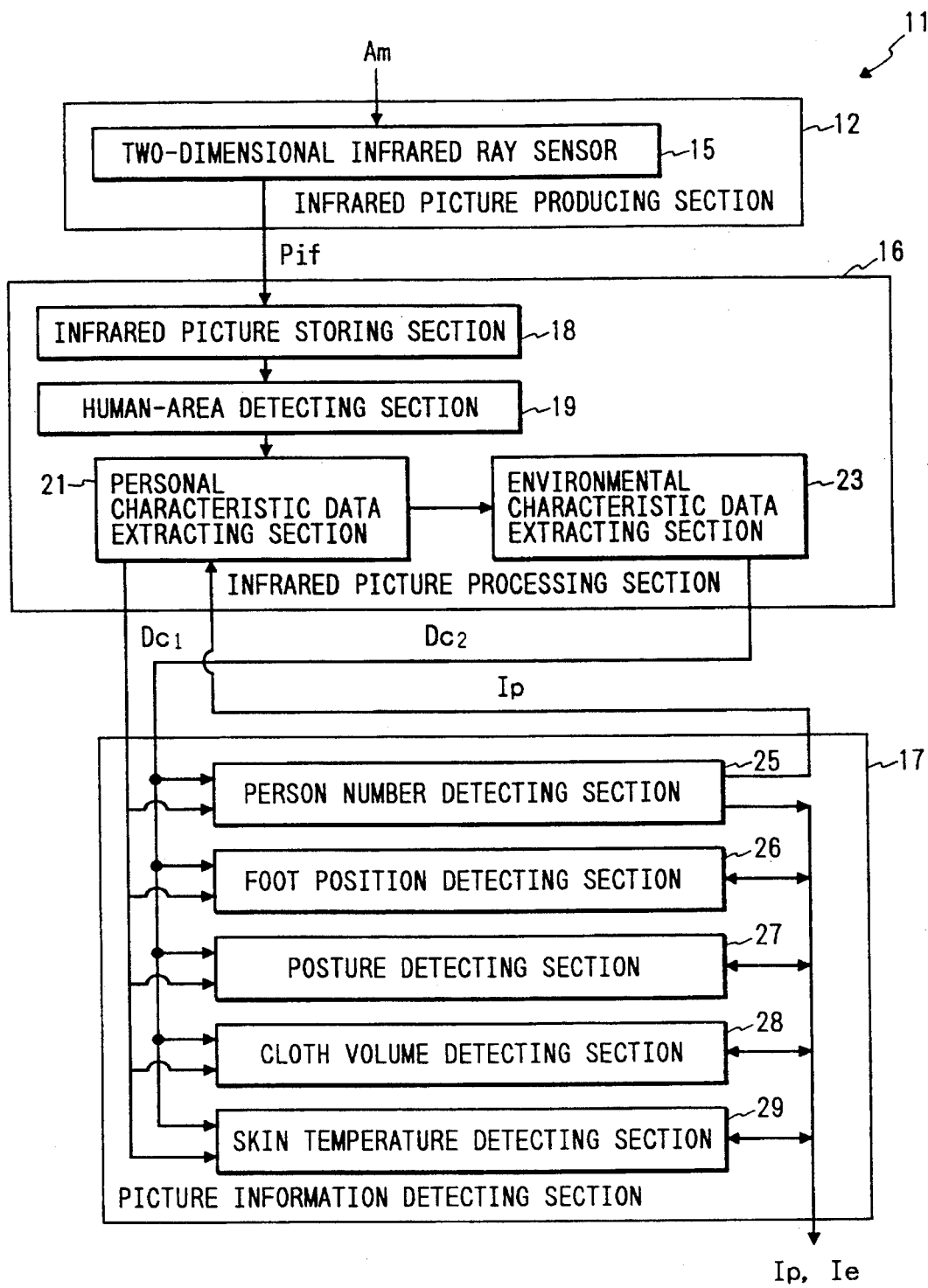

FIG. 15
FIG. 16(a)
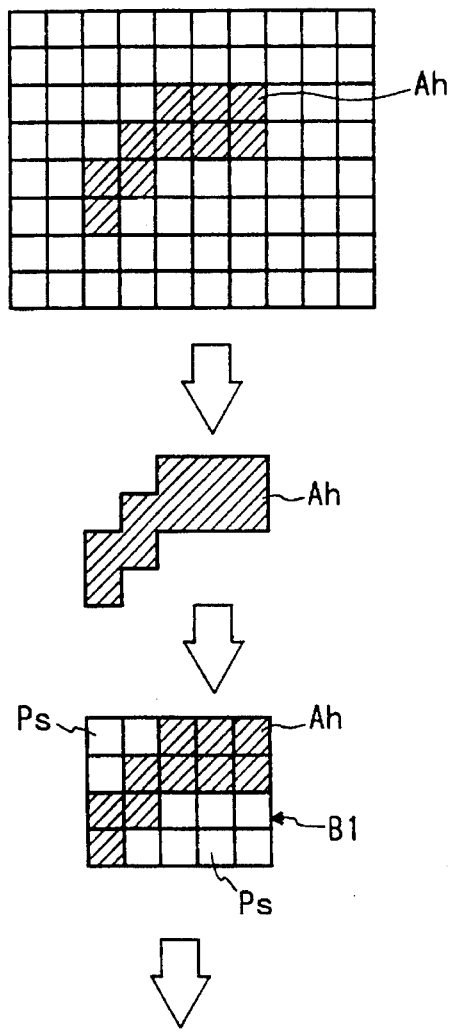
FIG. 16(b)
FIG. 16(c)
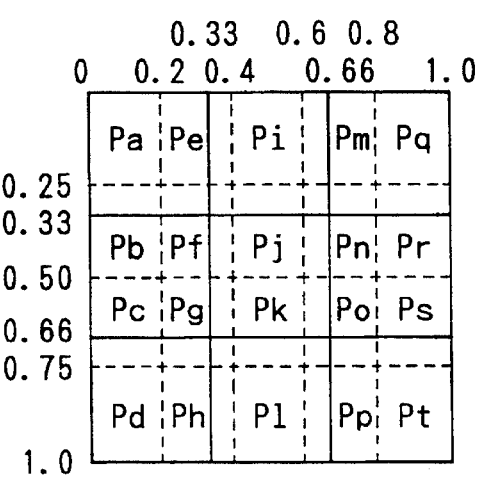

| $P_1$ | $P_1$ | $P_1$ |
|---|---|---|
| $P_1$ | $Ph$ | $P_1$ |
| $P_1$ | $P_1$ | $P_1$ |

| $P_2$ | $P_2$ | $P_2$ | $P_2$ | $P_2$ |
|---|---|---|---|---|
| $P_2$ |   |   |   | $P_2$ |
| $P_2$ |   | $Pi$ |   | $P_2$ |
| $P_2$ |   |   |   | $P_2$ |
| $P_2$ | $P_2$ | $P_2$ | $P_2$ | $P_2$ |

FREQUENCIES $S(x, y)$ OF REPRESENTATIVE POINTS

|  |  |  |  |  |  |  |  |  | 15 | 20 | 23 | 22 |
|---|---|---|---|---|---|---|---|---|---|---|---|---|
|  |  |  |  |  |  |  |  |  | 18 | 115 | 50 | 21 |
|  |  |  |  |  |  |  |  |  | 19 | 60 | 22 | 5 |
|  |  |  |  |  |  |  |  |  | 6 | 8 | 24 | 10 |

LIST OF STATIC BODIES

| THE NUMBERS OF THE STATIC BODIES | POSITIONS $(x, y)$ OF STATIC BODIES |
|---|---|
| NO. 1 | $(x_1, y_1)$ |
| NO. 2 | $(x_2, y_2)$ |
| NO. 3 | $(x_3, y_3)$ |
| ⋮ | ⋮ |

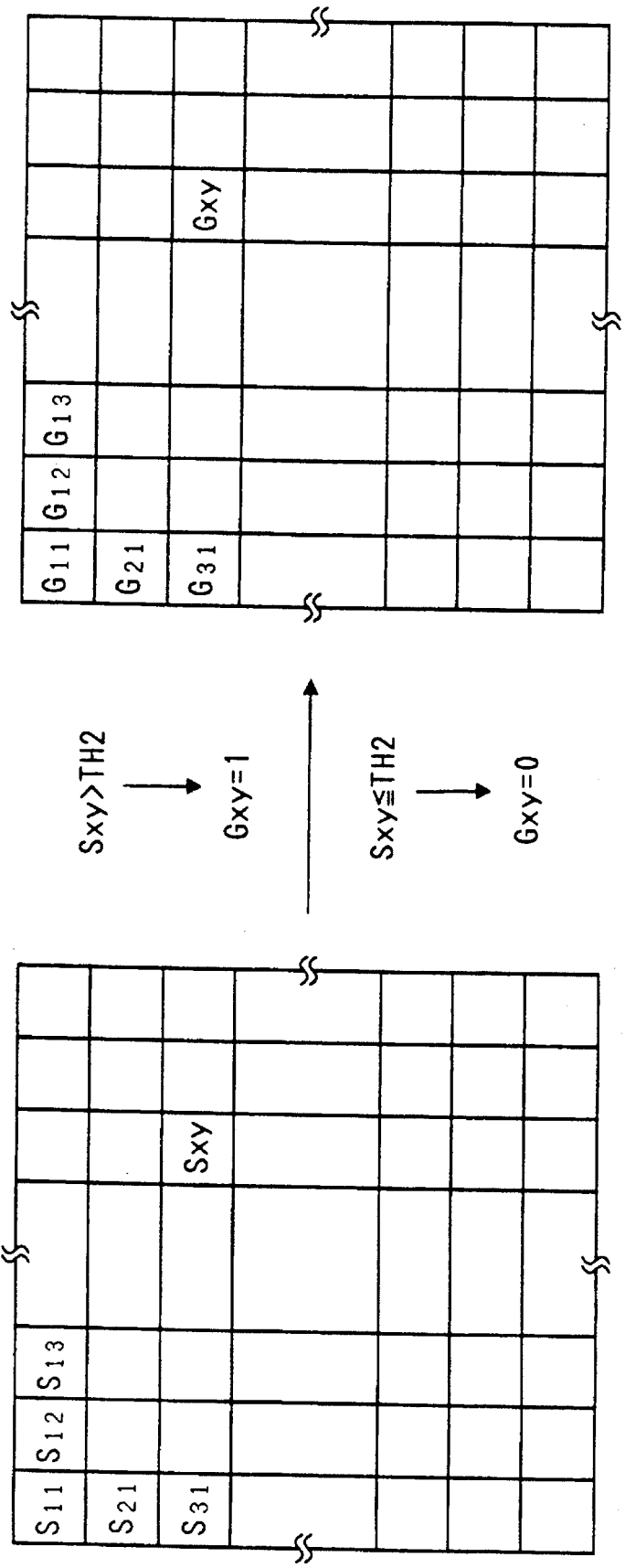

PICTURE PROCESSING APPARATUS FOR PROCESSING INFRARED PICTURES OBTAINED WITH AN INFRARED RAY SENSOR AND APPLIED APPARATUS UTILIZING THE PICTURE PROCESSING APPARATUS

BACKGROUND OF THE INVENTION

1. Field of the Invention

The present invention relates to a picture processing apparatus for processing infrared pictures obtained with an infrared ray sensor to detect pieces of information pertaining to a person and/or an environment. Also, the present invention relates to an applied apparatus utilizing the picture processing apparatus in various industrial fields pertaining to an air conditioning system, a monitoring system, a housing facility, a welfare apparatus, an intelligent building system, a traffic flow control apparatus, a nursing apparatus, a personal identification performing apparatus and the like.

2. Description of the Prior Art

A first technical field solved according to the present invention relates to a picture processing apparatus for processing infrared pictures obtained with an infrared ray sensor to detect pieces of information pertaining to a person and/or an environment. An air conditioning system for detecting pieces of information pertaining to personal positions with an infrared ray sensor has been utilized to control an air conditioner. For example, the air conditioning system has been proposed in Published Unexamined Patent Application No. 143047 of 1992 (H2-143047). In detail, a room is partitioned into a plurality of blocks, and an infrared ray sensor is installed in each of tile blocks to detect an infrared ray. Thereafter, whether or not a person stays in each of tile blocks is judged by detecting an output variation in each of the infrared ray sensors, and a wind direction and a room temperature are adjusted according to the judgement by controlling an air conditioner provided in the room. In this case, the judgement is performed by regarding the person as a moving heat-generating substance.

Also, a monitoring system is well-known as a system utilizing an infrared ray camera in which an infrared ray reflecting on a person is detected. Also, another monitoring system for processing visible pictures to detect pieces of information pertaining to a person is well-known. In this case, a monitoring camera for detecting visible light is installed in a detected area, and a person is monitored or recorded in a video recorder.

3. Problems to be solved by the Invention

However, the detection of a person according to the output variation in each of the infrared ray sensors installed in the partitioned blocks of the room utilizes that the person is regarded as a moving heat-generating substance. Therefore, in cases where a person is at a standstill because the person has a sleep, the detection of the person is difficult because a difference between a reference temperature set in each of the blocks and a measured block temperature becomes small. Also, it is hard to distinguish a person at a standstill from other heat-generating substances. In addition, because a moving heat-generating substance is merely detected in each of the blocks, it is impossible to specify the number of persons existing in each of the blocks even though the moving heat-generating substance is recognized as a person or persons. Accordingly, it is hard to detect states of persons pertaining to control characters of an air conditioning such as the number of persons, a volume of person's clothes, active degrees of persons, postures of persons and the like.

Also, because a sensor is adjusted in advance to measure an assumed fixed scene, a scene to be actually measured by the sensor differs from the assumed fixed scene in cases where the sensor is, for example, installed in the neighborhood of a wall. In this case, the wall is, for example, erroneously recognized as a floor. Therefore, when a wall temperature is suddenly increased because of a warm wind generated in an air conditioner, the warm wall is erroneously regarded as a person.

Next, a detecting method for detecting a person with an infrared ray sensor is well-known. However, not only a large number of detecting devices are required to obtain high resolution infrared pictures but also a cooling apparatus is generally required. Therefore, a complicated processing and a high cost is required to install a picture processing apparatus in which infrared pictures are processed at high resolution with an infrared ray sensor.

Also, a detecting method for detecting a person by processing visible pictures is well-known. However, the picture processing for detecting a person is difficult in cases where the intensity of illuminance is low or changed in point of time. Also, a detecting method for detecting a person by distinguishing a color of the person from other colors of environments is well-known. However, because colors of environments near to the color of a person exist in a room in which the person lives, it is difficult to adopt the color of the person as a distinguishing character.

Also, a detecting method for detecting a person by processing differential pictures is well-known. This detecting method is effective in cases where the person is moving. However, the detection of the person is difficult in cases where the person is at a standstill.

In conclusion, the problems in the prior art are as follows.
(1) The detection of a person is difficult.
(2) Personal information cannot be accurately detected.

The bottom of the first problem (1) is that a person cannot be separated from environments surrounding the person. In the prior art, the detection of a person is tried by utilizing characteristics of the person. In cases where detected objects other than a person are called environments, the states of the environments are usually multifarious, and a part of the states of the environments are near to the characteristics of the person. Therefore, the detection of the person becomes difficult. For example, in cases where a measured area in a picture processing apparatus in which visible pictures are processed is a general family room, the environments such as luminance and colors easily vary so that a person cannot be detected with a high accuracy. Also, in cases where picture signals are produced with an infrared ray sensor, distinguishing characteristics in the distinction between a person and environments are temperature and the variation of the temperature. In cases where heat-generating characteristics and/or warming characteristics of the environments are considered, even though a temperature of an environment near to a temperature of a person is detected, the judgement that the environment is not the person can be performed. Therefore, the detecting accuracy of the person can be enhanced.

The bottom of the second problem (2) is that it is difficult to relate pieces of sensed information obtained by processing pictures to desired information. A first reason of the difficulty is that the resolution and/or accuracy of the pictures and/or the sensed information are low, and a second reason of the difficulty results from an information processing. In detail, even though the pictures and/or the sensed information processed are obtained with high resolution and accuracy, in cases where the information processing for recognizing the pictures according to a pattern recognition and relating the sensed information to the desired information is inferior, an environment is erroneously detected as a person.

SUMMARY OF THE INVENTION

A first object of the present invention is to provide, with due consideration to the drawbacks of such a conventional picture processing apparatus, a picture processing apparatus which pieces of personal information pertaining to one or more persons in a measured area are detected with high resolution and accuracy by processing an infrared picture obtained with an infrared ray sensor.

A second object of the present invention is to provide various applied apparatuses such as a monitoring system, a personal identification performing apparatus, an integrated picture processing system and a traffic flow control apparatus in which the picture processing apparatus is utilized.

The first object is achieved by the provision of a picture processing apparatus, comprising:

infrared picture producing means for producing an infrared picture designating a heat distribution of a measured area in which one or more persons surrounded by environments stay, the infrared picture being composed of a plurality of pixels having temperatures of the measured area as pixel values;

infrared picture processing means for processing the infrared picture produced in the infrared picture producing means to extract pieces of personal characteristic data designating characters of the persons and pieces of environmental characteristic data designating characters of the environments from the infrared picture; and picture information detecting means for detecting pieces of personal information pertaining to the persons or pieces of environmental information pertaining to the environments according to the personal characteristic data and the environmental characteristic data processed in the infrared picture processing means.

In the above configuration, a heat distribution of a measured area is measured, and an infrared picture designating the heat distribution is produced in the infrared picture producing means. In the measured area, one or more persons surrounded by environments is staying. The infrared picture is composed of a plurality of pixels, and values of the pixels denote detected temperatures of the measured area. Thereafter, pieces of personal characteristic data and pieces of environmental characteristic data are extracted from the infrared picture in the infrared picture processing means by separating human-areas pertaining to the persons from the environments. The personal characteristic data designate characters of the persons, and the environmental characteristic data designate characters of the environments. Thereafter, pieces of personal information of the persons or pieces of environmental information of the environments are detected according to the personal characteristic data and the environmental characteristic data in the picture information detecting means.

Accordingly, because the personal characteristic data and the environmental characteristic data are separately extracted from the infrared picture in the infrared picture processing means, the personal information or the environmental information can be detected with high resolution and accuracy.

It is preferred that the infrared picture processing means comprise:

infrared picture storing means for storing the infrared picture produced in the infrared picture producing means;

human-area detecting means for detecting one or more human-areas and representative points of the human-areas from the infrared picture stored in the infrared picture storing means, temperatures of pixels in the human-areas being within a temperature range which depends on a temperature distribution of the measured area, and the persons being placed in the human-areas; and personal information extracting means for extracting the personal characteristic data from the infrared picture stored in the infrared picture storing means according to the human-areas, the representative points detected in the human-area detecting means and the environments.

In the above configuration, the infrared picture is stored in the infrared picture storing means, and one or more human-areas in which the persons are placed are picked out from the infrared picture in the human-area detecting means on condition that temperatures of pixels in the human-areas are within a temperature range depending on a temperature distribution of the measured area. Also, representative points of the human-areas are detected in the human-area detecting means. Thereafter, the personal characteristic data are extracted from the infrared picture according to the human-areas, the representative points anti the environments in the personal information extracting means.

Accordingly, because temperatures of pixels in the human-areas are within a temperature range depending on a temperature distribution of the measured area, the human-areas can be accurately picked out from the infrared picture even though a temperature at an environment surrounding a person differs from that at another environment surrounding another person according to the temperature distribution of the measured area.

It is preferred that the human-area detecting means comprise:

partitioned block representative temperature calculating means for partitioning the infrared picture into a plurality of picture blocks and calculating average temperatures of the picture blocks as representative temperatures of the picture blocks;

picking-out temperature determining means for determining a temperature range for each of the picture blocks according to each of the representative temperatures calculated in the partitioned block representative temperature calculating means, human-area picking out means for picking out one or more human-areas from each of the picture blocks on condition that temperatures of pixels in each of the picture blocks are within the temperature range determined in the picking-out temperature determining means; and representative point calculating means for calculating a representative point of each of the human-areas picked out in the human-area picking out means.

Supposing that temperature ranges of the human-areas are uniformly set to a fixed range on condition that a part of the measured area is warmed or clothes of a person is cooled, one or more human-areas cannot be accurately picked out from the infrared picture. To avoid the above problem in the present invention, the infrared picture are partitioned into a plurality of picture blocks, and a representative temperature of each of the picture blocks is determined in the partitioned block representative temperature calculating means. Thereafter, temperature ranges of the picture blocks are determined according to the representative temperatures in the picking-out temperature determining means. Thereafter, one or more human-areas are picked out from each of the picture blocks in the human-area picking out means on condition that temperatures of pixels in each of the picture blocks are within the temperature range.

Accordingly, even though a part of the measured area is warmed or clothes of a person is cooled, the human-areas can be accurately picked out.

Next, the second object is achieved by the provision of a monitoring system, comprising:

infrared picture producing means for producing an infrared picture designating a heat distribution of a measured area in which one or more persons surrounded by environments stay, the infrared picture being composed of a plurality of pixels having temperatures of the measured area as pixel values;

infrared picture processing means for processing the infrared picture produced in the infrared picture producing means to extract pieces of personal characteristic data designating characters of the persons and pieces of environmental characteristic data designating characters of the environments from the infrared picture;

picture information detecting means for detecting pieces of personal information pertaining to the persons or pieces of environmental information pertaining to the environments according to the personal characteristic data and the environmental characteristic data processed in the infrared picture processing means;

visible picture producing means for producing a visible picture of the measured area;

visible picture processing means for processing the visible picture produced in the visible picture producing means to extract pieces of visible personal characteristic data designating visible characters of the persons and pieces of visible environmental characteristic data designating visible characters of the environments from the visible picture;

visible picture information detecting means for detecting pieces of visible personal information pertaining to the persons according to the visible personal characteristic data and the visible environmental characteristic data processed in the visible picture processing means and the personal characteristic data and the environmental characteristic data processed in the infrared picture processing means and correcting the personal characteristic data and the environmental characteristic data extracted in the infrared picture processing means and the personal or environmental information detected in the picture information detecting means according to the visible personal information; and monitorred information detecting means for detecting an uninvited person intruded into the measured area according to the visible personal information detected in the visible picture information detecting mean.

In the above configuration, even though an uninvited person intruded into the measured area, the visible personal information pertaining to the uninvited person is detected in the visible picture information detecting means, and movements of the uninvited person are detected in the monitorred information detecting means.

Accordingly, the uninvited person intruded into the measured area can be reliably detected in the monitorred information detecting means.

Also, the second object is achieved by the provision of a personal identification performing apparatus comprises:

infrared picture producing means for producing an infrared picture designating a heat distribution of a measured area in which one or more persons surrounded by environments stay, the infrared picture being composed of a plurality of pixels having temperatures of the measured area as pixel values;

infrared picture processing means for processing the infrared picture produced in the infrared picture producing means to extract pieces of personal characteristic data designating characters of the persons and pieces of environmental characteristic data designating characters of the environments from the infrared picture;

picture information detecting means for detecting pieces of personal information pertaining to the persons or pieces of environmental information pertaining to the environments according to the personal characteristic data and the environmental characteristic data processed in the infrared picture processing means;

visible picture producing means for producing a visible picture of the measured area;

visible picture processing means for processing the visible picture produced in the visible picture producing means to extract pieces of visible personal characteristic data designating visible characters of the persons and pieces of visible environmental characteristic data designating visible characters of the environments from the visible picture;

visible picture information detecting means for detecting pieces of visible personal information pertaining to the persons according to the visible personal characteristic data and the visible environmental characteristic data processed in the visible picture processing means and the personal characteristic data and the environmental characteristic data processed in the infrared picture processing means and correcting the personal characteristic data and the environmental characteristic data extracted in the infrared picture processing means and the personal or environmental information detected in the picture information detecting means according to the visible personal information;

adaptation learning performing means for performing adaptation learning according to the personal information detected in the picture information detecting means and the visible personal information detected in the visible picture information detecting means; and personal identification performing means for recognizing the persons recorded on the visible picture according to the adaptation learning performed in the adaptation learning performing means and identifying the persons.

In the above configuration, in cases where a person staying in the measured area is detected in the visible picture producing means and the infrared picture producing means, pieces of personal information such as clothes colors and physical features of the person are detected in the picture information detecting means, and pieces of visible personal information such as a posture and a foot position of the person are detected in the visible picture information detecting means. Thereafter, adaptation learning for identifying the person is performed according to the clothes colors, the physical features, the posture and the foot position in the adaptation learning performing means. Therefore, pieces of character data pertaining to the person are produced and output to the personal identification performing means. In the performing means, a pattern recognition of the person recorded on a visible picture is performed according to the character data, and the person is identified.

Accordingly, because the personal identification of a person is performed according to the personal information such as clothes colors, physical features, a posture and a foot position of the person, the personal identification can be performed with high accuracy in the personal identification performing apparatus. Also, because the personal identification of a person is performed, the person can be reliably chased.

Also, the second object is achieved by the provision of an integrated picture processing system, comprises:

a plurality of picture processing apparatuses arranged in parallel, each of the apparatuses comprising:
  infrared picture producing means for producing an infrared picture designating a heat distribution of a measured area in which one or more persons surrounded by environments stay, the infrared picture being composed of a plurality of pixels having temperatures of the measured area as pixel values;
  infrared picture processing means for processing the infrared picture produced in the infrared picture producing means to extract pieces of personal characteristic data designating characters of the persons and pieces of environmental characteristic data designating characters of the environments from the infrared picture;
  picture information detecting means for detecting pieces of personal information pertaining to the persons or pieces of environmental information pertaining to the environments according to the personal characteristic data and the environmental characteristic data processed in the infrared picture processing means, and
  integration processing means for processing the personal information or the environmental information detected in the picture information detecting means of the picture processing apparatuses to integrate in points of time and space the personal information or the environmental information.

the above configuration, a plurality of infrared pictures are produced by observing different parts of the measuring area or observing the measuring area at different angles in the infrared picture producing means of the apparatuses, and the infrared pictures are processed in the picture processing means of the apparatuses. Thereafter, a piece of personal information and a piece of environmental information are detected in the picture information detecting means of each of the apparatuses. Thereafter, the personal information detected in the apparatuses are integrated in points of time and space into a piece of integrated personal information which corresponds to the entire measuring area or the entire observing angles. Also, the environmental information detected in the apparatuses are integrated in points of time and space into a piece of integrated environmental information which corresponds to the entire measuring area or the entire observing angles.

Accordingly, even though a plurality of persons overlapped at an observing angle is detected as a person in a picture processing apparatus, the number of persons can be accurately detected because the persons not overlapped at different observing angles are detected in the remaining picture processing apparatus. Also, even though a person move around the entire measuring area, the position of the person can be always detected because the person is necessarily detected in one of the picture processing apparatuses.

Also, the second object is achieved by the provision of a traffic flow control apparatus, comprises:
  infrared picture producing means for sequentially producing a plurality of infrared pictures respectively designating a heat distribution of a measured area in which one or more persons surrounded by environments stay, each of the infrared pictures being composed of a plurality of pixels having temperatures of the measured area as pixel values;
  infrared picture processing means for sequentially processing the infrared pictures produced in the infrared picture producing means to extract pieces of personal characteristic data designating characters of the persons and pieces of environmental characteristic data designating characters of the environments from the infrared pictures;
  picture information detecting means for detecting pieces of time series data respectively designating the number of persons according to the personal characteristic data and the environmental characteristic data processed in the infrared picture processing means;
  traffic flow classifying means for extracting pieces of character data pertaining to the variation of the number of persons recorded on the infrared pictures according to the time series data detected in the picture information detecting means and classifying a traffic flow of the persons as a traffic flow pattern;
  traffic flow predicting means for predicting the traffic flow of the persons according to the time series data detected in the picture information detecting means and the traffic flow pattern classified in the traffic flow classifying means; and
  traffic flow controlling means for controlling the traffic flow of the persons according to the traffic flow predicted in the traffic flow predicting means.

In the above configuration, the variation of the number of persons waiting for a transport means or an elevator in the measuring area is, for example, detected by processing a series of infrared pictures in the picture processing means, and pieces of time series data pertaining to the number of persons are produced in the picture information detecting means. Thereafter, pieces of character data pertaining to the variation of the number of persons are extracted according to the time series data in the traffic flow classifying means, and a traffic flow of the persons is classified as a traffic flow pattern in the traffic flow classifying means. Thereafter, the traffic flow of the persons in the measuring area is predicted according to the number of persons sequentially detected and the traffic flow pattern. The traffic flow pattern designates the variation of the number of persons in the measuring area in points of time. Thereafter, the traffic flow of the persons is controlled in the traffic flow controlling means according to the traffic flow predicted. For example, operations of a plurality of elevators are appropriately controlled to reduce the waiting time required for the persons.

Accordingly, the traffic flow of the persons staying in the measured area can be appropriately controlled by sequentially detecting the number of persons.

BRIEF DESCRIPTION OF THE DRAWINGS

The objects, features and advantages of the present invention will be apparent from the following description taken in conjunction with the accompanying drawings, in which:

FIG. 1 is a block diagram of a picture processing apparatus according to a first embodiment of the present invention;

FIG. 11 is a block diagram of a position judgement character detecting section shown in FIG. 7 and a foot position detecting section shown in FIG. 1;

FIG. 15 shows a procedure for forming a rectangular pixel-block B1 and a standardized 3×3 square pixel-block B2 from the infrared picture Pif;

FIGS. 16(a) to 16(c) show the operation performed in a block converting unit shown in FIG. 14;

FIG. 33 shows a procedure for writing pieces of processed data G(x,y) at coordinates (x,y) of a processed data accumulating unit shown in FIG. 31 according to frequencies S(x,y) written at coordinates (x,y) of a representative point accumulating unit shown in FIG. 31;

DESCRIPTION OF THE PREFERRED EMBODIMENTS

Figure 2A:
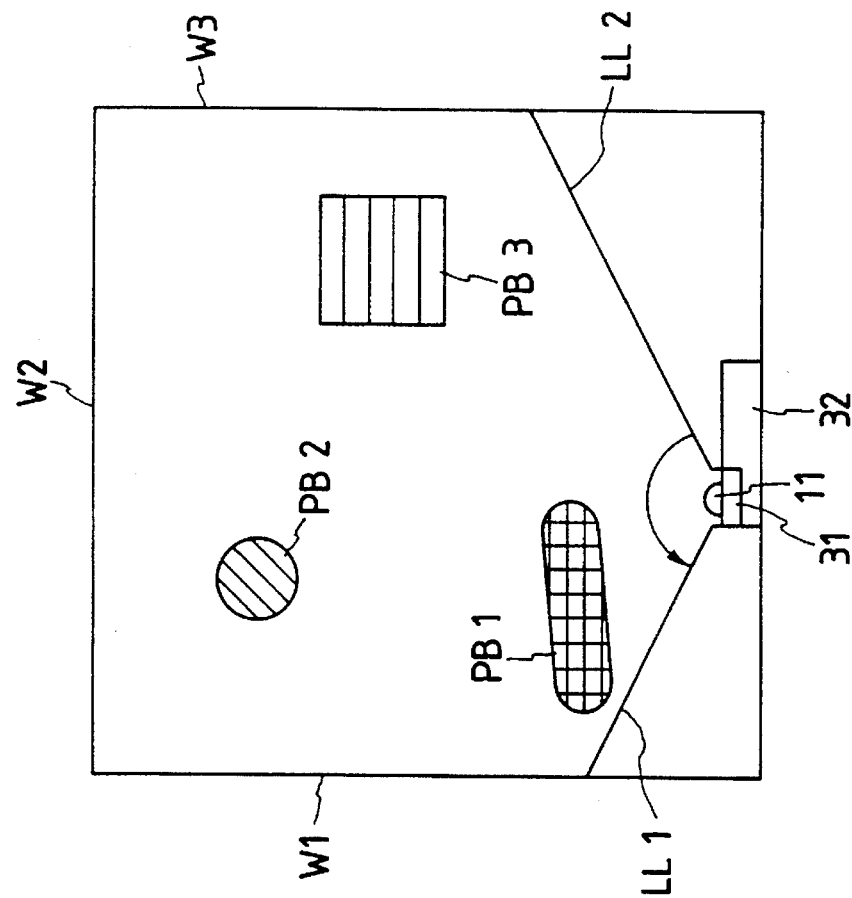
FIG. 2A shows a two-dimensional infrared picture Pif obtained in a sensing section shown in FIG. 1, the picture Pif being formed by scanning a room in which a standing person, a sitting person and a lying person stay.

Preferred embodiments of a picture processing apparatus according to the present invention are described with reference to drawings.

FIG. 1 is a block diagram of a picture processing apparatus according to a first embodiment of the present invention.

As shown in FIG. 1, a picture processing apparatus 11 comprises an infrared picture producing section 12 for producing an infrared picture Pif designating a heat distribution of a measured area Am by scanning the measured area Am with a two-dimensional infrared sensor 15, a picture processing section 16 for processing the infrared picture Pif to detect human-areas pertaining to one or more persons and environments surrounding the persons for the purpose of extracting pieces of personal characteristic data pertaining to the persons and pieces of environmental characteristic data pertaining to the environments, a picture information detecting section 17 composed of a plurality of neural net works for detecting the number of persons, positions of person's feet, postures of persons, a volume of clothes and skin temperatures of persons to produce pieces of personal information and pieces of environment information.

A fundamental flow of pieces of information shown in FIG. 1 is described. The measured area Am in which a person or a plurality of persons stay is scanned by the two-dimensional infrared ray sensor 15, and area temperatures of the measured area Am are detected as pieces of infrared picture information. That is, a heat distribution of the measure area Am is detected by the infrared ray sensor 15 and is recorded on an infrared picture Pif which is composed of a plurality of pixels having detected temperatures of the measured area Am as pixel values. The measured area Am is, for example, equivalent to a room. The infrared picture Pif designating the heat distribution is transferred to the picture processing section 16, and the infrared picture Pif are stored in an infrared picture storing section 18. Because the heat distribution of all of the measured area Am including human-areas is designated by the infrared picture Pif, the human-areas in which one or more persons stay are detected in a human-area detecting section 19 of the picture processing section 16, and pieces of personal characteristic data Dc1 pertaining to the persons of the human-areas detected in the section 19 are extracted from the infrared picture Pif in a personal characteristic data extracting section 21 and are transferred to the picture information detecting section 17. Also, pieces of environmental characteristic data Dc2 pertaining to environments surrounding the persons are extracted from the infrared picture Pif in an environmental characteristic data extracting section 23 and are transferred to the picture information detecting section 17. In the section 17, personal information signals Sp denoting pieces of personal information Ip represented by the number of persons, positions of person's feet, postures of persons, a volume of clothes and skin temperatures of persons are produced in a person number detecting section 25, a foot position detecting section 26, a posture detecting section 27, a cloth volume detecting section 28 and a skin temperature detecting section 29 and are output. Also, pieces of environmental information signals Se denoting pieces of environmental information Ie are produced according to the environmental characteristic data Dc2 and output.

In the above configuration of the picture processing apparatus 11, a monitoring apparatus having the picture processing apparatus 11 is described.

A pyroelectric type of one-dimensional infrared ray sensor having a plurality of detecting devices arranged in series in a longitudinal direction is installed in the two-dimensional infrared ray sensor 15 to repeatedly scan a room representing the measured area Am in parallel to a frontage of the room at fixed sampling intervals, and a two-dimensional infrared picture Pif in which a heat distribution pertaining to one or more persons in the room is included is obtained in the infrared picture producing section 12.

Figure 2B:
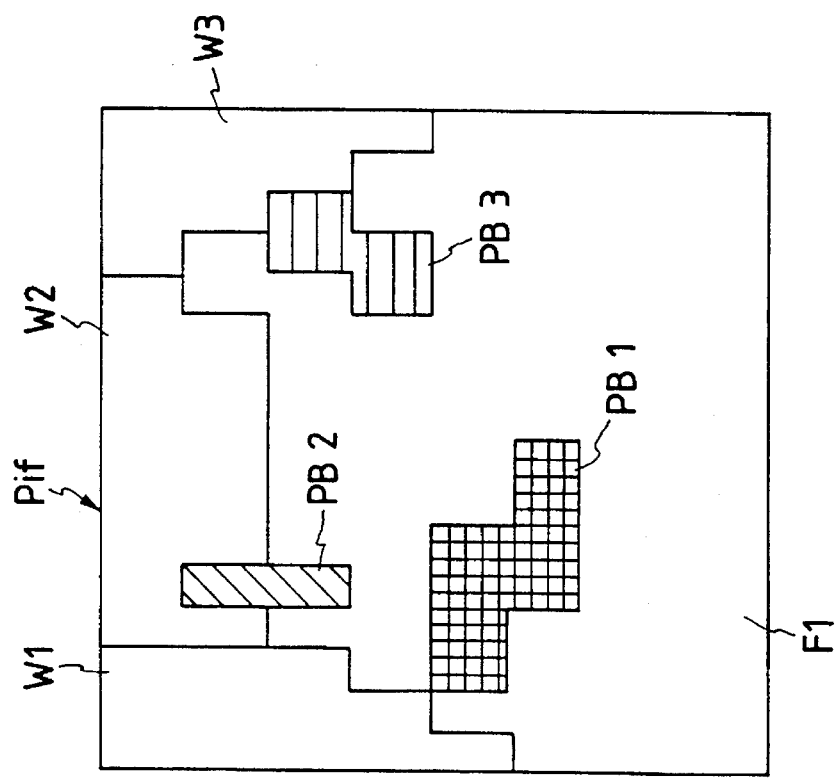
FIG. 2B shows a plan view of the room shown in FIG. 2A.

FIG. 2A shows the two-dimensional infrared picture Pif obtained in the infrared picture producing section 12, and FIG. 2B shows a plan view of the room in which a standing person, a sitting person and a lying person stay.

As shown in FIG. 2A, three persons stay in a square-shaped room, a picture block PB1 designates a first person lying on a floor F1, a picture block PB2 designates a second person standing at a corner between a left wall W1 and a back wall W2, and a picture block PB3 designates a third person sitting at a side of a right wall W3. In cases where the room is observed from its upper side, the three persons stay on the floor F1 as shown in FIG. 2B. In this case, a monitoring apparatus 31 having the picture processing apparatus 11 is installed in an air conditioner 32 at a front side of the room, and a detecting range of the monitoring apparatus 31 is indicated by a left limiting line LL1 and a right limiting line LL2. the scanning direction of the sensor 11 is directed from the right limiting line LL2 to the left limiting line LL1 to scan the room in the frontage direction. Therefore, a person staying far from the sensor 11 is placed at an upper portion of the infrared picture Pif, and a person staying near to the sensor 11 is placed at a lower portion of the infrared picture Pif. Also, temperature distributions of major parts of the walls W1, W2, W3 and a major part of the floor F1 are reproduced in the infrared picture Pif.

Next, an operation in the picture processing section of the apparatus 11 is described in detail.

The infrared picture Pif produced in the infrared picture producing section 12 is temporarily stored in the infrared picture storing section 18. Thereafter, one or more human-areas in the infrared picture Pif are detected in the human-area detecting section 19. In cases where one or more human-areas in the infrared picture Pif are detected in a conventional human-area detecting section (not shown), when a room temperature is equal to or less than 25° C. on condition that any heat-generating body other than persons does not exist in a room representing the measured area, one or more pixels in which the temperatures range from 26° C. to 34° C. are regarded as the human-areas. However, there is a possibility that the human-areas cannot be accurately picked out from the two-dimensional infrared picture Pif. For example, there is a possibility that the floor or wall temperature varies over the entire floor or wall. Therefore, a part of the floor or wall is erroneously picked out as a human-area because the temperature of the part of the floor or wall range from 26° C. to 34° C. Also, there is another conventional human-area detecting section (not shown) in which one or more human-areas are picked out by determining boundary lines of persons without detecting the temperatures of the room and persons. However, the boundary lines of persons cannot be accurately determined so that one or more human-areas cannot be accurately picked out.

In the first embodiment, the infrared picture Pif stored in the infrared picture storing section 18 is partitioned into M (M is a positive integer) blocks, and a temperature range of a human-area picked out from the infrared picture Pif is determined in each of the blocks. The temperature range depends on a room temperature distribution obtained in each of the blocks so that one or more human-areas can be reliably picked out from the infrared picture Pif to detect one or more persons. Because heat-generating bodies such as a human being, an animal and other living things can be easily detect with an infrared ray sensor, the detection of the persons with the infrared ray sensor 15 in this embodiment is effective.

Also, there is another method for picking out one or more human-areas from the infrared picture Pif. In cases where one or more persons regarded as heat-generating bodies are detected, a heat distribution of pixels equivalent to the infrared picture Pif has a concave portion designating a human-area when the temperature of the human-area is lower than that of the environment surrounding the human-area, and another infrared distribution of pixels equivalent to the infrared picture Pif has a convex portion designating a human-area when the temperature of the human-area is higher than that of the environment surrounding the human-area. Also, in cases where temperatures of pixels adjacent to each other are represented by G(n), G(n+1), a difference D(n) is defined:

$$D(n)=(G(n)-G(n+1))/2.$$

Therefore, in cases where an absolute difference value |D(n)| of the difference D(n) is higher than an appropriate threshold TH, a boundary between the pixels having the temperatures G(n), G(n+1) is regarded as a boundary line between a human-area and the environments, and inside and outside temperatures bounded by the boundary line are regarded as a reference temperature of the human-area and another reference temperature of the environments. Thereafter, one or more human-areas are picked out from the infrared picture Pif according to the reference temperatures.

Also, there is another picking-out method for picking out one or more human-areas from the infrared picture Pif. In cases where there are a large number of noises in the infrared picture Pif, it is difficult to find out the convex or concave portion designating a human-area in the infrared picture Pif. Therefore, the convex or concave portion is found out while deleting the noises according to a polynomial smoothing method which belongs to a method of moving averages well-known in a picture processing field. Thereafter, the temperatures around the convex or concave portion are regarded as a reference temperature of the human-area and another reference temperature of the environments. Thereafter, one or more human-areas are picked out from the infrared picture Pif according to the reference temperatures. The picking-out method has been proposed in "Waveform Data Processing for Scientific Mesurement" published by C.Q Inc..

Also, there is another picking-out method for picking out one or more human-areas from the infrared picture Pif. Pixels having similar temperatures are connected in a group. Thereafter, the infrared picture Pif are partitioned into many areas which each has a group of pixels according to a simplified area expanding method or a repetitive type of area expanding method which belongs to an area-partitioning method proposed in "Image Analysis Handbook" published by Tokyo university Shuppankai. Thereafter, each of areas are picked out from the infrared picture Pif, and one or more areas are regarded as one or more human-areas on condition that sizes of the areas are similar to a person's size and pixels of each of the areas have temperatures similar to a person's temperature.

Figure 3:
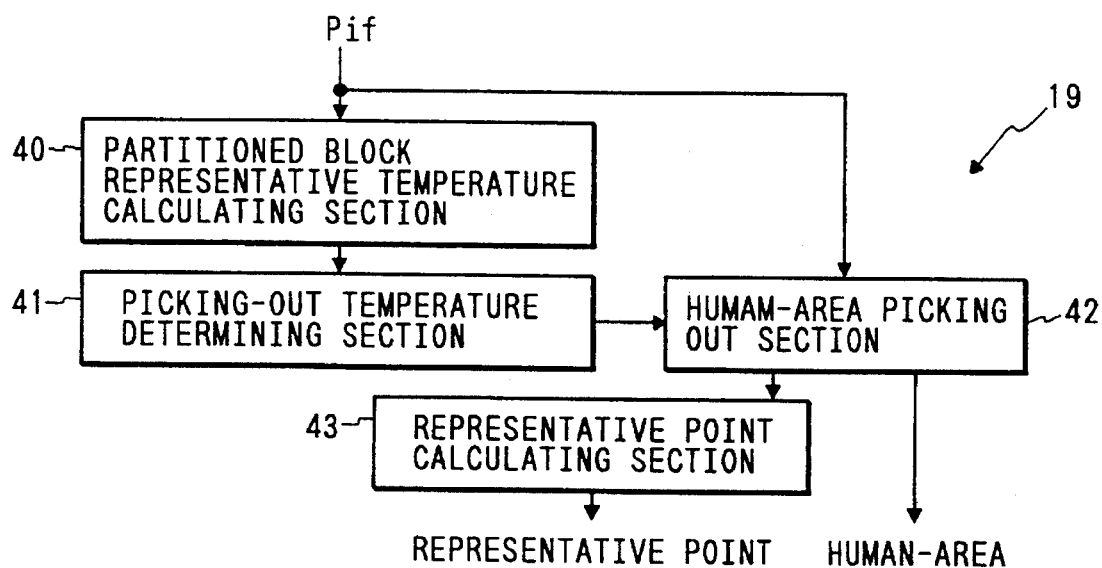
FIG. 3 is a block diagram of a human-area detecting section shown in FIG. 1.

In the first embodiment, one or more human-areas are detected in the human-area detecting section 19 shown in FIG. 3.

FIG. 3 is a block diagram of a human-area detecting section shown in FIG. 1;

As shown in FIG. 3, the human-area detecting section 19 comprises a partitioned block representative temperature calculating section 40 for partitioning the infrared picture Pif into M picture blocks and calculating an average temperature of each of the picture blocks as a representative temperature of each of the picture blocks, a picking-out temperature determining section 41 for determining a temperature range of one or more human-areas in each of the picture blocks according to each of the representative temperatures to pick out the human-areas, a human-area picking out section 42 for picking out one or more areas from each of the picture blocks as one or more human-areas according to the temperature range determined in the determining section 41, and a representative point calculating section 43 for calculating a representative point of each of the human-areas picked out in the section 42.

In the above configuration, the infrared picture Pif stored in the infrared picture storing section 18 is partitioned into M picture blocks in the partitioned block representative temperature calculating section 40, and average temperatures of the picture blocks are calculated. Each of the average temperatures is regarded as a representative temperature of each of the picture blocks and is transferred to the picking-out temperature determining section 41. Thereafter, a temperature range of a human-area is determined according to the representative temperatures for each of the picture blocks to pick out one or more human-areas from the infrared picture Pif while considering temperatures of environments surrounding each of the human-areas. Therefore, the temperature range varies in dependence on the temperatures of the environments surrounding the human-area. The reason that the infrared picture Pif is partitioned into M picture blocks is described. In cases where the temperature ranges of the human-areas are uniformly set to a fixed range on condition that a wall is partially warmed or clothes of a person is cooled, one or more human-areas cannot be accurately picked out from the infrared picture Pif. Therefore, the infrared picture Pif are partitioned into M picture blocks, a representative temperature is determined for each of the picture blocks, and a temperature range of a human-area is determined according to the representative temperatures for each of the picture blocks.

Thereafter, the temperature ranges determined for the picture blocks in the determining section 41 and the infrared picture Pif are transferred to the human-area detecting section 42, and one or more human-areas respectively composed of a group of pixels of which pixel temperatures range within temperature range determined for a corresponding picture block are picked out from the infrared picture Pif. Thereafter, the human-areas picked out from the infrared picture Pif are transferred to the representative point calculating section 43. In the section 43, a representative point of each of the human-areas is calculated. The representative point representing a human-area is, for example, placed in a center-of-gravity pixel of the human-area determined by weighting pixels composing the human-area with temperatures of the pixels. Or, the representative point representing a human-area is, for example, placed in a lowest pixel of the human-area which corresponds to a point of person's feet.

Or, the representative point representing a human-area is, for example, placed in a pixel of the human-area nearest to a floor or a pixel farthest from the floor to reduce the amount of calculation required to calculate the representative points of the human-areas. Or, the representative point representing a human-area is, for example, placed in a pixel which exists in a lowest position of a longitudinal pixel-row including a central pixel of the human-area. Therefore, positions of one or more persons staying in the measured area Am can be roughly determined, and the number of persons can be roughly determined.

Figure 4:
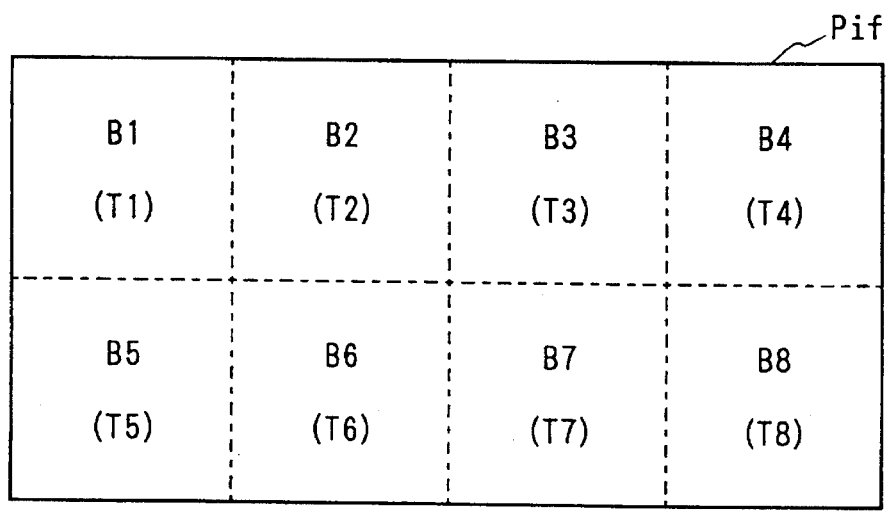
FIG. 4 shows the infrared picture Pif partitioned into eight (M=8) blocks as an example.

FIG. 4 shows the infrared picture Pif partitioned into eight (M=8) picture blocks as an example.

As shown in FIG. 4, in cases where the infrared picture Pif is partitioned into eight (M=8) picture blocks Bn (n+1,2,- - - 8), average temperatures Tn of the picture blocks regarded as representative temperatures are calculated in the representative temperature calculating section 40. Thereafter, temperature ranges are determined according to the average temperatures Tn in the picking-out temperature determining section 41. For example, in cases where the average temperature $T_N$ of the picture block $B_N$ is calculated in a range:

$$20° C.<T_N<22° C.,$$

the temperature range of one or more human-areas in the picture block $B_N$ ranges from 25° C. to 34° C. which is lower than a temperature range of an exposed human skin temperature ranging from 36° C. to 37° C. The reason that the temperature range of the human-areas is lower than that of the exposed human skin temperature is as follows. There is a possibility that clothes of a person, an environment surrounding the person and a skin of the person are recorded in the same pixel $P_o$ of the infrared picture Pif. In this case, the temperatures of the clothes, the environment and the skin are averaged to a mixed temperature of the pixel $P_o$ which is lower than a skin temperature of the person, and the mixed temperature of the pixel $P_o$ varies in dependence on a resolution degree of the infrared picture Pif. Therefore, the temperature range of the human-areas lower than the temperature range of the exposed human skin temperature is adopted to pick out the pixel $P_o$ as a part of a human-area, and the temperature range of the human-areas varies in dependence on a resolution degree of the infrared picture Pif. Also, in cases where the average temperature $T_N$ of the picture block $B_N$ is equal to or higher than 22° C., the temperature range of the human-areas in the picture block $B_N$ shifts to a higher temperature. In cases where the average temperature $T_N$ of the picture block $B_N$ is equal to or lower than 20° C., the temperature range of the human-areas in the picture block $B_N$ shifts to a lower temperature. Accordingly, the temperature range of the human-areas in the picture block $B_N$ depends on the average temperature in the picture block $B_N$ and a position of the picture block $B_N$ in the infrared picture Pif.

In the above configuration of the human-area detecting section 19, a temperature range of pixels in which persons are recorded is required to be set for each of the detecting devices of the infrared ray sensor 15 for the purpose of accurately picking out the human-areas from the infrared picture Pif. Therefore, in cases where there are a large number of detecting devices, it is difficult to set a temperature range to each of the detecting devices when the infrared ray sensor 15 is manufactured. Also, even though the infrared ray sensor 15 having the detecting devices respectively set a temperature range is manufactured, there is a problem that a body ranging within the same temperature range as that of a person, for example a television set or a heater, is erroneously judged as a person. To solve the above problem, a modification of the first embodiment is described with reference to FIG. 5.

Figure 5:
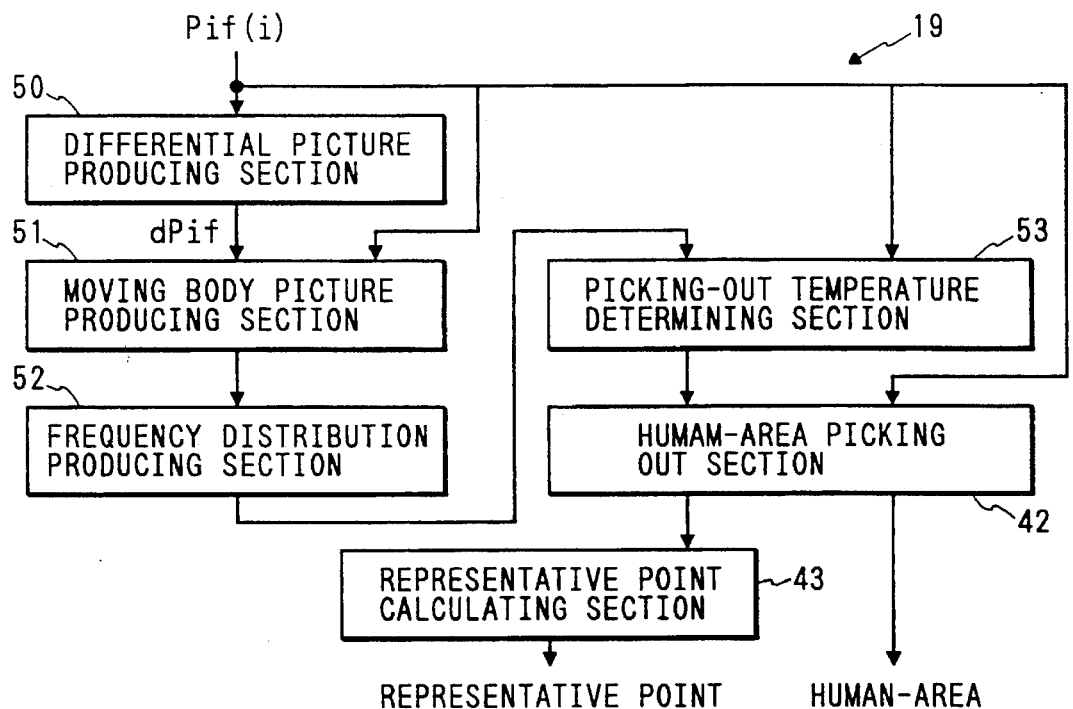
FIG. 5 is a block diagram of the human-area detecting section according to a modification of the first embodiment.

FIG. 5 is a block diagram of the human-area detecting section 19 according to a modification of the first embodiment.

As shown in FIG. 5, the human-area detecting section 19 comprises a differential picture producing section 50 for producing a differential picture dPif defined as a difference between a pair of infrared pictures Pif(t1), Pif(t2) (t1 and t2 respectively denote an elapsed time, t1<t2) transferred from the infrared picture storing section 18 in series, a moving body picture producing section 51 for producing a moving body picture Pm according to differential temperatures of differential pixels in the differential picture dPif and a plurality of infrared pictures Pif transferred from the infrared picture storing section 18 in series, a frequency distribution producing section 52 for producing a frequency distribution in temperature by distributing the frequency of temperatures in each of pixels of the moving body picture Pm in a pixel-plane for a prescribed period, a picking-out temperature determining section 53 for determining a temperature range of one or more human-areas according to a predetermined threshold and the frequency distribution produced in the frequency distribution producing section 52 to pick out the human-areas, the human-area picking out section 42, and the representative point calculating section 43.

In the above configuration, a plurality of infrared pictures Pif(ti) (i=1,2, - - - ) are stored in the infrared picture storing section 18 in series while time passes for a prescribed period. In the differential picture producing section 50, a differential picture dPif between a pair of infrared pictures Pif(t1), Pif(t2) transferred from the infrared picture storing section 18 in series is produced. In the moving body picture producing section 51, a moving body picture Pm is produced according to differential temperatures of differential pixels of the differential picture dPif and a plurality of infrared pictures Pif transferred from the infrared picture storing section 18. That is, absolute values of the differential temperatures at particular differential pixels pertaining to a moving body is comparatively large. Therefore, the moving body picture Pm is produced by setting person's temperatures to the particular differential pixels of the differential picture dPif while setting higher or lower temperatures than the person's temperatures to other pixels of the differential picture dPif. In the frequency distribution producing section 52, a frequency distribution of temperature in each of the pixels corresponding to the moving body is produced. In the picking-out temperature determining section 53, a temperature range of one or more human-areas according to a predetermined threshold and the frequency distribution produced in the producing section 52 to pick out the human-areas.

Next, a procedure for picking out the human-areas is described in detail with reference to FIG. 5.

A series of temperature distributions of a room representing the measured area Am is produced with the infrared ray sensor 15 and is transferred to the infrared picture storing sections 18 as a series of infrared pictures Pif(ti). Each of the infrared pictures Pif(ti) is expressed by a plurality of pixels P(x,y) placed at coordinates (x,y). Thereafter, a pair of infrared pictures Pif(t1), Pif(t2) are transferred to the differential picture producing section 50 to produce a differential picture dPif between the infrared pictures Pif(t1), Pif(t2). In detail, a temperature of the pixel P(x,y) in the infrared picture Pif(t1) is represented by T1(x,y), and a temperature of the pixel P(x,y) in the infrared picture Pif(t2) is represented by T2(x,y). In addition, a threshold h is utilized to delete noise components included in the infrared pictures Pif(t1), Pif(t2), and a temperature TN of the pixel P(x,y) in the infrared pictures Pif(t1), Pif(t2) is defined as a value not actually existing to judge that the pixel P(x,y) corresponds to a standstill body. The temperature TN is, for example, equal to $-1000°$ C. lower than an absolute temperature $0°$ K. or $10000°$ C. A differential temperature dT(x,y) between the temperatures T1(x,y), T2(x,y) of the pixel P(x,y) is calculated according to following equations.

$dT(x,y)=TN$, if $|T2(x,y)-T1(x,y)|<h$ is satisfied.

$dT(x,y)=T2(x,y)-T1(x,y)$, if $|T2(x,y)-T1(x,y)|\geq h$ is satisfied.

Therefore, the differential picture dPif can be produced in the producing section 50 by calculating differential temperatures dT(x,y) for all pixels in the infrared picture Pif.

Figure 6:
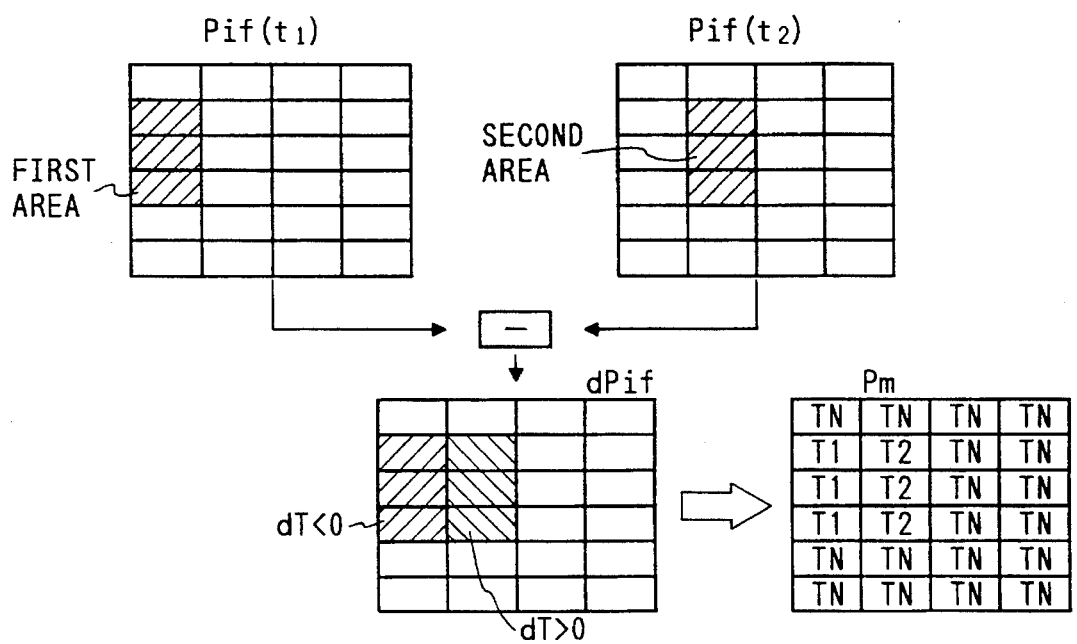
FIG. 6 shows a procedure for producing a differential picture dPif formed as a difference between a pair of infrared pictures Pif(t1), Pif(t2) as an example.

FIG. 6 shows a procedure for producing the differential picture dPif as an example.

As shown in FIG. 6, a difference between the infrared pictures Pif(t1), Pif(t2) is equivalent to the differential picture dPif of which the pixels P(x,y) have the differential temperatures dT(x,y). In cases where a moving body is placed in a first area at the elapsed time t1 in the infrared picture Pif(t1) and is placed in a second area at the elapsed time t2 in the infrared picture Pif(t2), differential temperatures dT(x,y) for time pixels P(x,y) placed in the first area are equal to a negative value in the differential picture dPif, and differential temperatures dT(x,y) for the pixels P(x,y) placed in the second area are equal to a positive value in the differential picture dPif. Therefore, in cases where the differential temperatures dT(x,y) for a group of pixels P(x,y) in the differential picture dPif are a negative value other than TN, the group of pixels P(x,y) corresponds to a moving body at the elapsed time t1. Also, in cases where the differential temperatures dT(x,y) for a group of pixels P(x,y) in the differential picture dPif are a positive value other than TN, the group of pixels P(x,y) corresponds to a moving body at the elapsed time t2. Also, in cases where the differential temperatures dT(x,y) for a group of pixels P(x,y) in the differential picture dPif are equal to TN, the group of pixels P(x,y) corresponds to a standstill body.

Thereafter, each of moving body pictures Pm(t) (t is an elapsed time) is produced in the moving body picture producing section 51 by determining moving body temperatures Tm(x,y) of the pixels P(x,y) in the differential picture dPif. In detail, the moving body temperatures Tm(x,y) of all of the pixels P(x,y) in the differential picture dPif are determined according to following equations.

$Tm(x,y)=T1(x,y)$, if $dT(x,y)<0$ is satisfied.

$Tm(x,y)=T2(x,y)$, if $dT(x,y)>0$ is satisfied.

$Tm(x,y)=TN$, if $dT(x,y)=TN$ is satisfied.

Therefore, each of the moving body pictures Pm(t) can be produced by changing the differential temperatures dT(x,y) of a group of pixels P(x,y) in the differential picture dPif to the temperatures T1(x,y), T2(x,y), TN.

Thereafter, a frequency distribution Fd(x,y,T) of temperature T in each of the pixels P(x,y) of the infrared picture Pif is produced from the moving body pictures Pm(t) in the frequency distribution producing section 52. In detail, the frequency distribution Fd(x,y,T) of a temperature T is incremented each time the pixel P(x,y) having the temperature T is found out in the loving body pictures Pm(t). The increment of the frequency distribution Fd(x,y,T) is continued for a prescribed period which is enough to determine a temperature range of a moving body. Therefore, the frequency distribution Fd(x,y,T) designating a relationship between the frequency and the temperature T is produced in the producing section 52 for each of the pixels P(x,y). In cases where the temperature of a moving body representing a person is recorded in a pixel P(x1,y1), the frequency within a temperature range of the moving body is greatly increased in the frequency distribution Fd(x1,y1,T). Accordingly, a temperature range of the moving body can be reliably determined according to the frequency distribution Fd(x,y,T). In cases where the infrared ray sensor 15 is not highly precise, it is preferred that a Frequency threshold be utilized to eliminate a frequency lower than the frequency threshold from the frequency distribution Fd(x,y,T).

Thereafter, a temperature range of the moving body representing a person is determined in the picking-out temperature determining section 53 to pick out one or more human-areas by utilizing the infrared picture Pif(t1), the Frequency distribution Fd(x,y,T) and a frequency threshold k. In detail, the temperatures T1(x,y) of the infrared picture Pif(t1) are changed according to following equations.

$T1(x,y)=TN$, if $(Fd(x,y,T1(x,y))<k$ is satisfied.

$T1(x,y)=T1(x,y)$, if $(Fd(x,y,T1(x,y))\geq k$ is satisfied.

Thereafter, the pixels set to the temperature TN are eliminated from the infrared picture Pif(t1) in the human-area picking out section 42 to pick out one or more human-areas composed out the pixels having the temperatures T1(x,y) not equal to TN. In the same manner, a temperature range of the moving body representing a person is determined in the picking-out temperature determining section 53 by utilizing the infrared picture Pif(t2), the frequency distribution Fd(x,y,T) and the frequency threshold k, and one or more human-areas are picked out from the infrared picture Pif(t2) in the human-area picking out section 42.

Also, there is another method for picking out one or more human-areas in the picking-out temperature determining section 53 and the human-area picking out section 42. In detail, a maximum moving body temperature $T_{MAX}$ is selected from among moving body temperatures Tin which satisfies $Fd(x,y,Tm)\geq k$ for at least one of the pixels P(x,y), and a minimum moving body temperature $T_{MIN}$ is selected from among moving body temperatures Tm. Thereafter, a temperature range of the moving body representing a person is set to a range from the minimum moving body temperature $T_{MIN}$ to the maximum moving body temperature $T_{MAX}$ in the picking-out temperature determining section 53. Thereafter, a group of pixels having temperatures T1(x,y) which range from the minimum moving body temperature $T_{MIN}$ to the maximum moving body temperature $T_{MAX}$ is picked out from the infrared picture Pif(t1) in the human-area picking out section 42. Also, a group of pixels having temperatures T2(x,y) which range from the minimum moving body temperature $T_{MIN}$ to the maximum moving body temperature $T_{MAX}$ is picked out from the infrared picture Pif(t2). This method is available in cases where the temperatures of the pixels are not sufficiently reflected in the frequency distribution Fd(x,y,T) to pick out one or more human-areas because the infrared ray sensor 15 just starts to be operated.

Accordingly, even though the detecting performances of the detecting devices in the infrared ray sensor 15 are not uniform, and even though noises are included in the infrared picture Pif, one or more human-areas can be automatically picked out from the infrared picture Pif in the the human-area detecting section 19 without manually setting a temperature range of the human-areas. Also, a temperature range of one or more human-areas can be automatically determined for each of the picture blocks.

In the first embodiment, a differential picture dPif is defined as a difference between a pair of infrared pictures Pif produced in series in the infrared picture producing section 15. However, it is applicable that a differential picture dPif is defined as a difference between a pair of infrared pictures Pif which are selected from among three infrared pictures Pif produced in series in the infrared picture producing section 15. For example, in cases where a series of infrared pictures Pif(1), Pif(2), Pif(3) and Pif(4) is produced, a differential picture dPif(1,2) between the infrared pictures Pif(1), Pif(2), a differential picture dPif(2,3) between the infrared pictures Pif(2), Pif(3), a differential picture dPif(1,3) between the infrared pictures Pif(1), Pif(3), a differential picture dPif(3,4) between the infrared pictures Pif(3), Pif(4) and a differential picture dPif(2,4) between the infrared pictures Pif(2), Pif(4) are produced in the differential picture producing section 50. In this case because the number of differential pictures dPif is increased, the frequency distribution Fd(x,y,T) can be rapidly produced.

Also, the frequency distributions Fd(x,y,T) are arranged in a two-dimensional plane in the first embodiment. However, in cases where a plurality of detecting devices arranged in a vertical direction are scanned in a horizontal direction to produce the infrared picture Pif in a two-dimensional plane, it is not required to produce the frequency distribution Fd(x,y,T) for each of the pixels, but it is enough to produce frequency distribution Fd(L,T) (L denotes a line number) for each of lines of the infrared picture Pif. In this case, a temperature range of one or more human-areas is determined according to the frequency distribution Fd(L,T) for each of lines of the infrared picture Pif. Accordingly, a memory capacity required to store the frequency distributions can be reduced. In the same manner, in cases where a plurality of detecting devices arranged in a horizontal direction are scanned in a vertical direction to produce the infrared picture Pif in a two-dimensional plane, it is enough to produce a frequency distribution Fd(R,T) (R denotes a row number) for each of rows of the infrared picture Pif. In addition, in cases where a detecting device of the infrared ray sensor 15 is scanned in vertical and horizontal directions to produce the infrared picture Pif in a two-dimensional plane, it is not required to produce the frequency distribution Fd(x,y,T) for each of the pixels, but it is enough to produce a frequency distribution Fd(T) for the infrared picture Pif. In this case, a temperature range of one or more human-areas is in common for all of the pixels in the infrared picture Pif, and the human-areas are picked out from the infrared picture Pif according to the single temperature range.

In the first embodiment, one or more human-areas are picked out from the infrared picture Pif in the human-area detecting section 19. However, it is applicable that one or more human-areas be picked out from a visible picture produced by detecting visible rays reflecting on persons and environments in the human-area detecting section 19. In this case, the human-areas are distinguished from other areas by detecting edges, boundary lines and/or visible colors of the human-areas.

Next, the personal characteristic data extracting section 21 is described with reference to FIG. 7.

In the personal characteristic data extracting section 21, pieces of personal characteristic data Dc1 are extracted from the infrared picture Pif stored in the infrared picture storing section 18 according to the human-areas and the representative points of the human-areas obtained in the human-area detecting section 19 to determine pieces of personal information Ip pertaining to one or more persons staying in the room in the picture information detecting section 17.

Figure 7:
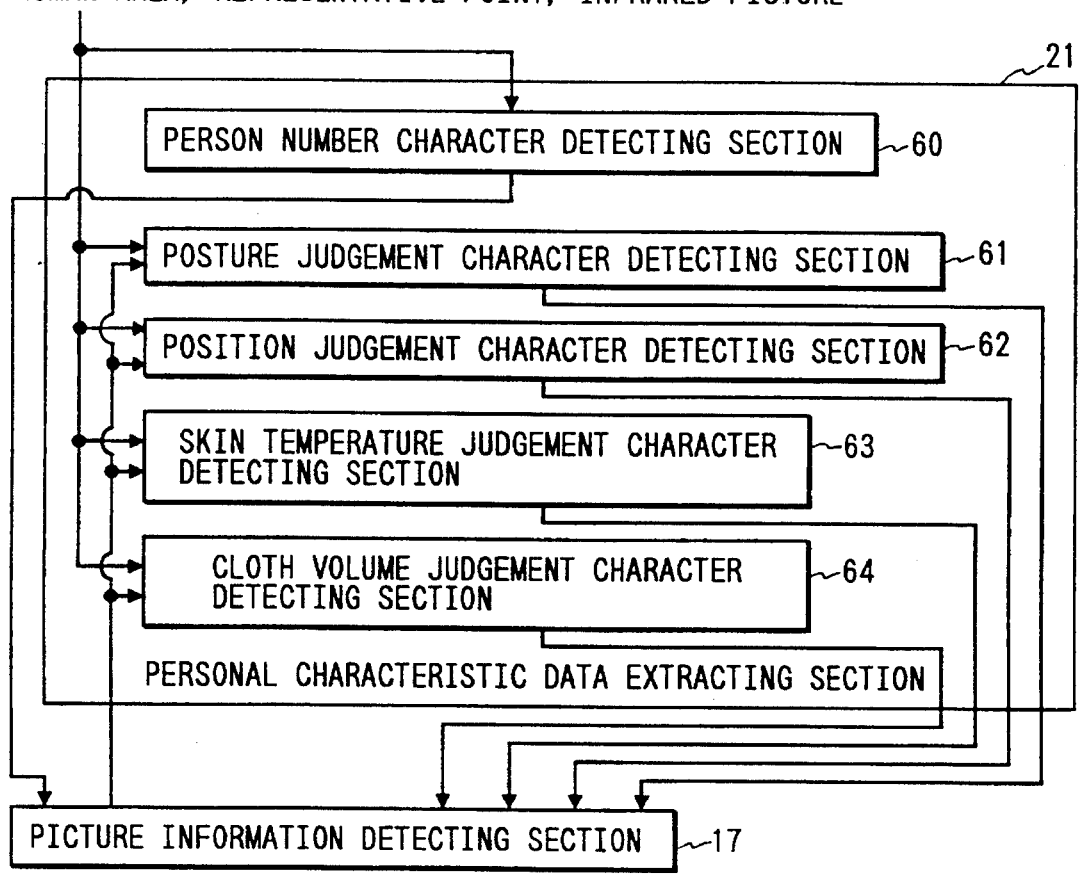
FIG. 7 is a block diagram of a personal information extracting section shown in FIG. 1 according to the first embodiment.

FIG. 7 is a block diagram of the personal characteristic data extracting section 21 according to the first embodiment.

As shown in FIG. 7, the personal characteristic data extracting section 21 comprises a person number character detecting section 60 for detecting a piece of personal characteristic data utilized for the detection of the number of persons staying in the measured area Am, a posture judgement character detecting section 61 for detecting a piece of personal characteristic data utilized for the detection of posture of a person, a position judgement character detecting section 62 for detecting a piece of personal characteristic data utilized for the detection of a foot position of a person, a skin temperature judgement character detecting section 63 for detecting a piece of personal characteristic data utilized for the detection of a skin temperature of a person, and a cloth volume judgement character detecting section 64 for detecting a piece of personal characteristic data utilized for the detection of a volume of person's clothes.

In the above configuration, an operation of the person number character detecting section 60 is initially described. In cases where the number of persons recorded in the infrared picture Pif is conventionally determined, one or more areas in which the existence of one or more persons is assumed are detected, and where or not a person stay in each of the areas is judged according to the shapes of the areas to select one or more human-areas. Thereafter, the number of human-areas is regarded to be equal to the number of persons. However, in cases where the shapes of the areas are not accurately recognized in the above conventional method, it is difficult to accurately determine the number of persons. Also, in cases where overlapped persons are recorded on the infrared picture Pif, the number of persons cannot be accurately determined. To avoid the above problem, the number of pixels in each of the human-areas, the shapes of the human-areas and the number of human-areas are calculated or recognized in the person number character detecting section 60 to accurately determine the number of persons staying in the measured area Am.

Figure 8:
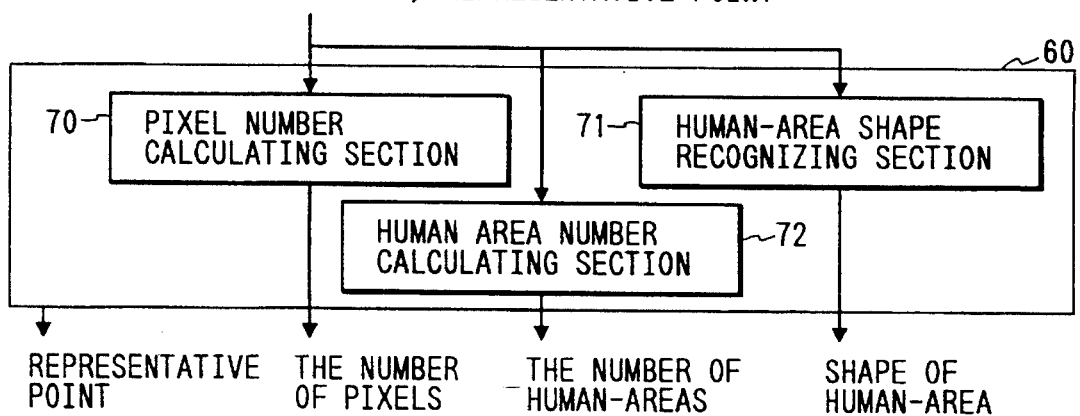
FIG. 8 is a block diagram of a person number character detecting section shown in FIG. 7.

FIG. 8 is a block diagram of the person number character detecting section 60 shown in FIG. 7.

As shown in FIG. 8, the person number character detecting section 60 comprises a pixel number calculating section 70 for calculating the number of pixels in each of the human-areas, a human-area shape recognizing section 71 for recognizing the shapes of the human-areas, and a human-area number calculating section 72 for calculating the number of human-areas.

In the above configuration, the number of pixels in each of the human-areas is calculated in the pixel number calculating section 70, the shapes of the human-areas are recognized in the human-area shape recognizing section 71, and the number of human-areas is calculated in the human-area number calculating section 72. The number of pixels in each of the human-areas, the recognized shapes of the human-areas and the number of human-areas are transferred to the person number detecting section 25.

Figure 9:
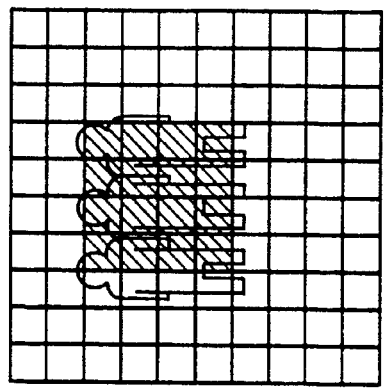
FIG. 9 shows a relationship between the number of pixels in a human-area and the number of overlapped persons staying the human-area to determine the number of overlapped persons according to the number of pixels in a person number detecting section shown in FIG. 1.

FIG. 9 shows a relationship between the number of pixels in a human-area and the number of overlapped persons staying in the human-area to determine the number of overlapped persons according to the number of pixels in the person number detecting section 25.

As shown in FIG. 9, the number of pixels in a human-area is represented by Np. the increasing the overlapped persons in a human-area, the higher the number of pixels in the human-area. Therefore, the number of overlapped persons in a human-area can be determined in the person number detecting section 25 by examining the number of pixels in the human-area. In this embodiment, the number of pixels is divided into many ranges with thresholds Thi ($i=1,2,---,N$, and $0<Thi<Th_{+1}$). In detail, it is judged that a person stays in a human-area in case of $Np \leq Th1$ (for example, $Th1=5$), it is judged that two persons stays in a human-area in case of $Th1<Np \leq Th2$ (for example, $Th2=10$), and it is judged that N persons stays in a human-area in case of $Th_{N-1}<Np \leq Th_N$.

In the first embodiment, the number of persons in a human-area is determined by calculating the number of pixels in the infrared picture Pif. However, even though one or more human-areas picked out from the visible picture are input to the person number character detecting section 60, the human-areas, the shapes of the human-areas and the pixels of the human-areas can be recognized by detecting edges, boundary lines and/or visible colors of the human-area. Therefore, the number of persons can be determined in the person number detecting section 25 in the same manner.

In cases where the number of overlapped persons in a human-area is determined in the person number detecting section 25, it is required to adjust the values of the thresholds Thi while considering the position of the infrared ray sensor 15 set in the measured area Am, a quality of the infrared picture Pif and the resolution of the infrared picture Pif. Therefore, a learning function of a neural network is utilized to simplify the adjustment of the thresholds Thi in this embodiment.

Figure 10:
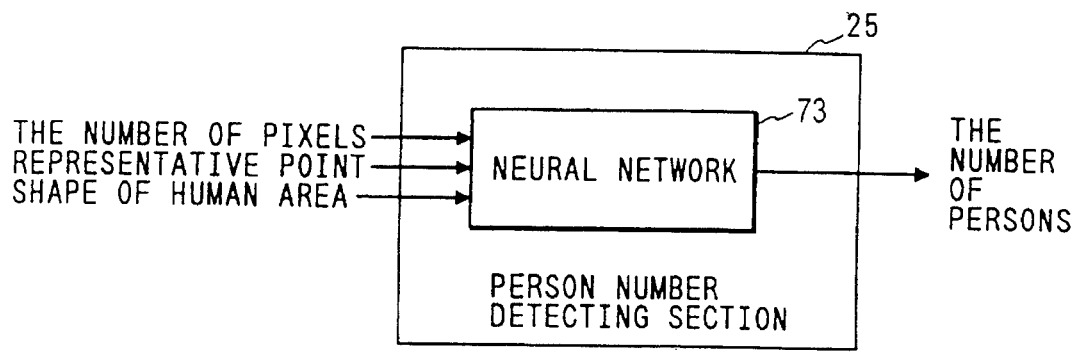
FIG. 10 is a block diagram of a neural network provided in the person number detecting section.

FIG. 10 is a block diagram of a neural network provided in the person number detecting section 25.

As shown in FIG. 10, the number of pixels in a human-area calculated in the pixel number calculating section 70, the representative point of the human-area calculated in the representative point calculating section 43 and the shape of the human-area recognized in the human-area shape recognizing section 71 are input to a neural network 73 of the person number detecting section 25, and the number of persons existing in the human-area is calculated. In this case, various types of technical models can be utilized for the earning function of the neural network 73. For example, in cases where a multilayer type of perceptron is utilized as the neural network 73, a back-propagation method can be utilized for the learning function of the neural network 73. In the back-propagation method, pieces of input information are tentatively input to the neural network 73, and inside conditions of the neural network 73 are adjusted to obtain pieces of desired output information determined in advance. In this embodiment, pieces of tentative data designating a longitudinal length of a tentative area, a lateral length of the tentative area, the number of pixels in the tentative area and a representative point of the tentative area and a piece of teaching data designating the number of persons in the tentative area are preliminarily input to the neural network 73 to perform a learning operation of the neural network 73. Therefore, troublesome works required to empirically determine the values of the thresholds Thi can be reduced because the the inside conditions of the neural network 73 can be automatically adjusted by the learning operation.

In this embodiment, the neural network 73 is utilized to determine the number of persons. However, it is applicable that a statistical processing such as a regression analysis be utilized in place of the learning function of the neural network 73.

Next, a detecting method for detecting a position of person's feet is described with reference to FIGS. 11, 12.

FIG. 11 is a block diagram of the position judgement character detecting section 62 and the foot position detecting section 26.

As shown in FIG. 11, the position judgement character detecting section 62 comprises a temperature extracting unit 80 for selecting a representative longitudinal row, in which a pixel placed in a lowest level of a human-area detected in the human-area detecting section 19 is included, from longitudinal rows of the human-area and extracting temperatures of pixels existing in the representative longitudinal row, and the foot position detecting section 26 comprises a foot position estimating unit 81 for estimating a foot position of a person in the human-area by utilizing the temperatures of the pixels extracted in the temperature extracting unit 80. The foot position estimating unit 81 can be operated according to an algorismic method, a statistical processing such as a regression analysis or a neural network method. In this embodiment, the foot position estimating unit 81 is operated according to the neural network method.

In the above configuration, a human-area detected in the human-area detecting section 19 is input to the temperature extracting unit 80. In the unit 80, the human-area is partitioned into a plurality of longitudinal rows, and a lower pixel placed at a lower side of a longitudinal row is specified for each of longitudinal rows of the human-area. Thereafter, a lowest pixel placed at the lowest side is selected from among the lower pixels, and a representative longitudinal row having the lowest pixel is selected from the longitudinal rows of the human-area. In cases where a plurality of lowest pixels are placed at the same level, a pixel having the highest temperature is selected from among the lowest pixels. Or, a pixel placed at a central, right or left side in a lateral direction is selected from among the lowest pixels. Thereafter, extracted temperatures of the pixels placed in the representative longitudinal row are extracted in the temperature extracting unit 80. For example, in cases where the number of pixels in the representative longitudinal row is eight, eight temperatures are extracted. Thereafter, the extracted temperatures are transferred to the foot position estimating unit 81. Also, the representative point of the human-area calculated in the representative point calculating section 43 and temperatures of pixels surrounding the lowest pixel stored in the infrared picture storing section 18 are transferred to the foot position estimating unit 81.

The unit 81, inside conditions of a neural network is adjusted in advance according to a back-propagation method by inputting pieces of tentative data designating temperatures of tentative pixels and temperatures of pixels surrounding the tentative pixels and a piece of teaching data designating a tentative foot position. In the present invention, a multilayer perceptron is utilized for the neural network. However, a learning vector quantization (LVQ) type of neural network is also available. Thereafter, a foot position of a person in the human area is calculated by utilizing the extracted temperatures, the representative point of the human-area and the surrounding temperatures.

Figure 12:
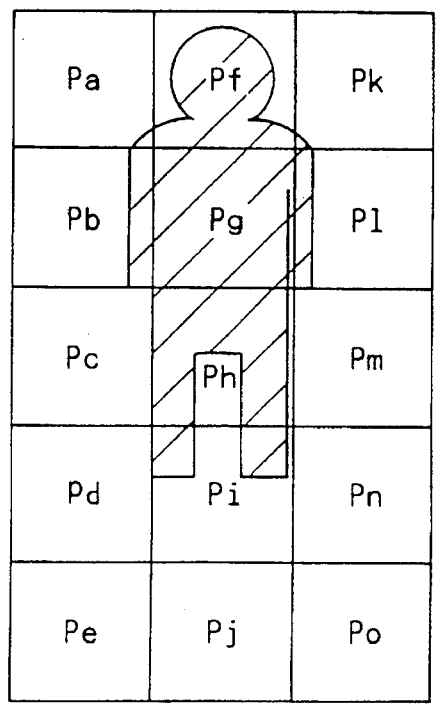
FIG. 12 schematically shows a relationship between a standing person recorded on the infrared picture Pif and pixels of the infrared picture Pif.

FIG. 12 schematically shows a relationship between a standing person recorded on the infrared picture Pif and the pixels of the infrared picture Pif.

As shown in FIG. 12, the infrared picture Pif is composed of pixels Pa to Po, and a standing person is expressed by a slanting-line portion. Because major parts of the pixels Pf, Pg and Ph are respectively occupied by the standing person, the pixels Pf, Pg and Ph are respectively picked out as a part of a human-area. However, because an upper portion of the pixel Pi is limitedly occupied by the standing person, an upper half portion of the pixel Pi intends to heighten the temperature of the pixel Pi, and a lower half portion of the pixel Pi intends to lower the temperature of the pixel Pi. Therefore, the temperature of the pixel Pi is set to a middle point between a person's temperature and an environmental temperature so that the temperature of the pixel Pi becomes lower than a lower limit of a temperature range of the human-area. As a result, only the pixels Pf, PK and Ph are picked out from the infrared picture Pif to produce a human-area in the human-area detecting section 42. In tills case, even though a position of person's feet is estimated in the foot position estimating unit 81, the position of person's feet cannot be accurately estimated because the lowest pixel in the human-area is the pixel Ph. In this embodiment, because a temperature of the pixel Pi included in the surrounding temperatures is transferred to the foot position estimating unit 81, the position of person's feet can be accurately estimated.

In the first embodiment, the position of person's feet is estimated in the neural network of the estimating unit 81. However, it is applicable that the position of person's feet be estimated according to an argorism method in the estimating unit 81 without utilizing any neural network. In detail, a temperature Th of the pixel Ph is equivalent to a person's temperature, a temperature Tj of the pixel Pj is equivalent to an environmental temperature, and a temperature Ti of the pixel Pi is equivalent to a mixed temperature of the person's temperature and the environmental temperature. Therefore, in cases where a ratio of an area of the pixel Pi occupied by the standing person to an entire area of the pixel Pi is expressed by a symbol $\alpha$, $$Ti = \alpha * Th + (1-\alpha) * Tj$$

is satisfied. Therefore, in cases where the temperatures Ti, Th and Tj are input to the estimating unit 81, the ratio $\alpha$ is obtained. Thereafter, the position of person's feet is estimated according to the ratio $\alpha$.

Next, another detecting method for detecting a position of person's feet is described with reference to FIG. 13 according to a modification of the first embodiment.

Figure 13:
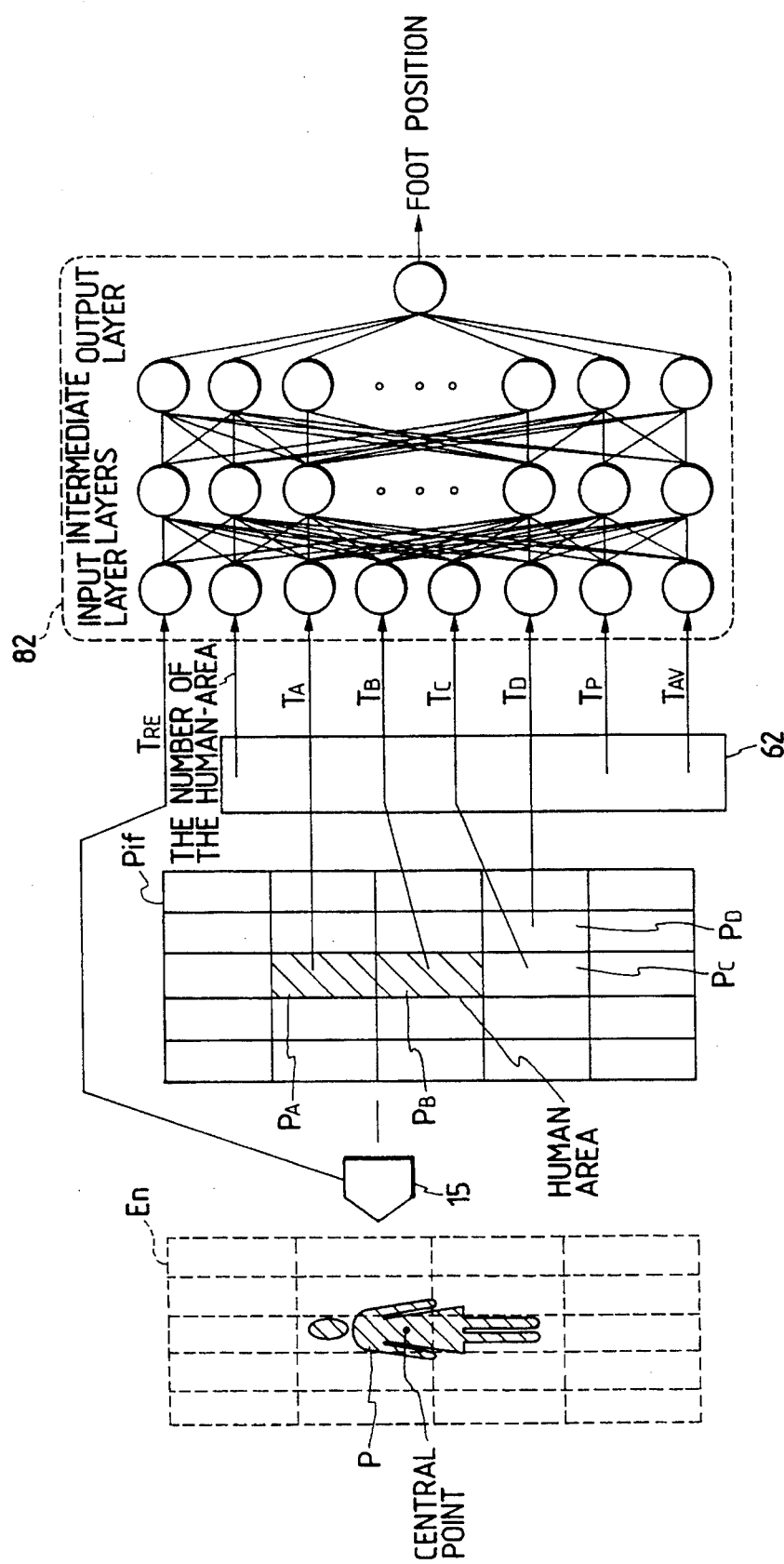
FIG. 13 schematically shows functions of a position judgement character detecting section shown in FIG. 7 and a foot position detecting section shown in FIG. 1 according to a modification of the first embodiment.

FIG. 13 schematically shows the functions of the position judgement character detecting section 62 and the foot position detecting section 26 according to a modification of the first embodiment.

As shown in FIG. 13, pieces of information pertaining to environments En and a person P are recorded on the infrared picture Pif with the infrared ray sensor 15. Thereafter, a human-area is picked out from the infrared picture Pif in the human-area detecting section 19, and a central point of the human-area obtained by weighting positions of the pixels with temperature of the pixels is calculated in the position judgement character detecting section 62. Thereafter, a temperature $T_A$ of a pixel $P_A$ placed at the lowest point of the human area in which a perpendicular dropped from the central point intersects, a temperature $T_B$ of a pixel $P_B$ adjacent to the pixel $P_A$ in an upper direction, a temperature $T_C$ of a pixel $P_C$ adjacent to the pixel $P_A$ in a lower direction and a temperature $T_D$ of a pixel $P_D$ adjacent to the pixel $P_C$ in a right or left direction are specified. Also, a temperature $T_P$ of person's feet defined by averaging temperatures of several pixels placed in a horizontal direction of the pixel $P_C$, an average temperature $T_{AV}$ of pixels placed in the human-area and a reference temperature $T_{RE}$ of the infrared ray sensor 15 are calculated. Thereafter, the temperatures $T_A$, $T_B$, $T_C$, $T_D$, $T_P$, $T_{AV}$ and $T_{RE}$ are transferred to a multilayer type of neural network 82 of the foot position detecting section 26 as pieces of personal characteristic data Dc1. Thereafter, a position of person's feet is determined according to the personal characteristic data Dc1 in the neural network 82.

Next, a detecting method for detecting a posture of a person such as a standing posture, a sitting posture or a lying posture is described with reference to FIGS. 14 to 17.

Figure 14:
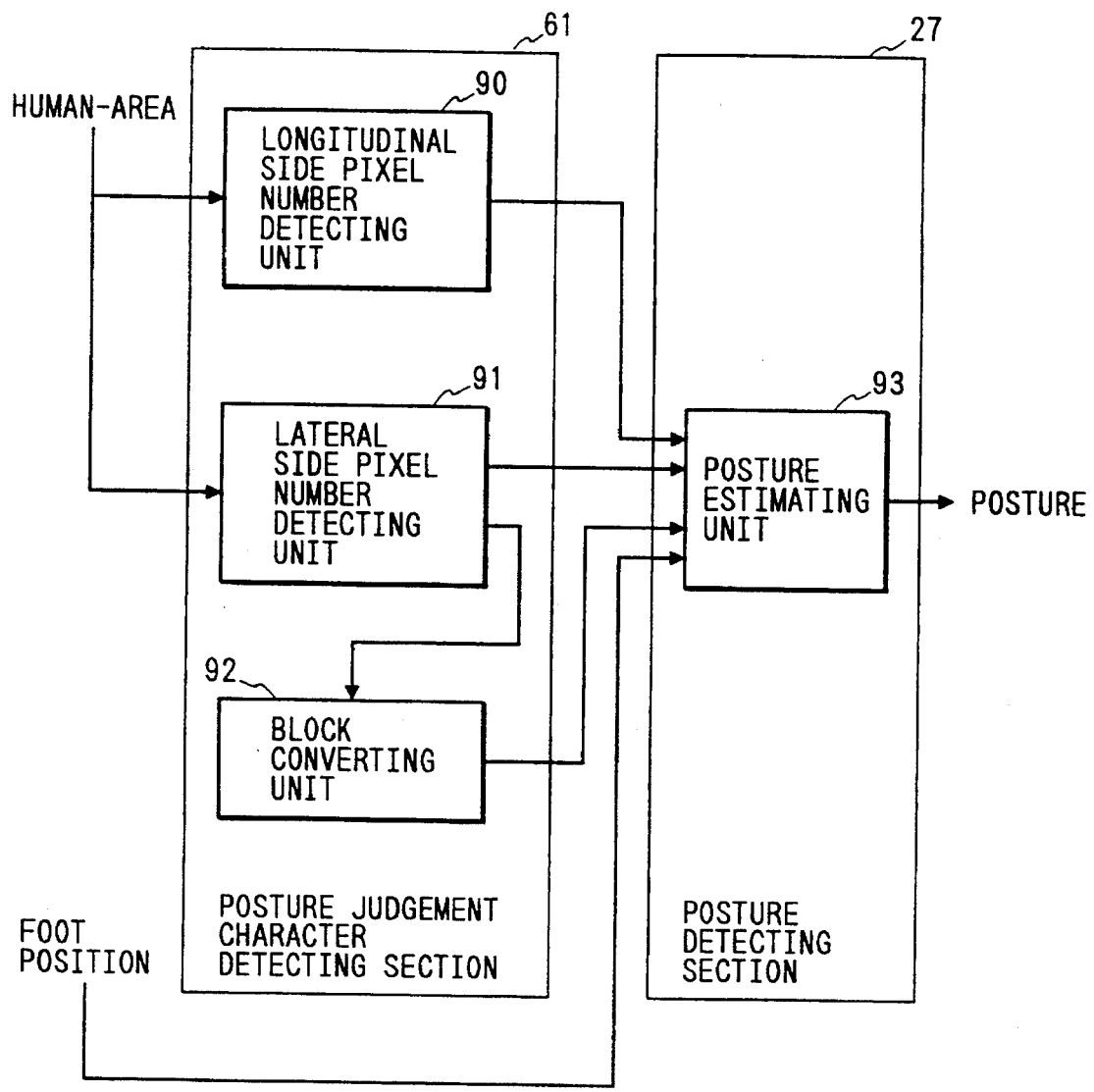
FIG. 14 is a block diagram of a posture judgement character detecting section shown in FIG. 7 and a posture detecting section shown in FIG. 1 according to the first embodiment.

FIG. 14 is a block diagram of the posture judgement character detecting section 61 and the posture detecting section 27 according to the first embodiment.

As shown in FIG. 14, the posture judgement character detecting section 61 comprises a longitudinal side pixel number detecting unit 90 for extracting a rectangular pixel-block which is set to a minimum size on condition that a human-area detected in the human-area detecting section 19 is included in the rectangular pixel-block from the infrared picture Pif stored in the infrared picture storing section 18 and detecting the number of pixels at a longitudinal side of the rectangular pixel-block, a lateral side pixel number detecting unit 91 for extracting the rectangular pixel-block and detecting the number of pixels at a lateral side of the rectangular pixel-block, and a block converting unit 92 for converting the rectangular pixel-block into a standardized 3×3 square pixel-block in which the number of converted pixels at a longitudinal side is three equal to that at a lateral side. Also, the posture detecting section 27 comprises a posture estimating unit 93 for estimating a posture of a person recorded on the human-area of the infrared picture Pif according to the number of pixels at the longitudinal side of the rectangular pixel-block, the number of pixels at the lateral side of the rectangular pixel-block and the temperatures (or a temperature distribution) of nine (3×3) converted pixels in the standardized 3×3 square pixel-block. Also, the foot position of the person obtained in the foot position detecting section 26 is useful to accurately estimate the posture of the person in the posture estimating unit 93.

The posture estimating unit 93 can be operated according to a statistical processing method or a neural network method. In this embodiment, the posture estimating unit 93 is composed of a multilayer perceptron of which inside conditions are initialized according to its learning function in a back-propagation method.

In the above configuration, operations of the posture judgement character detecting section 61 and the posture detecting section 27 are described with reference to FIGS. 15. A human-area Ah detected in the human-area detecting section 19 is transferred to the longitudinal side pixel number detecting unit 90 and the lateral side pixel number detecting unit 91, and pixels Ps surrounding the human-area Ah are transferred from the infrared picture storing section to the units 90, 91. In the units 90, 91, a rectangular pixel-block B1 including the human-area Ah is extracted to minimize its size. Thereafter, the number N1 of pixels of the rectangular pixel-block at a longitudinal side is detected in the longitudinal side pixel number detecting unit 90, and the number N2 of pixels at a lateral side of the rectangular pixel-block is detected in the lateral side pixel number detecting unit 91. Thereafter, the rectangular pixel-block B1 produced in the unit 90 or 91 is converted into a standardized 3×3 square pixel-block 52 having nine converted pixels.

The reason that the standardized 3×3 square pixel-block B2 is produced is described. The shape of the rectangular pixel-block B1 varies in dependence on the shape of the human-area Ah varying in dependence on a posture of a person recorded on the human-area such as a standing posture, a sitting posture or a lying posture. Therefore, a large pieces of input data pertaining to the size of the rectangular pixel-block B1 and a temperature distribution of the rectangular pixel-block B1 are required to estimate a posture of the person in the multilayer perceptron of the posture estimating unit 93. However, because the number of neurons is fixed in the multilayer perceptron, it is required to decrease the number of input data by standardizing the rectangular pixel-block B1.

FIGS. 16(*a*) to 16(*c*) show the operation performed in the block converting unit 92.

In cases where the rectangular pixel-block B1 is composed of a 4×5 matrix of pixels Pa to Pt shown in FIG. 16(*a*), the rectangular pixel-block B1 is converted into the standardized 3×3 square pixel-block B2 composed of a 3×3 matrix of converted pixels P1 and P9 shown in FIG. 16(*b*). In detail, as a relationship between a group of pixels and a group of converted pixels is shown in FIG. 16(*c*), temperatures T1 to T9 of the converted pixels P1 to P9 are calculated with temperatures Ta to Tt of the pixels Pa to Pt in the block converting unit 92. For example the temperature T1 is obtained according to a following equation.

$$T1=\{0.25\times0.2\times Ta+0.25\times(0.33-0.2)\times Te+(0.33-0.25)\times0.2\times Tb+(0.33-0.25)\times(0.33-0.2)\times Tf\}/(0.33\times0.33)$$

Thereafter, the temperatures T1 to T9 obtained in the block converting unit 92, the number of pixels at the longitudinal side of the rectangular pixel-block obtained in the detecting unit 90, the number of pixels at the lateral side of the rectangular pixel-block in the detecting unit 91 and the foot position of the person obtained in the foot position detecting section 26 are transferred to the posture estimating unit 93. In the estimating unit 93, the multilayer perceptron has already learned by inputting a large pieces of tentative input data and pieces of teaching data designating various postures at various positions to the multilayer perceptron, and a posture of the person recorded on the human-area of the infrared picture Pif is estimated.

The first embodiment, the multilayer perceptron is utilized for the neural network. However, an LVQ type of neural network is also available.

Also, it is preferred that pieces of orientation data obtaining by changing an orientation of the person detected by the two-dimensional infrared ray sensor 15 are additionally input to the multilayer perceptron for the purpose of the learning of the multilayer perceptron. In this case, a posture of the person including his orientation can be estimated.

Also, it is preferred that a large pieces of posture data obtained by minutely changing a posture of the person are additionally input to the multilayer perceptron for the purpose of the learning of the multilayer perceptron. In this case, a posture of the person can be finely estimated in the posture estimating unit 93.

Next, another detecting method for detecting a posture of a person is described with reference to FIG. 17 according to a modification of the first embodiment.

Figure 17:
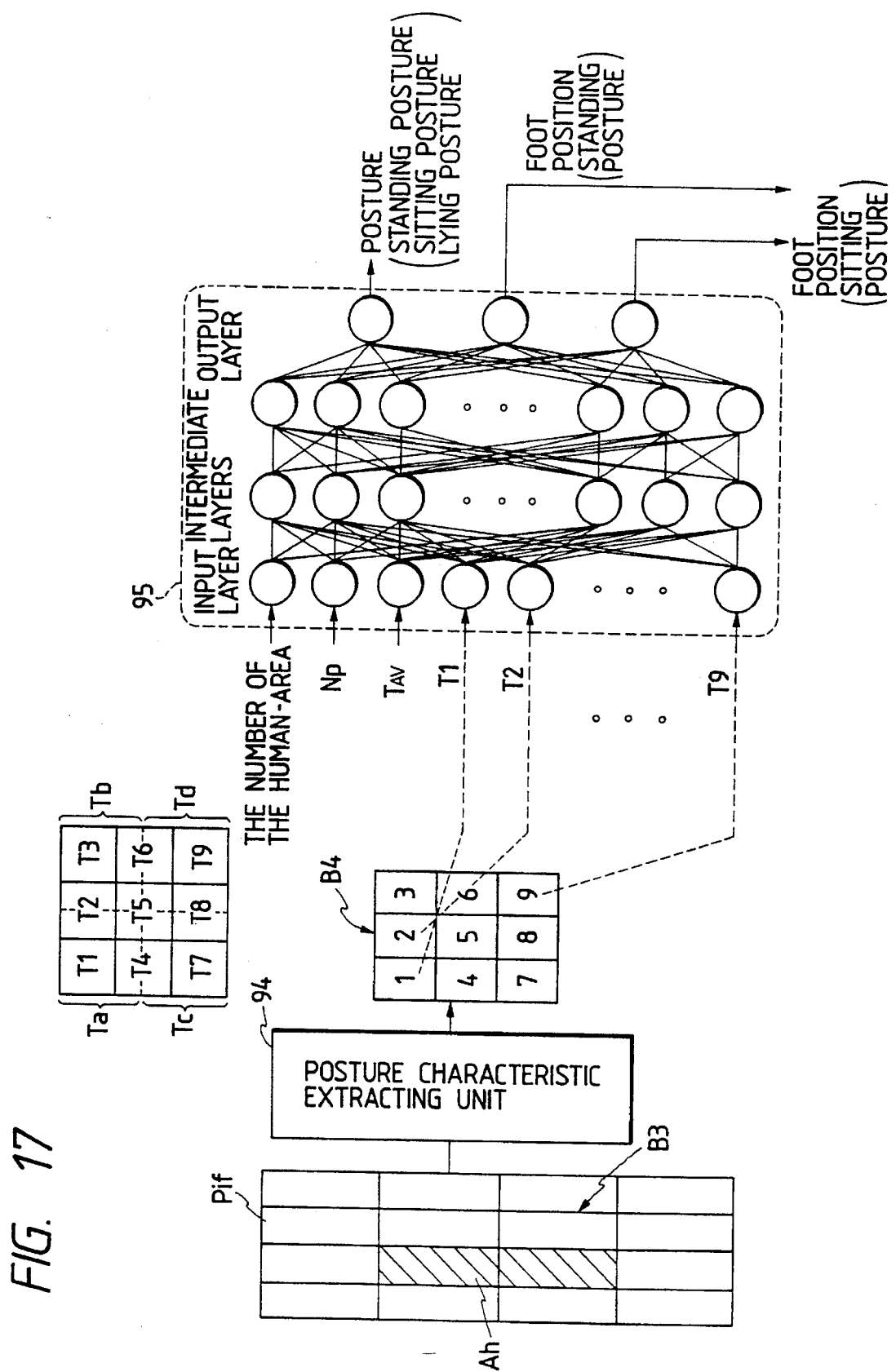
FIG. 17 schematically shows functions of a position judgement character detecting section shown in FIG. 7 and a foot position detecting section shown in FIG. 1 according to a modification of the first embodiment.

FIG. 17 schematically shows the functions of the posture judgement character detecting section 61 and the posture detecting section 27 according to a modification of the first embodiment.

As shown in FIG. 17, a human-area Ah detected in the human-area detecting section 19 and pixels surrounding the human-area Ah are transferred to a posture characteristic extracting unit 94. In the extracting unit 94, a square pixel-block B3 including the human-area Ah is picked out. The square pixel block B3 is formed to minimize its size. Thereafter, the square pixel-block B3 is converted into a standardized 3×3 square pixel-block B4 composed of a 3×3 matrix of converted pixels P1 and P9. Thereafter, temperatures T1 to T9 of the converted pixels P1 and P9 are extracted as pieces of character data. For example, in cases where the square pixel-block B3 is composed of a 2×2 matrix of pixels Pa to Pd having temperatures Ta to Td, the temperatures T1 to T9 are calculated according to following equations.

$$T1=Ta,\ T2=(Ta+Tb)/2,\ T3Tb,\ T4=(Ta+Tc)/2$$

$$T5=(Ta+Tb+Tc+Td)/4,\ T6=(Tb+Td)/2,$$

$$T7=Tc,\ T8=(Tc+Td)/2,\ \text{and}\ T9=Td$$

Thereafter, the temperatures T1 to T9, an average temperature $T_{AV}$ of the converted pixels P1 to P9 and the number Np of pixels placed in the human-area Ah are input to a neural network 95. In the neural network 95, a posture of a person recorded on the human area Ah such as a standing posture, a sitting posture and a lying posture is estimated. Also, in cases where the standing posture or the sitting posture is estimated, a position of the person is estimated. The position of the person is utilized as a selecting signal or a correcting signal to judge the position of the person as described hereinafter.

Next, another picture information detecting section according to a modification of the first embodiment is described with reference to FIG. 18.

Figure 18:
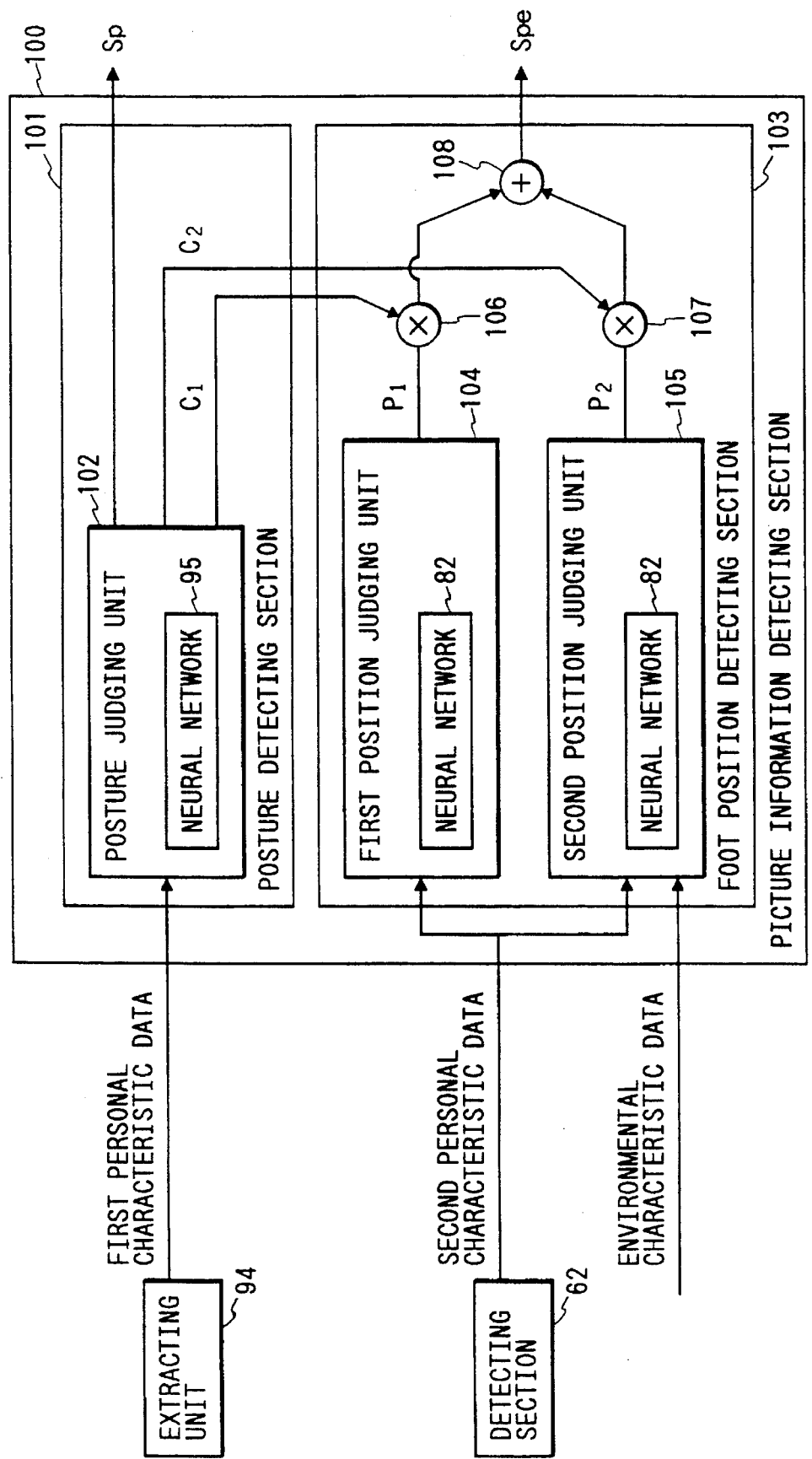
FIG. 18 is a block diagram of a picture information detecting section according to a modification of the first embodiment.

FIG. 18 is a block diagram of a picture information detecting section according to a modification of the first embodiment.

As shown in FIG. 18, a picture information detecting section 100 comprises a posture detecting section 101 having a posture judging unit 102 for detecting a posture of a person recorded on a human-area detected in the human-area detecting section 19, and a foot position detecting section 103 for detecting a position of person's feet. The posture judging unit 102 is composed of the neural network 95 shown in FIG. 17. The foot position detecting section 103 comprises a first position judging unit 104 for judging a foot position of the person sitting on a chair or a floor in a sitting posture, a second position judging unit 105 for judging a foot position of the person standing on a floor in a standing posture, a first multiplier 106 for multiplying a first positional signal P1 output from the first position judging unit 104 by a first coefficient C1 ($0 \leq C1 \leq 1$) output from the posture judging section 102, a second multiplier 107 for multiplying a second positional signal P2 output from the second position judging unit 105 by a second coefficient C2 ($0 \leq C2 \leq 1$) output from the posture judging section 102, and an adder 108 for adding the first positional signal P1 multiplied and the second positional signal P2 multiplied. The first and second position judging units 104, 105 are respectively composed of the neural network 82 shown in FIG. 13. In cases where the sitting posture and the standing posture are not distinguished from each other, either the first or second position judging unit 104 or 105 is required. Also, in cases where various postures such as a lying posture, a standing posture, a chair-sitting posture, a floor-sitting posture and the like are distinguished from each other in detail, a plurality of position judging units respectively corresponding to the lying posture, the standing posture, the chair-sitting posture, the floor-sitting posture and the like are required to distinguish the various postures from each other.

The learning in the neural network 95 of the posture judging unit 102 is performed by inputting pieces of character data and pieces of teaching data. The character data are obtained by recording a large number of persons placed at various positions of a scanning area with various clothes on the infrared picture Pif. The teaching data designate postures of the persons. A learning method depends on a type of a neural network. In this embodiment, a maximum steep diving method called a back-propagation in which inside conditions of the neural network are adjusted to lessen a square value of an error defined as a difference between an actual output of the network and a desired output is utilized. Also, the coefficients C1, C2 output from the posture judging unit 102 are adjusted by simultaneously inputting pieces of learning data pertaining to a standing posture and pieces of learning data pertaining to a sitting posture to the neural network 95 for the purpose of performing the learning of the neural network 95 after the learning of the neural network 95 pertaining to the sitting posture and the learning of the neural network 95 pertaining to the standing posture are separately performed. This learning method is performed according to the back-propagation and is known as a learning method for a structural neural network.

The learning in the neural networks 82 of the first and second position judging units 104, 105 is performed by inputting pieces of character data and pieces of teaching data. The character data are obtained by recording a large number of persons placed at various positions of a scanning area with various clothes on the infrared picture Pif. Each of the teaching data designate a distance between a position of a person and a position of the infrared ray sensor 15. A learning method depends on a type of a neural network. In this embodiment, the maximum steep diving method called the back-propagation is utilized in the same manner as in the neural network 95.

In the above configuration, pieces of first personal characteristic data calculated in the picture processing section 16 are input to the neural network 95 of the posture judging unit 102 to judge a posture of a person, and a posture signal Sp designating the posture of the person is judged and output. The first personal characteristic data are, for example, produced in the posture characteristic extracting unit 94 in which the temperatures T1 to T9 are output as the characteristic data. Also, pieces of second personal characteristic data calculated in the picture processing section 16 are input to the neural networks 82 of the first and second position judging units 104, 105 to judge a position of a person. The second personal characteristic data are, for example, produced in the position judgement character detecting section 62 in which the temperatures $T_A$, $T_B$, $T_C$, $T_D$ of the pixels $P_A$, $P_B$, $P_C$, $P_D$ and the temperatures $T_A$, $T_{RE}$ are output. Thereafter, a first positional signal P1 which designates the position of the person staying in a sitting posture is judged and output from the first position judging unit 104. Also, a second positional signal P2 which designates the position of the person staying in a standing posture is judged and output from the second position judging unit 105. Thereafter, One of the positional signals P1, P2 is selected according to a first method, or a mixed signal of the positional signals P1, P2 is produced according to a second method.

In cases where the first method is performed, one of the positional signals P1, P2 is selected in dependence on whether the posture signal Sp designates a sitting posture or a standing posture. This selection is generally performed according to an If-Then rule. That is, if the posture signal Sp designates a sitting posture of the person, then the first positional signal P1 is selected. Also, if the posture signal Sp designates a standing posture of the person, then the second positional signal P2 is selected. In this case, even though it is difficult to judge whether a person is in the standing posture or the sitting posture, it is required to select one of the positional signals P1, P2. Therefore, the second method is adopted. That is, a first coefficient C1 ($0 \leq C1 \leq 1$) designating the possibility of the sitting posture is output from the posture judging section 102, and a second coefficient C2 ($0 \leq C2 \leq 1$) designating the possibility of the standing posture is output from the posture judging section 102. Thereafter, the first positional signal P1 is multiplied by the first coefficient C1 in the first multiplier 106, and the second positional signal P2 is multiplied by the second coefficient C2 in the second multiplier 107. Thereafter, the first positional signal P1 multiplied and the second positional signal P2 multiplied are added each other in the adder 108 to produce a position estimating signal Spe. In short, the calculation is performed according to an equation $$Spe = C1 \times P1 + C2 \times P2.$$

Therefore, in cases where the judgement in the posture judging unit 102 is definite, the values of the coefficients C1, C2 are respectively 0 or 1. In contrast, in cases where the judgement in the posture judging unit 102 is not definite, the values of the coefficients C1, C2 are respectively set in a range $0 < (C1 \text{ and } C2) < 1$ in dependence on the possibility of the standing or sitting posture. Accordingly, a position of the person which depends on the posture of the person can be accurately estimated regardless of whether the person is sitting or standing.

In the first embodiment, the personal characteristic data extracting section 21 is provided in the picture processing section 16. However, it is applicable that the personal characteristic data extracting section 21 be provided in the picture information detecting section 17.

Next, the detection of a skin temperature and the detection of the volume of person's clothes performed in the personal characteristic data extracting section 21 which is provided in the picture information detecting section 17 is described in detail with reference to FIG. 19.

In the personal characteristic data extracting section 21, the detection of a skin temperature and the detection of the volume of person's clothes in addition to the detection of the number of persons in each of the human-areas, the detection of a position of person's feet and the detection of a posture of a person are performed.

Figure 19:
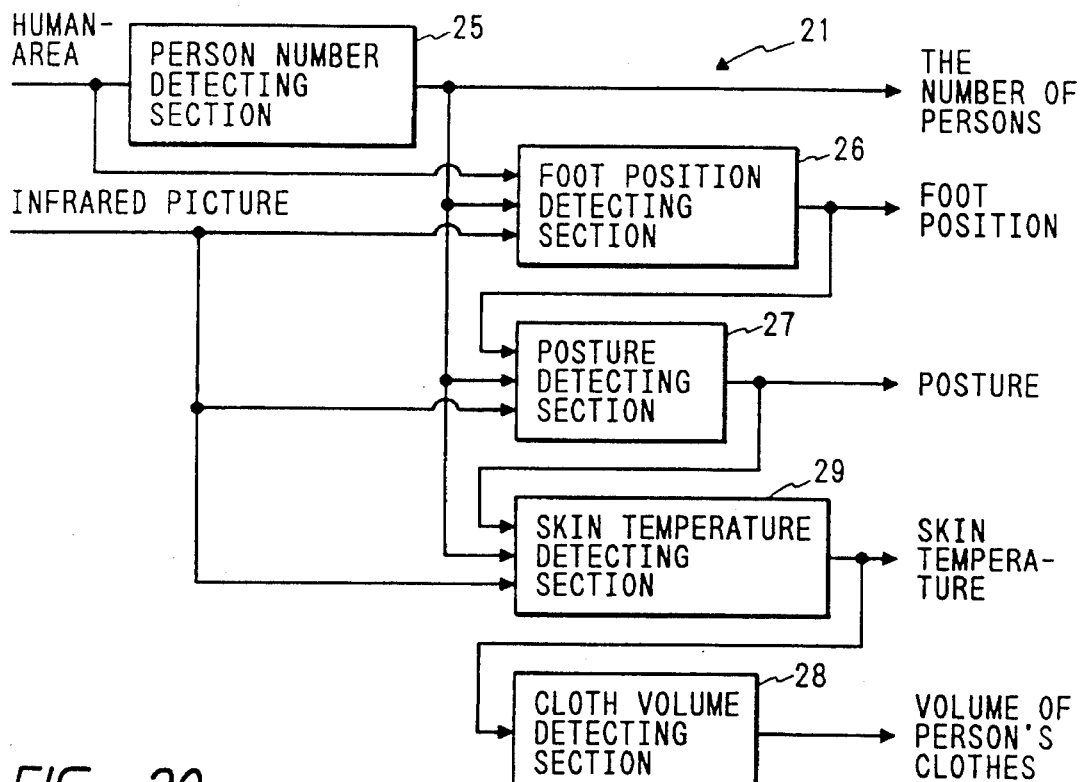
FIG. 19 is a block diagram of a personal information extracting section provided in a picture information detecting section shown in FIG. 1 according to the first embodiment.

FIG. 19 is a block diagram of the personal characteristic data extracting section 21 provided in the picture information detecting section 17 according to the first embodiment.

As shown in FIG. 19, the personal characteristic data extracting section 21 comprises the person number detecting section 25 for detecting the number of persons recorded on a human-area which is picked out from the infrared picture Pif in the human-area detecting section 19, the foot position detecting section 26 for detecting a position of person's feet according to the human-area and pixels of the infrared picture Pif surrounding the human-area, the posture detecting section 27 for detecting a posture of a person recorded on the human-area according to the human-area and the position of the person's feet, the skin temperature detecting section 29 for detecting a skin temperature of a person recorded on the human-area according to the posture of the person and the human-area, and the cloth volume detecting section 28 for detecting the volume of clothes of a person according to the skin temperature of the person.

A detecting method for detecting a skin temperature of a person recorded on a human-area is initially described with reference to FIG. 20.

Figure 20:
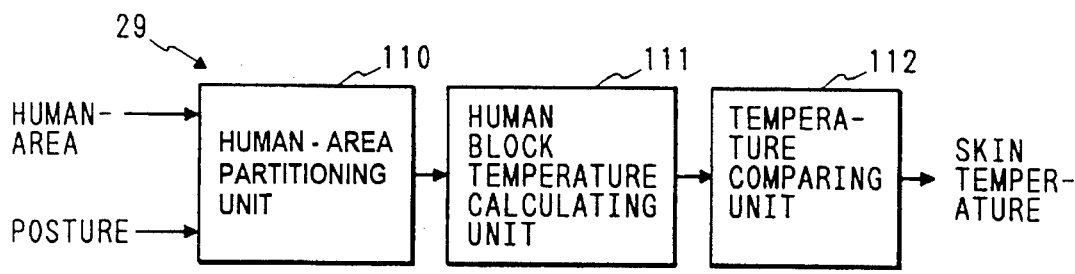
FIG. 20 is a block diagram of a skin temperature detecting section shown in FIG. 1.

FIG. 20 is a block diagram of the skin temperature detecting section 29.

As shown in FIG. 20, the skin temperature detecting section 29 comprises a human-area partitioning unit 110 for partitioning a human-area detected in the human-area detecting section 19 into a plurality of human blocks which each correspond to a prescribed body portion of a person recorded on the human-area according to the posture of the person detected in the posture detecting section 27, a human block temperature calculating unit 111 for calculating an average temperature of each of the human blocks partitioned in the human-area partitioning unit 110, and a temperature comparing unit 112 for comparing the average temperatures calculated in the human block temperature calculating unit 111 with a threshold temperature to separate a part of the human blocks corresponding to uncovered body portions of the person from the remaining part of the human blocks corresponding to covered body portions of the person.

Figure 21A:
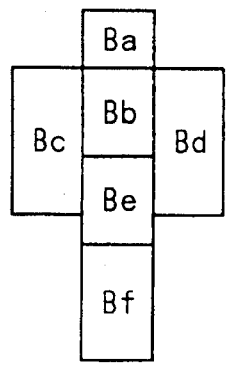
FIG. 21A shows a group of human blocks partitioning a standing person.
Figure 21B:
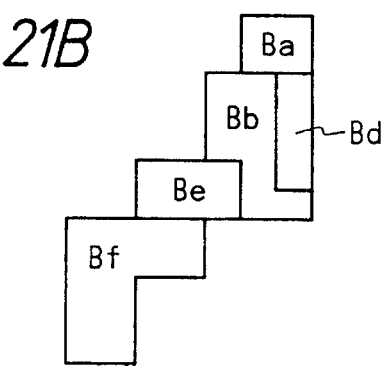
FIG. 21B shows a group of human blocks partitioning a person sitting on a chair.

In the above configuration, a human-area detected in the human-area detecting section 19 is partitioned into six human blocks to partition a person into six body portions such as a head portion, a breast-abdomen portion, a right arm-hand portion, a left arm-hand portion, a waist-hip portion and a leg-foot portion according to the posture of the person in the human-area partitioning unit 110. In this case, a partitioning standard pattern is prepared in advance for each of postures, and a partitioning standard pattern is selected from the partitioning standard patterns according to the posture of the person transferred from the posture detecting section 27. Thereafter, the six human blocks is determined according to the partitioning standard pattern selected after a shape of the human-area is recognized according to a pattern recognition. Also, because the size of the human-area varies in dependence on a distance between the person and the infrared ray sensor 15, the size of the human-area is converted into a standardized size. Examples of the partitioning of the human-area are shown in FIGS. 21A, 21B. As shown in FIG. 21A, a human-area recording a standing person is partitioned into a human block Ba including a head portion, a human block Bb including a breast-abdomen portion, a human block Bc including a right arm-hand portion, a human block Bd including a left arm-hand portion, a human block Be including a waist-hip portion and a human block Bf including a leg-foot portion. The reason that the human-area is partitioned is that each of the human-blocks is independently covered or uncovered with clothes at a high possibility. Also, as shown in FIG. 21B, a human-area in which a person facing a left direction sits on a chair is partitioned into the human blocks Ba, Bb, Bd, Be and Bf because the right arm and hand of the person are covered.

Thereafter, an average temperature of each of the human blocks is calculated in the human block temperature calculating unit 111. In cases where a body portion is uncovered with any clothes, the average temperature of the human block pertaining to the body portion becomes high. Also, in cases where a body portion is covered with clothes, the average temperature of the human block pertaining to the body portion becomes low. Thereafter, the average temperatures are compared with a threshold temperature in the temperature comparing unit 112, and a part of the human blocks of which the average temperatures are higher than the threshold temperature are separated from the remaining part of the human blocks. The part of the human blocks correspond to uncovered body portions. Thereafter, a highest average temperature is selected from among the average temperatures of the part of the human blocks. That is, the higher a ratio of an uncovered body portion to a covered body portion in a human block, the higher an average temperature of the human block. Therefore, cases where an environment or a covered body portion is recorded on the same human block as that in which an uncovered body portion is recorded, the average temperature of the human block is lowered by the environment or the covered body portion. Accordingly, because the ratio of the uncovered body portion to the covered body portion in a human block having the highest average temperature is highest, the highest average temperature can be judged as a skin temperature.

Next, a detecting method for detecting the volume of person's clothes is described with reference to FIG. 22.

Figure 22:
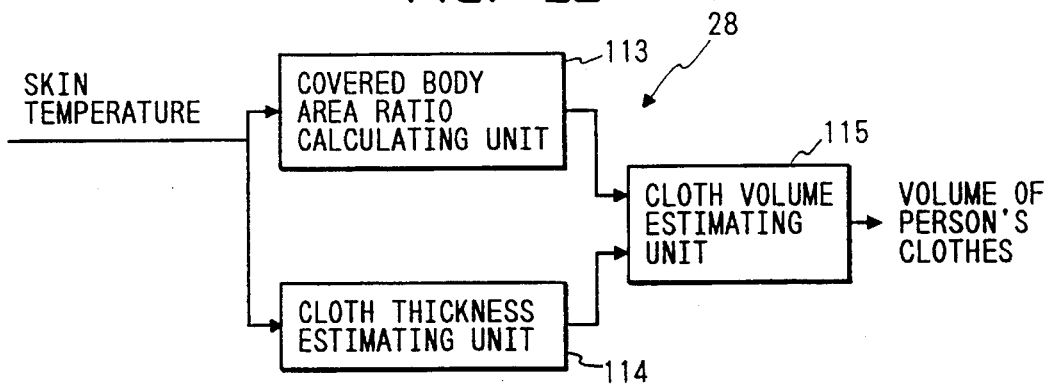
FIG. 22 is a block diagram of a cloth volume detecting section shown in FIG. 1.

FIG. 22 is a block diagram of the cloth volume detecting section 28.

As shown in FIG. 22, the cloth volume of a person in a human-area detected in the human-area detecting section 19 is calculated in the cloth volume detecting section 28. The cloth volume detecting section 28 comprises a covered body area ratio calculating unit 113 for calculating an area ratio of covered body portions of the person to uncovered body portions of the person by comparing the number of pixels in first human blocks corresponding to the uncovered body portions with the number of pixels in second human blocks corresponding to the covered body portions, a cloth thickness estimating unit 114 for estimating a thickness of person's clothes according to a difference in temperature between a group of first human blocks and a group of second human blocks, and a cloth volume estimating unit 115 for estimating a cloth volume of the person according to the area ratio calculated in the covered body area ratio calculating unit 113 and the thickness of person's clothes estimated in the cloth thickness estimating unit 114 and outputting a cloth value corresponding to the cloth volume.

In the above configuration, the first and second human blocks are determined in the skin temperature detecting section 29. The cloth volume of the person depends on the area ratio of the covered body portions to the uncovered body portions. Also, the cloth volume of the person depends on the thickness of the clothes at the covered body portions. The area ratio is calculated in the covered body area ratio calculating unit 113 by calculating a pixel number ratio of the covered body portions to the uncovered body portions. The thickness of person's clothes is estimated in the cloth thickness estimating unit 114 in which a difference in temperature between a group of first human blocks and a group of second human blocks is calculated. That is, in cases where the difference in temperature is large, the thickness of person's clothes is estimated to be thick. In contrast, in cases where the difference in temperature is smaller, the thickness of person's clothes is estimated to be thin. Thereafter, a cloth volume of the person is estimated according to the area ratio and the thickness of person's clothes in the cloth volume estimating unit 115. In this embodiment, a cloth value representing the cloth volume is output from the estimating unit 115.

The cloth value is defined as follows. In cases where a naked person is recorded on a human-area, the cloth value is equal to 0. In cases where a person having underpants is recorded on a human-area, the cloth value is equal to 0.1. In cases where a person having underpants and an undershirt is recorded on a human-area, the cloth value is equal to 0.3. In cases where a person recorded on a human-area dresses summer clothes composed of a shirt with half-length sleeves and shorts, the cloth value is equal to 0.5. In cases where a person recorded on a human-area dresses clothes for a light work composed of long-sleeved shirts and trousers, the cloth value is equal to 0.7. In cases where a person with a housedress in winter is recorded on a human-area, the cloth value is equal to 1.0. In cases where a person with a three-piece suit is recorded on a human-area, the cloth value is equal to 1.5. In cases where a person with an overcoat in winter is recorded on a human-area, the cloth value is equal to 3.0.

In the first embodiment, the cloth value is utilized to calculate a degree of comfortableness for the purpose of the adjustment of an air conditioner according to the cloth value. However, in cases where a degree of comfortableness is calculated by utilizing the area ratio of the covered body portions to the uncovered body portions and temperatures of person's clothes, it is available that the area ratio and the temperatures of person's clothes be directly output from the cloth volume estimating unit 115 to calculate the degree of comfortableness.

Also, in cases where a neural network preliminarily learns a relationship between the volume of person's clothes and pieces of character data utilized to detect the volume of person's clothes, it is available that the cloth value be calculated in the neural network.

Next, the environmental characteristic data extracting section 23 is described.

Figure 23:
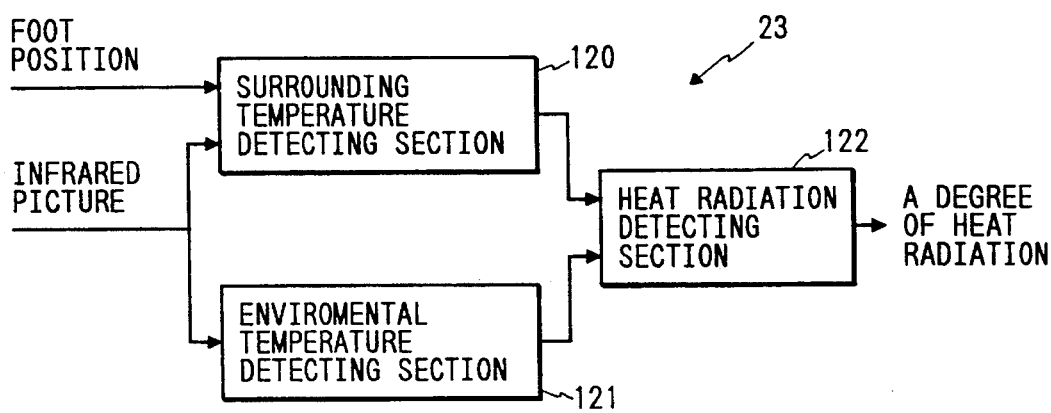
FIG. 23 is a block diagram of an environmental information extracting section shown in FIG. 1.

FIG. 23 is a block diagram of the environmental characteristic data extracting section The environmental characteristic data extracting section 23 is not necessarily required for the picture processing apparatus 11. As shown in FIG. 23, the environmental characteristic data extracting section 23 comprises a surrounding temperature detecting section 120 for detecting a surrounding temperature in dependence on temperatures of neighboring pixels placed in the neighborhood of a foot position of the person according to the infrared picture Pif and the position of person's feet estimated in the foot position estimating unit 81 shown in FIG. 11, an environmental temperature detecting section 121 for detecting an average temperature of each of environmental blocks defined by partitioning a floor and walls according to the infrared picture Pif, and a heat radiation detecting section 122 for detecting a degree of heat radiation directed from the neighboring pixels and the environmental blocks to a person recorded on a human-area according to the surrounding temperature, the average temperatures of the environmental blocks and the position of person's feet estimated in the foot position estimating unit 81.

In the above configuration, the surrounding temperature detecting section 120 is initially described. In the section 20, a surrounding temperature of a floor surface placed in the neighborhood of a position of person's feet is easily detected with high accuracy. In cases where the detection of the surrounding temperature is tried, there are two troubles. That is, it is difficult to distinguish the floor surface from other environments. Also, it is required to specify the floor surface placed in the neighborhood of the position of person's feet because temperatures of the floor surface are not uniform. In the first embodiment, the position of person's feet is estimated in the foot position estimating unit 81, and the floor surface placed in the neighborhood of the position of person's feet is specified because a radiation influence of the floor surface on the person recorded on the human-area is comparatively large.

Figure 24:
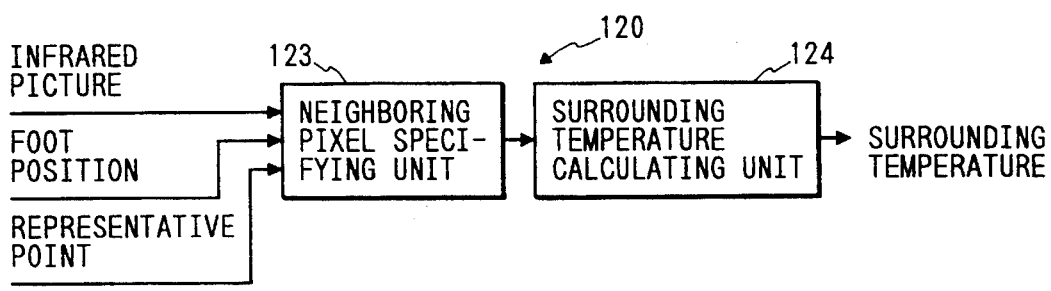
FIG. 24 is a block diagram of a surrounding temperature detecting section shown in FIG. 23.

FIG. 24 is a block diagram of the surrounding temperature detecting section 120.

As shown in FIG. 24, the surrounding temperature detecting section 120 comprises a neighboring pixel specifying unit 123 for specifying the neighboring pixels placed in the neighborhood of the position of person's feet, and a surrounding temperature calculating unit 124 for calculating the surrounding temperature according to the temperatures of the neighboring pixels. The surrounding temperature calculating unit 124 can be operated according to an argorism method, a statistical processing method or a neural network method. In the first embodiment, the unit 124 is composed of a multilayer type of perceptron operated according to the neural network method.

In the above configuration, the position of person's feet, a representative point of the human-area calculated in the representative point calculating section 43 and the infrared picture Pif are input to the neighboring pixel specifying unit 123. In the unit 123, four neighboring pixels nearest to the position of person's feet are picked out from the infrared picture Pif as the neighboring pixels. Thereafter, the temperature of the neighboring pixels, positions of the neighboring pixels, a temperature of a pixel at the position of person's feet and the position of person's fleet are input to the multilayer type of perceptron of the surrounding temperature calculating unit 124. In this case, a piece of teaching data designating an actually measured temperature in the neighborhood of the neighboring pixels and pieces of input data pertaining to positions and temperatures the neighboring pixels and the pixel at the position of person's feet are preliminarily input to the multilayer type of perceptron for the purpose of the learning of the perceptron according to the back-propagation method. Accordingly, the surrounding temperature depending on the temperatures of the neighboring pixels in the neighborhood of the position of person's feet can be easily obtained with high accuracy in the surrounding temperature detecting section 120. In the first embodiment, the multilayer type of perceptron is utilized. However, it is applicable that an LVQ type of neural network be utilized.

Figure 25:
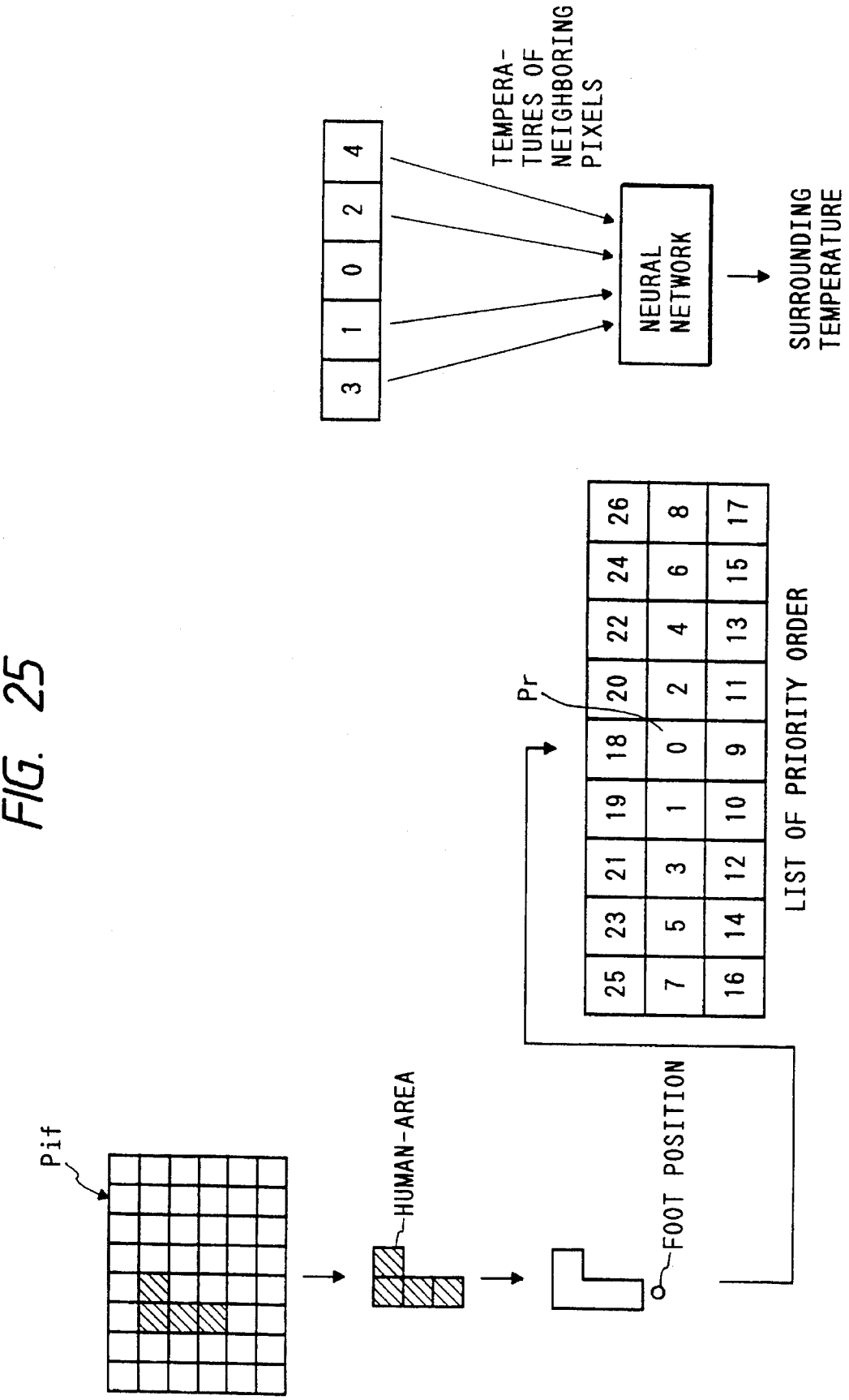
FIG. 25 shows a procedure of operations performed in the surrounding temperature detecting section as an example.

FIG. 25 shows a procedure of operations performed in the surrounding temperature detecting section 120 as an example.

As shown in FIG. 25, a reference pixel Pr placed at a position of person's feet of a person who is recorded on a human-area picked out from the infrared picture Pif is detected. Thereafter, four neighboring pixels are picked out from the infrared picture Pif in priority order because it is required to fix the number of the input data input to the perceptron. The priority order is listed in FIG. 25. In detail, in cases where the reference pixel Pr is placed in a central portion of the infrared picture Pif, two pixels (a first-order pixel and a third-order pixel) placed in a left direction of the reference pixel Pr and other two pixels (a second-order pixel and a fourth-order pixel) placed in a right direction of the reference pixel Pr are picked out as the four neighboring pixels. In cases where the reference pixel Pr is placed in a side portion of the infrared picture Pif or in cases where another human-area is adjacent to the reference pixel Pt, other pixels such as a fifth-order pixel or a sixth-order pixel are picked out as the four neighboring pixels. Thereafter, pieces of input data pertaining to the four neighboring pixels are input to the perceptron to calculate the surrounding temperature.

In the first embodiment, the surrounding temperature depending on the temperatures of the neighboring pixels are detected in the perceptron. However, it is applicable that an average temperature of the temperatures of the four neighboring pixels be adopted as a surrounding temperature depending on the temperatures of the neighboring pixels. In this case, the procedure for determining the surrounding temperature can be simplified.

Next, the environmental temperature detecting section 121 is described.

A position of a boundary line between a floor and a wall can be preliminarily calculated in cases where pieces of environmental information pertaining to a position of the two-dimensional infrared ray sensor 15 and an area of a room are obtained. In the first embodiment, pieces of environmental information pertaining to a position of the air conditioner 32 and an area of a room are input to the environmental temperature detecting section 121 in advance, and boundary pixels placed at the boundary lines are calculated. Thereafter, the floor F1, the left wall W1, the back wall W2 and the right wall W3 which each are surrounded by the boundary pixels are determined. Thereafter, each of the walls and floor is partitioned into a plurality of environmental blocks because each of the walls and floor has a temperature distribution according to the influence of a heat-generating body, temperature conditions of a neighboring room, a solar radiation and the like. Thereafter, average temperatures of the environmental blocks are calculated.

Figure 26A:
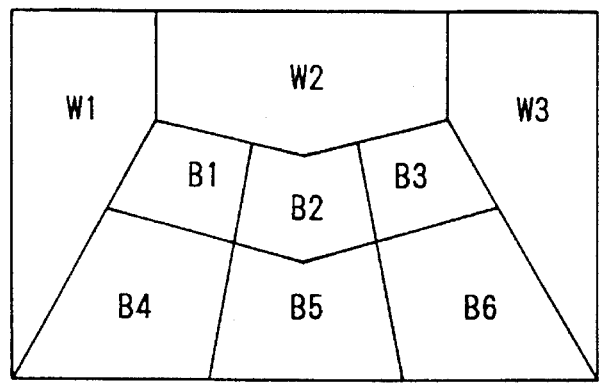
FIG. 26A shows a sight view of a room on condition that an air conditioner shown in FIG. 2B is placed at a central portion of a front wall.
Figure 26B:
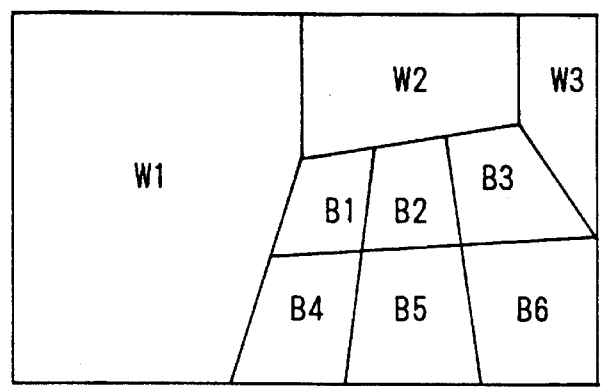
FIG. 26B shows a sight view of a room on condition that the air conditioner is placed at a light portion of the front wall.

FIG. 26A shows a sight view of a room on condition that the air conditioner 32 is placed at a central portion of the front wall. FIG. 26B shows a sight view of a room on condition that the air conditioner 32 is placed at a light portion of the front wall.

As shown in FIGS. 26A, 26B, the floor F1 is partitioned into six environmental blocks B1 to B6 according to the environmental information. Accordingly, the boundary pixels can be determined, and the floor F1 can be partitioned according to its temperature distribution.

Next, the heat radiation detecting section 122 is described.

In the section 122, a degree of heat radiation from the neighboring pixels specified in the specifying unit 123 and the environmental blocks defined in the detecting section 121 to a person is calculated to estimate the heat radiation to the person standing or sitting on the floor F1. The influence of the radiation is conventionally considered to control an air conditioner or a heating apparatus, and a surface temperature of a floor is measured to estimate the influence of the heat radiation. However, in cases where the outside of a room is heated, the influence of the heat radiation from a window or a wall of the room to a person is comparatively large. Therefore, it is required to estimate the influence of heat radiation from the floor and walls to the person. Also, physical properties of the floor and walls pertaining to the heat radiation differ from each other, and radiation directions from the environmental blocks to the person differ from each other. Therefore, it is required to consider the radiation directions for the purpose of precisely estimating the influence of heat radiation from each of the environmental blocks to the person.

Figure 27:
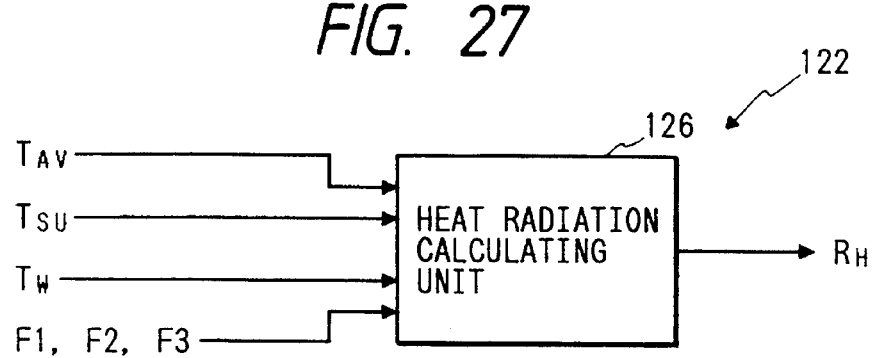
FIG. 27 is a block diagram of a heat radiation detecting section shown in FIG. 23.

FIG. 27 is a block diagram of the heat radiation detecting section 122.

As shown in FIG. 27, the heat radiation detecting section 122 comprises a heat radiation calculating unit 126 for calculating a degree of heat radiation of the neighboring pixels and the environmental blocks to estimate the heat radiation directed to the person recorded on the human-area according to the surrounding temperature detected in the detecting section 120 and the average temperatures of the environmental blocks detected in the environmental temperature detecting section 121.

In the heat radiation calculating unit 126, the average temperatures $T_{AV}$ of the environmental blocks, the surrounding temperature $T_{SU}$ and a wall average temperature $T_W$ of the walls W1, W2, W3 are weighted by geometric factors F1(i), F2(j), F3, and a degree $R_H$ of heat radiation is calculated for each of persons recorded on the human-areas which are picked out from the infrared picture Pif according to an equation.

$$R_H = \left( \sum_{i=1}^{N1} F1*G*T_{AV} + \sum_{j=1}^{N2} F2*G*T_{SU} + F3*G*T_W \right) / (N1*F1 + N2*F2 + F3)$$

Here each of the geometric factors F1(i), F2(j), F3 depends on a distance between a person and an environmental block, a distance between a person and a neighboring pixel, an average distance between a person and a wall, a radiating direction from an environmental block to a person, a radiating direction from a neighboring pixel to a person, an average radiating direction from a wall to a person, and physical properties of the floor and walls, a symbol G is a temperature-to-heat radiation conversion factor, the number N1 denotes the number of environmental blocks, and the number N2 denotes the number of neighboring pixels.

Accordingly, the degree $R_H$ of heat radiation can be calculated in the heat radiation detecting section 122 to estimate the influence of the heat radiation to each of the persons.

In the first embodiment, the entire floor is partitioned to define the environmental blocks. However, it is applicable that a part of the floor be limitedly partitioned to define the environmental blocks according to a position of a person in the room.

Next, the environmental characteristic data extracting section 23 according to a modification of the first embodiment is described.

Figure 28:
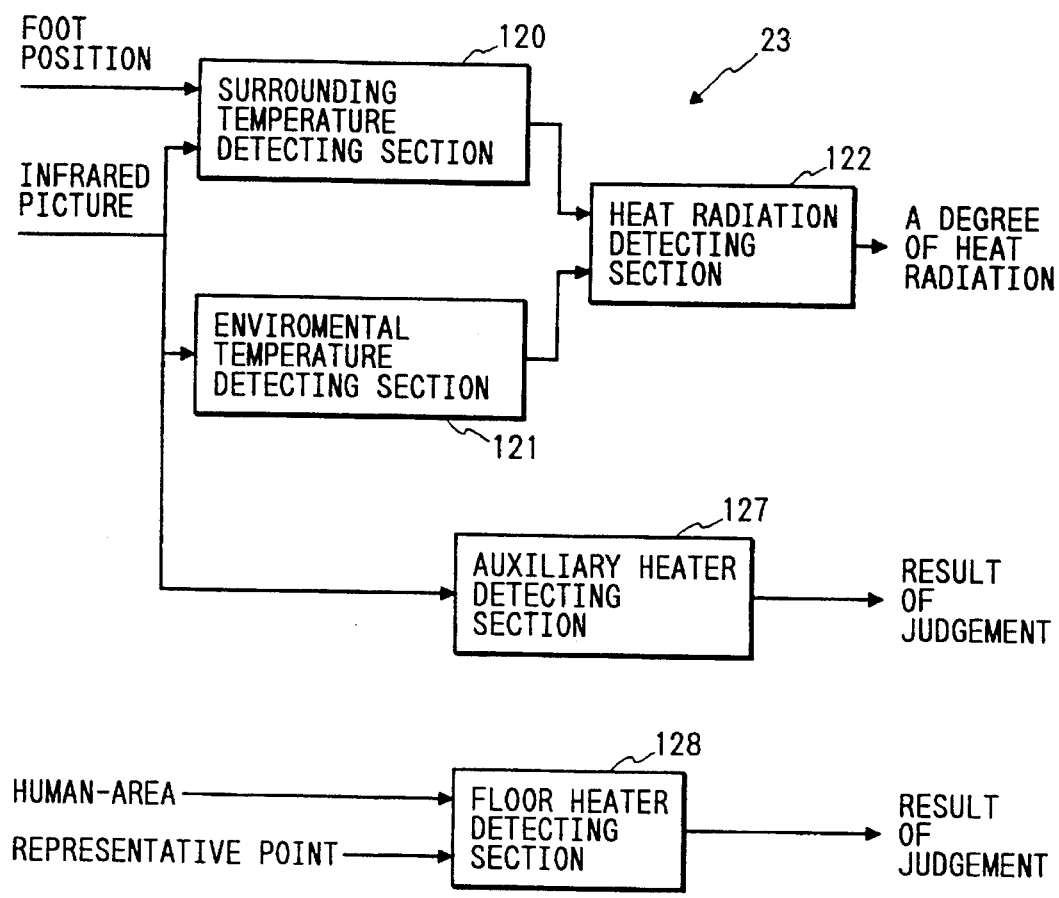
FIG. 28 is a block diagram of an environmental information extracting section shown in FIG. 1 according to a modification of the first embodiment.

FIG. 28 is a block diagram of the environmental characteristic data extracting section 23 according to a modification of the first embodiment.

As shown in FIG. 28, the environmental characteristic data extracting section 23 comprises the foot position temperature detecting section 120, the environmental temperature detecting section 121, the heat radiation detecting section 122, an auxiliary heater detecting section 127 for detecting an auxiliary heater such as a combustion or electric heating type of stove, oil space heater or the like, floor heater detecting section 128 for detecting a floor heater or an electric carpet.

In the above configuration, because a temperature of a auxiliary heater is higher than that of a person, it is judged in the auxiliary heater detecting section 127 whether or not a temperature of a pixel is higher than a threshold temperature which is higher than the temperature of the person. In cases where the temperature of the pixel is higher than the threshold, it is judged that the pixel belong to a group of auxiliary heater pixels in which the auxiliary heater is recorded. In contrast, because a temperature of a floor heater or an electric carpet is almost the same as that of a person, group of floor heater pixels in which the floor heater or the electric carpet is recorded is erroneously detected as a human-area in the human-area detecting section 19, and the group of floor heater pixels is not detected in the auxiliary heater detecting section 127. However, the size of the group of floor heater pixels is considerably larger than that of a human-area in which one or more persons are really recorded, and the group of floor heater pixels is in a rectangular shape. Therefore, it is judged in the floor heater detecting section 128 whether or not a size of a human-area detected in the human-area detecting section 19 is larger than a threshold. Also, it is judged in the floor heater detecting section 128 whether or not the human-area is almost in a rectangular shape. In cases where the size of the human-area is larger than the threshold on condition that the human-area is almost in a rectangular shape, the human-area is regarded as the group of floor heater pixels.

Accordingly, the auxiliary heater or the floor heater can be detected as a piece of environmental information. That is, the influence of heat transfer from a floor surface resulting from a floor heater and the influence of high heat radiation resulting from a stove can be estimated, and the influence on comfortableness can be corrected. Also, in cases where a floor heater or an auxiliary heater is detected, the air conditioner 32 can be adjusted to suppress its driving power for the purpose of saving the electric power.

In the above embodiment, the size and shape of a group of pixels are checked to judge whether the group of pixels designates a floor heater. However, because the temperature of the floor heater is constant in point of time, it is applicable that a group of pixels be judged to be a floor heater in cases where the temperature of the group of pixels is constant in point of time for a regular interval.

Next, another picture processing section obtained by modifying the picture processing section 16 according to a modification of the first embodiment is described with reference to FIG. 29.

Figure 29:
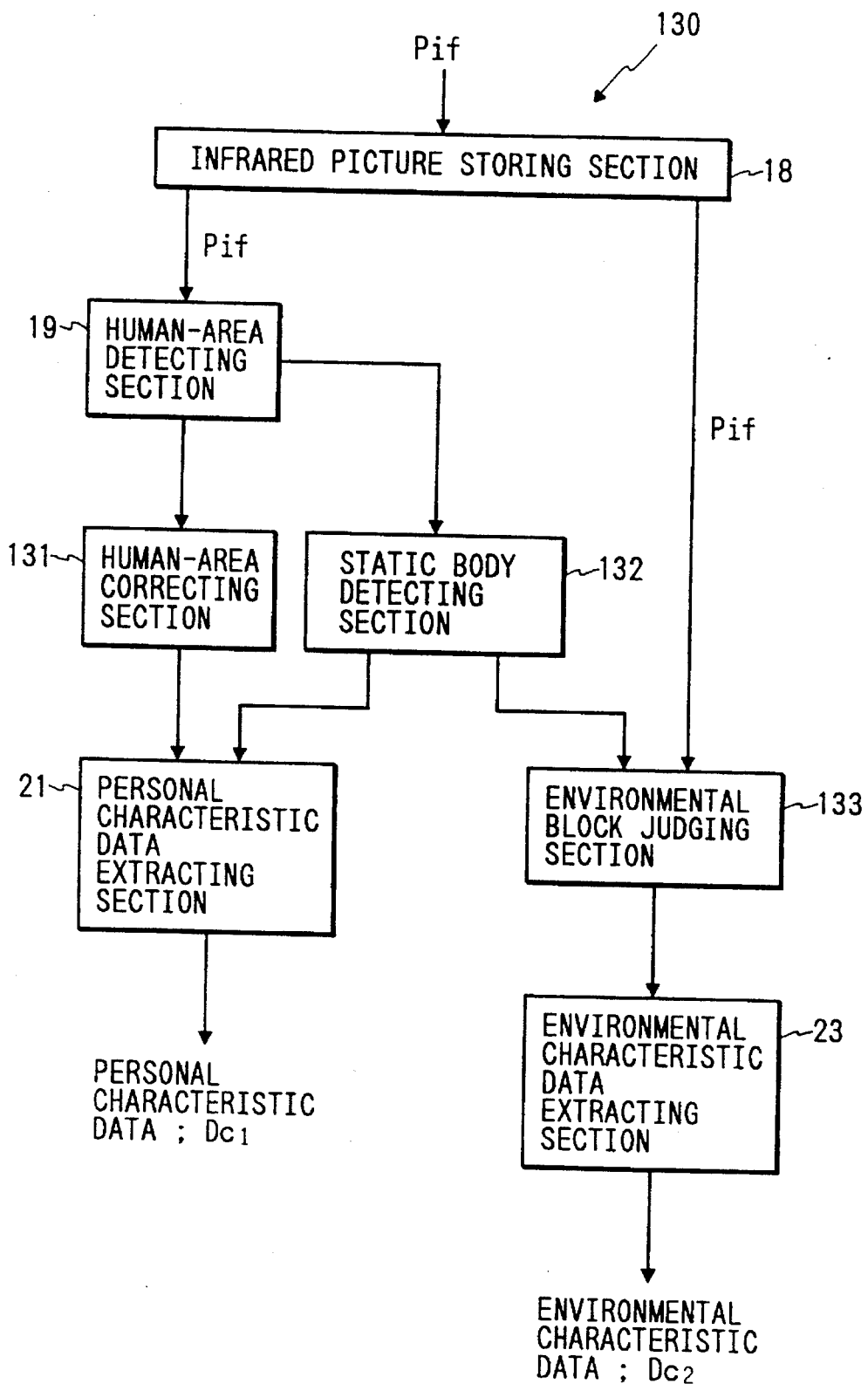
FIG. 29 is a block diagram of another picture processing section according to a modification of the first embodiment.

FIG. 29 is a block diagram of another picture processing section according to a modification of the first embodiment.

As shown in FIG. 29, another picture processing section 130 comprises the infrared picture storing section 18, the human-area detecting section 19, a human-area correcting section 131 for correcting a plurality of human-areas erroneously divided in the human-area detecting section 19 by unifying the human-areas to a unified human-area, a static body detecting section 132 for accumulating representative points of the human-areas calculated in the representative point calculating section 43 of the human-area detecting section 19 to find out a group of pixels pertaining to a static body erroneously picked out as a human-area and detect representative points of environments such as the floor and walls, an environmental block judging section 133 for judging a moving area in which one or more persons move around to recognize environments such as a floor and walls, the personal characteristic data extracting section 21, and the environmental characteristic data extracting section 23.

In the above configuration, the human-area correcting section 131 is initially described.

In the human-area detecting section 19, a group of pixels recording a person is regarded as a human-area in cases where temperatures of the pixels are within a prescribed range. However, because the temperatures of the pixels depend on the volume of person's clothes, there is a probability that temperatures of a part of pixels are out of the prescribed range even though a person is actually recorded on the pixels. In this case, a group of pixels to be picked out as a human-area is erroneously divided and regarded as a plurality of human-areas. Therefore, a plurality of human-areas erroneously divided in the human-area detecting section 19 are unified to a unified human-area in the human-area correcting section 131.

Figure 30A:
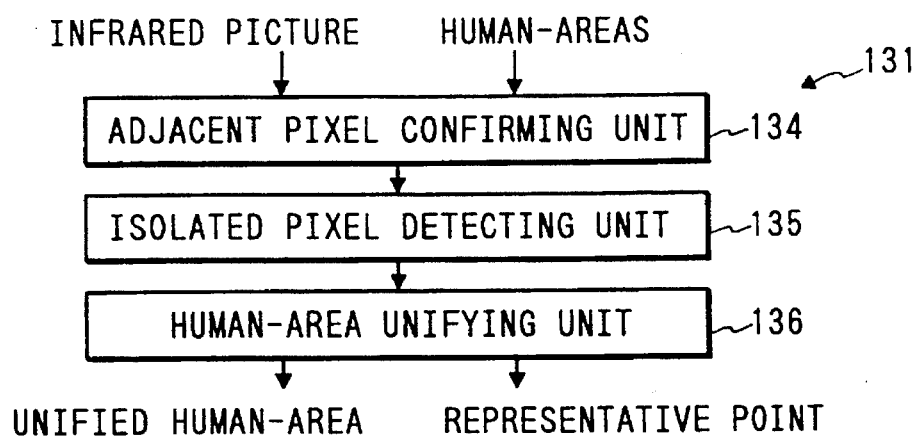
FIG. 30A is a block diagram of a human-area correcting section shown in FIG. 29.

FIG. 30A is a block diagram of the human-area correcting section 131.

As shown in FIG. 30A, the human-area correcting section 131 comprises an adjacent pixel confirming unit 134 for confirming whether or not each of pixels in the human-areas is adjacent to a pixel of a human-area and outputting a piece of connecting information designating a result of the confirmation for each of the pixels, an isolated pixel detecting unit 135 for detecting one or more isolated pixels which each are not adjacent to any pixel of the human-areas by referring to the connecting information and outputting a piece of isolated pixel information designating each of the isolated pixels for each of the isolated pixels, a human-area unifying unit 136 for confirming whether or not each of the isolated pixels of the human-areas faces an associated pixel of a human-area at one-pixel space and unifying a human-area of an isolated pixel facing an associated pixel and another human-area of the associated pixel to form a unified human-area.

Figures 30B, 30C, 32A, 32B:
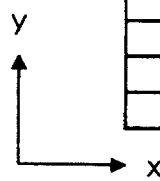
FIG. 30B shows a human-pixel Ph placed in a human-area and eight pixels P1 which surround and is adjacent to the human-pixel Ph.
FIG. 30C shows an isolated-pixel Ph placed in a human-area and sixteen pixels P2 surrounding the isolated pixel Pi at one-pixel space.
FIG. 32A shows a distribution in frequencies S(x,y) of representative points in cases where the number of infrared pictures processed is one hundred and twenty.
FIG. 32B shows a list of static bodies in which the numbers of the static bodies and coordinates (x,y) of the static bodies are shown.

In above configuration, a plurality of human-areas detected in the human-area detecting section 19 is input to the adjacent pixel confirming unit 134. In the confirming unit 134, as shown in FIG. 30B, eight pixels P1 which surround and is adjacent to each of human-pixels Ph of the human-areas are picked out, and it is confirmed whether or not at least one of the pixels P1 belongs to the same human-area as that of the human-pixel Ph. Thereafter, pieces of connecting information designating results of the confirmation are transferred to the isolated pixel detecting unit 135. In the detecting unit 135, cases where any pixel P1 does not belong to the same human-area as that of the human-pixel Ph, the human-pixel Ph is regarded as an isolated pixel Pi. Thereafter, a piece of isolated pixel information designating the isolated pixel Pi is transferred to the unifying unit 136. In the unifying unit 136, as shown in FIG. 30C, sixteen pixels P2 surrounding the isolated pixel Pi at one-pixel space are picked out, and it is confirmed whether or not at least one of the pixels P2 belongs to a human-area. Thereafter, in cases where one or more pixels P2 belong to one or more human-areas, the human-areas pertaining to the pixels P2 and the human-area pertaining to the isolated pixel Pi are unified to form a unified human-area. Thereafter, a representative point of the unified human-area is calculated in the same manner as in the representative point calculating section 43. In contrast, in cases where any pixel P2 does not belong to a human-area, it is regarded that the isolated pixel Pi does not belong to any human-area.

Accordingly, even though a group of pixels to be picked out as a human-area is erroneously divided and regarded as a plurality of human-areas, the human-areas can be correctly unified to a unified human-area.

Also, even though a human-area composed of a single pixel is picked out by erroneously regarding a heater or a noise as a person, the human-area erroneously picked out can be deleted because a human-area of the isolated pixel Pi surrounded by the pixels P2 not belonging to any human-area is cancelled.

In the first embodiment, in cases where a pixel P2 surrounding an isolated pixel Pi belongs to a human-area, it is regarded that the human-area of the pixel P2 is the same as that of the isolated pixel Pi. However, in cases where a person is placed far from the infrared ray sensor 15, there is a probability that the person is limitedly recorded on the isolated pixel Pi. Therefore, in cases where it is judged that a person recorded on an isolated pixel Pi is placed far from the infrared ray sensor 15, it is preferred that a human-area of the isolated pixel Pi and another human-area of a pixel P2 be not unified.

Next, the static body detecting section 132 is described.

cases where an infrared picture signal Pif cannot be accurately recognized, it is difficult to detect pieces of information included in the infrared picture Pif pertaining to one or more persons and environments. However, in cases where the movement of each of the persons is detected from a series of infrared pictures Pif stored in the storing section 18 one after another, the information pertaining to the persons and environments can be easily detected by relating the information to the movements of the persons. Therefore, the information pertaining to the persons and environments are detected in the static body detecting section 132 by relating the information to the movements of the persons with a series of infrared pictures Pif stored in the storing section 18.

Figure 31:
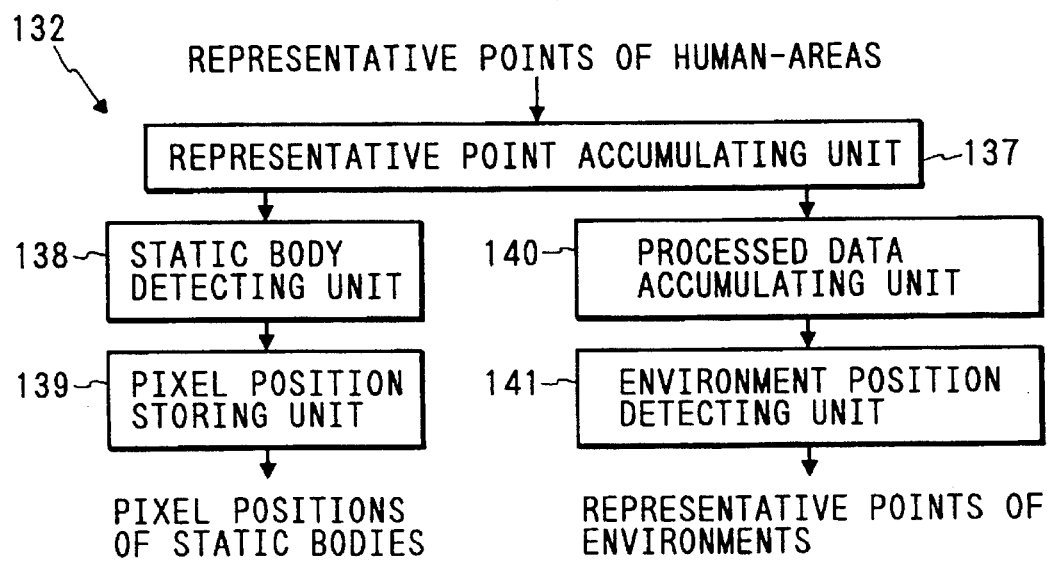
FIG. 31 is a block diagram of a static body detecting section shown in FIG. 29.

FIG. 31 is a block diagram of the static body detecting section 132.

As shown in FIG. 31, the static body detecting section 132 comprises a representative point accumulating unit 137 for accumulating a plurality of representative points of the human-areas picked out from a series of infrared pictures Pif(i) (i=1,2, - - - ,M) in the human-area detecting section 19 to store a frequency S(x,y) of the representative points for each of pixels and outputting the frequencies S(x,y) and pieces of positional information designating pixel positions (x,y) of the representative points in a pixel, a static body detecting unit 138 for detecting a static body distinguished from a moving body such as a person according to the frequencies S(x,y), a pixel position storing unit 139 for storing a pixel position of the static body according to a piece of positional information relating to the moving body, a processed data accumulating unit 140 for accumulating pieces of processed data obtained by processing the representative points accumulated in the representative point accumulating unit 137, and an environment position detecting unit 141 for detecting positions of the infrared ray sensor 15 and environments such as the floor F1 according to the processed data accumulated in the processed data accumulating unit 140.

In the above configuration, a plurality of representative points obtained from each of infrared pictures Pif(i) (i=1,2, - - - ,M) in the human-area detecting section 19 are accumulated in the representative point accumulating unit 137. In the accumulating unit 137, a frequency S(x,y) of the representative points is stored in each of the pixel positions (x,y). For example, as shown in FIG. 32A, frequencies S(x,y) of the representative points are stored in case of M=120. After the frequencies S(x,y) of the representative points obtained from all of the infrared pictures Pif(i) are formed, the frequencies S(x,y) and pieces of positional information designating coordinates (x,y) are transferred to the static body detecting unit 138. In cases where a group of pixels pertaining to a static body placed at coordinates (x1,y1) in the infrared pictures Pif(i) is erroneously detected as a human-area, a frequency (x1,y1) of representative points corresponding to the static body is higher than that corresponding to a person because the static body does not move. In the detecting unit 138, one or more static bodies are distinguished from one or more persons by judging the frequencies S(x,y). Thereafter, the positional information pertaining to the static bodies distinguished in the detecting unit 138 are transferred to the pixel position storing unit 139. In the storing unit 139, the positional information designating pixel positions of the static bodies are stored.

Also, the frequencies S(x,y) are transferred to the processed data accumulating unit 140 and are processed to pieces of processed data as described hereinafter. The processed data are stored in the accumulating unit 140, and the frequencies S(x,y) stored in the accumulating unit 137 are deleted to initialize the accumulating unit 137. That is, the operation in the accumulating unit 137 is repeated. Thereafter, the processed data are transferred to the environment position detecting unit 141, and the processed data stored in the accumulating unit 140 are deleted to initialize the accumulating unit 140. That is, the operation in the accumulating unit 140 is repeated. In the detecting unit 141, positions of the environments like the infrared ray sensor 15, the floor F1 and the walls W1, W2, W3 and the volume of the room are calculated.

Next, the operation in the static body detecting unit 138 described in detail.

In the detecting unit 138, the frequencies S(x,y) are compared with a threshold TH1. For example, the threshold TH1 is set to 100 in case of M=120. In cases where a frequency S(x,y) is higher than the threshold TH1, the coordinates (x,y) are stored in the storing unit 139 to form a list of static bodies as shown in FIG. 32S. In this case, because a static body does not move, a frequency S(x,y) of representative points pertaining to the static body placed at coordinated (x,y) becomes high. Therefore, in cases where a frequency S(x,y) is near to the value M, a body recorded on a pixel at coordinates (x,y) is regarded as a static body (for example, a stove or an electric carpet) erroneously detected as a person the human-area detecting section 19.

Next, the operation for producing the processed data from the frequencies S(x,y) stored in the accumulating unit 137 and storing the processed data in the accumulating unit 140 is described.

In the accumulating unit 140, the frequencies S(x,y) are compared with a threshold TH2. In cases where a frequency S(x,y) is higher than the threshold TH2, as shown in FIG. 33, a value of 1 is written at coordinates (x,y) of the accumulating unit 140 as a piece of processed data G(x,y). In contrast, in cases where a frequency S(x,y) is not higher than the threshold TH2, a value of 0 is written at coordinates (x,y) of the accumulating unit 140 as a piece of processed data G(x,y). The comparison with the threshold TH2 is performed to cancel a human-area erroneously detected as a person. Therefore, the processed data G(x,y) are written at all of the coordinates (x,y) of the accumulating unit 140. That is, positions of pixels on which one or more persons are recorded are set to 1, and positions of pixels on which any person is not recorded are set to 0.

Next, the environment position detecting unit 141 is described with reference to FIGS. 34 and 35.

Figure 34:
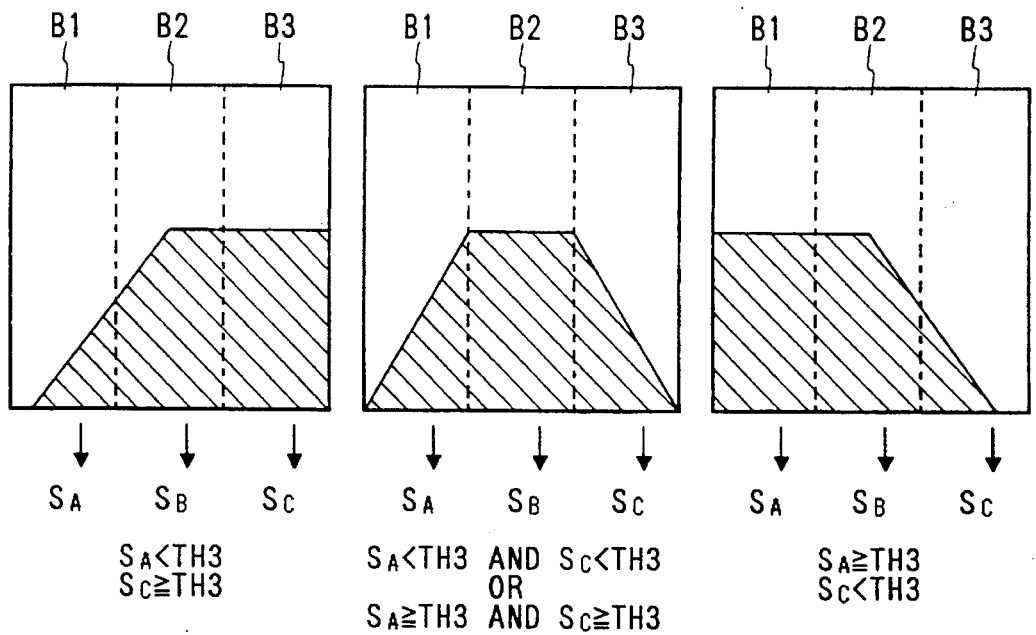
FIG. 34 shows a procedure for judging whether an infrared ray sensor shown in FIG. 1 is placed at a left side, a center or a right side of a front wall.

FIG. 34 shows a procedure for judging whether the infrared ray sensor 15 is placed at a left side, a center or a right side of the front wall.

As shown in FIG. 34, the coordinates (x,y) of the accumulating unit 140 are partitioned into a left block B1, a central block B2 and a right block B3. Thereafter, the processed data G(x,y) placed in the coordinates (x,y) are summed for each of blocks B1, B2, B3. The sum of the processed data G(x,y) in the left block B1 is represented by $S_A$, the sum of the processed data G(x,y) in the central block B2 is represented by $S_B$, and the sum of the processed data G(x,y) in the right block B3 is represented by $S_C$. In this case, because one or more persons are placed on the floor F1, the processed data G(x,y) are set to 1 at a high probability in a area of the floor F1, and the processed data G(x,y) are set to 0 at a high probability in areas of the walls W1, W2, W3. Thereafter, it is judged whether the infrared ray sensor 15 is placed at a Left side, a center or a right side of the front wall. In detail, in cases where a relationship $S_A<TH3$ and a relationship $S_C \geq TH3$ are satisfied, it is judged that the infrared ray sensor 15 is placed at a left side of the front wall because an area of the left wall W1 is larger than that of the right wall W3. In cases where relationships $S_A<TH3$ and $S_C<TH3$ or relationships $S_A>TH3$ and $S_C>TH3$ are satisfied, it is judged that the infrared ray sensor 15 is placed at a center of the front wall because an area of the left wall W1 is almost the same as that of the right wall W3. In cases where a relationship $S_a>TH3$ and a relationship $S_C<TH3$ are satisfied, it is judged that the infrared ray sensor 15 is placed at a right side of the front wall because an area of the right wall W3 is larger than that of the left wall W1.

Figure 35:
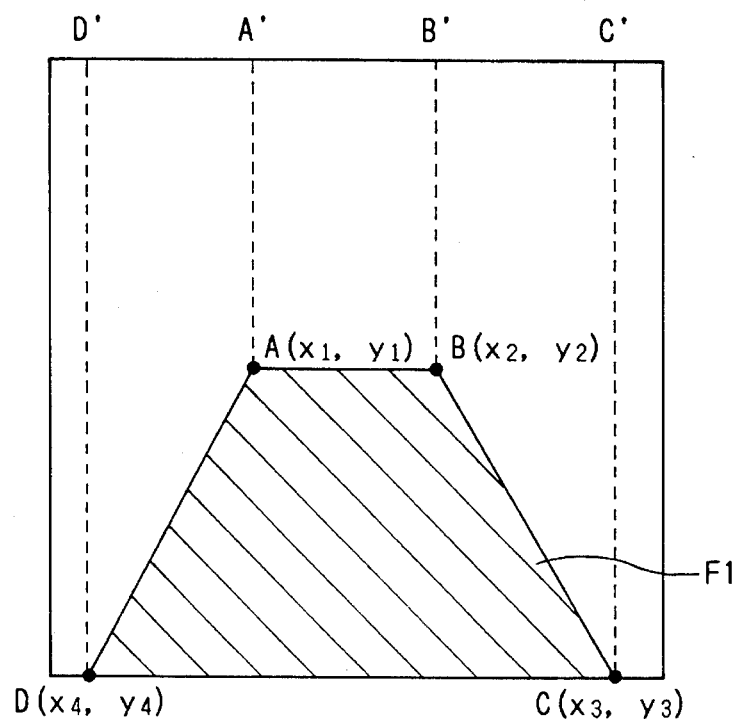
FIG. 35 shows a floor F1 observed from the infrared ray sensor to explain a procedure for detecting four corner points A, B, C and D of the floor F1 as four representative points of the floor F1.

FIG. 35 shows the floor F1 observed from the infrared ray sensor 15 to explain a procedure for detecting four corner points of the floor F1 as four representative points of the floor F1.

Because one or more persons walk around on the floor F1, the floor F1 is specified as an area in that the processed data G(x,y) are set to 1. In cases where the floor F1 is in a rectangular shape, four corner points A(x1,y1), B(x2,y2), C(x3,y3) and D(x4,y4) of the floor F1 are detected as shown in FIG. 35. Because the area of the floor F1 is specified by the corner points A(x1,y1), B(x2,y2), C(x3,y3) and D(x4,y4), the corner points can be treated as representative points of the floor F1. Also, even though the floor F1 is not in a rectangular shape, a plurality of representative points of the floor F1 can be specified. Also, a plurality of representative points of the walls W1, W2, W3 are specified in the same manner. In addition, the volume of the room is specified.

Accordingly, representative points of environments such as the floor F1, the walls W1, W2, W3 can be detected.

In the above embodiment, a plurality of representative points of the human-areas picked out from the infrared pictures Pif(i) are processed in the static body detecting section 132. However, even though a plurality of visible pictures are stored in the storing section 18, the human-areas can be recognized by detecting edges, boundary lines and/or visible colors of one or more persons. Therefore, a position of a static body erroneously detected as a person and representative points of environments can be detected in the static body detecting section Next, the environmental block judging section 133 is described.

In the judging section 133, a block surrounded by the representative points A(x1,y1), B(x2,y2), C(x3,y3) and D(x4,y4) shown in FIG. 35 is judged as the floor F1, a block surrounded by the representative points A(x1,y1), D(x4,y4), D' and A' shown in FIG. 35 is judged as the left wall W1, a block surrounded by the representative points A(x1,y1), B(x2,y2), B' and A' is judged as the back wall W2, and a block surrounded by the representative points B(x2,y2), C(x3,y3), C' and B' is judged as the right wall W3. The above judgements are performed according to the representative points of the environments detected in the static body detecting section 132.

Next, a picture processing apparatus according to a second embodiment of the present invention is described.

Figure 36:
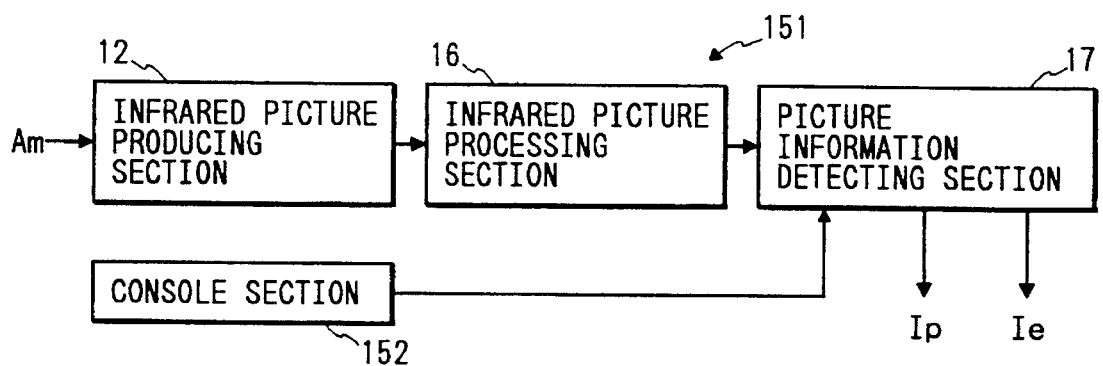
FIG. 36 is a block diagram of a picture processing apparatus according to a second embodiment of the present invention.

FIG. 36 is a block diagram of a picture processing apparatus according to a second embodiment.

As shown in FIG. 36, a picture processing apparatus 151 comprises the infrared picture producing section 12, the picture processing section 16, the picture information detecting section 17, and a console section 152 for receiving pieces of various information input to the detecting section 17. The various information received in the console section 152 is utilized to correct the personal information such as the number of persons, a position of person's feet, a posture of a person, the volume of person's clothes and a skin temperature of a person and the environmental information obtained in the picture information detecting section 17. For example, in cases where the infrared ray sensor 15 is attached on a front wall at a prescribed height to look out over the room before n heat distribution of the room is recorded on the infrared picture Pif, it is difficult to detect the positions of the walls W1, W2, W3 according to the infrared picture Pif. To avoid this problem, the distances between the walls W1, W2, W3 and the infrared ray sensor 15 are input to the console section 152 as the various information. Therefore, in cases where an assumed distance judged in the position judging unit 104 or 105 shown in FIG. 18 is larger than an input distance between the back wall W2 and the infrared ray sensor 15 received in the console section 152, the assumed distance is decreased to the input distance to correct the assumed distance. That is, a scanned body recorded at the assumed distance can be, for example, regarded as a heat-generating body attached on the back wall W3. Also, because a temperature distribution at a wall can be accurately measured by correcting the distance between the wall and the infrared ray sensor 15, the influence of a warmed wall on comfortableness for a person of which the distance is judged in the position judging unit 104 or 105 can be accurately estimated.

Next, a picture processing apparatus according to a third embodiment of the present invention is described.

A picture processing apparatus with a visible camera has been utilized for a monitoring system. In the monitoring system, an operator always observes a visible picture displayed on an image plane because it is difficult to automatically recognize one or more persons displayed on the visible picture. However, a detecting technique of a moving body from a visible picture has been put to practical use. The reason is as follows. A signal/noise ratio in the visible picture has been improved, so that it is easy to detect a moving body from the visible picture by estimating differences between visible pictures displayed in series in point of time. However, there is another problem that it is difficult to accurately extract a person from moving bodies. Also, even though a person can be extracted from the moving bodies, it is impossible to detect the person in cases where the person does not move so much. In contrast, it is easy to detect a person recorded in a infrared picture as one of types of heat-generating bodies. However, because various heat-generating bodies other than a person are detected in the infrared picture, it is difficult to extract a person from the heat-generating bodies. Therefore, in the third embodiment, a detecting technique of a moving body in a visible picture and another detecting technique of a heat-generating body in a infrared picture are utilized to accurately detect pieces of person's information and environment's information.

Figure 37:
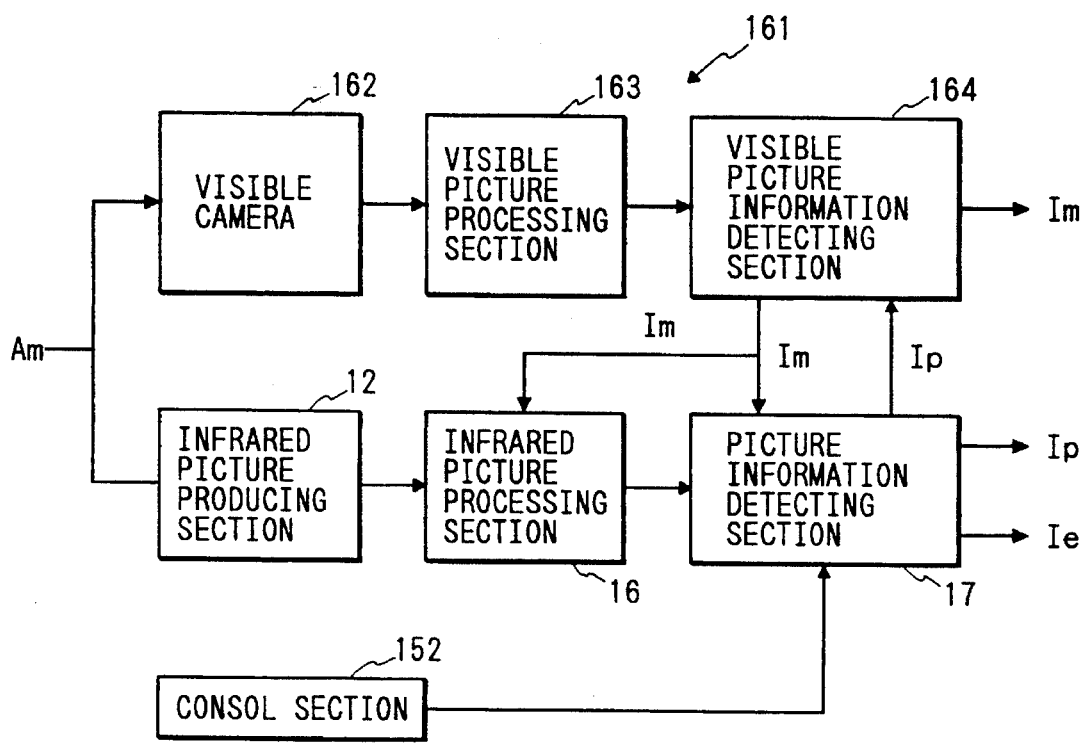
FIG. 37 is a block diagram of a picture processing apparatus according to a third embodiment of the present invention.

FIG. 37 is a block diagram of a picture processing apparatus according to a third embodiment.

As shown in FIG. 37, a picture processing apparatus 161 comprises the infrared picture producing section 12, the picture processing section 16, the picture information detecting section 17, the console section 152, a visible camera 162 for monitoring the measured area Am and producing a visible picture Pv, a visible picture processing section 163 for processing the visible picture produced in the visible camera 162, and a visible picture information detecting section 164 for detecting pieces of moving body information recorded in the visible picture processed in the visible picture processing section 163.

In the above configuration, visible light radiated from the measured area Am is detected in the visible camera 162, and infrared light radiated from the measured area Am is detected in the infrared picture producing section 12. In the visible camera 162, a plurality of visible pictures Pv are produced in series in point of time and are transferred to the visible picture processing section 163. In the section 163, the visible pictures Pv are preliminarily processed, and a series of differential pictures dPv respectively defined as a difference between a pair of visible pictures Pv are produced according to a differential processing. Thereafter, pieces of moving body information Im pertaining to moving bodies recorded on the visible pictures Pv are detected according to the series of differential pictures dPv in the visible picture information detecting section 164. For example, the moving body information Im is composed of the existence of a moving body, the number of moving bodies, positions of moving bodies and the like. Thereafter, the moving body information Im are transferred to the picture processing section 16 and the picture information detecting section 17. In the section 16, one or more human-areas are detected by referring to the number of moving bodies and positions of moving bodies. In the section 17, pieces of personal information are detected by referring to the number of moving bodies, positions of moving bodies and the existence of a moving body. Also, pieces of personal information Ip detected in the section 17 are transferred to the detecting section 164. In the detecting section 164, movements of persons in the measured area Am are detected while referring to the moving body information Im and the personal information Ip.

Operations performed by transferring pieces of various information Ip, Im between the detecting sections 17, 164 are described.

A first example:

Whether or not a moving body detected in the detecting section 164 is a person is judged by referring to a position of person's feet detected in the detecting section 17.

A second example:

Positions of person's feet detected in the detecting section 17 are ascertained by an operator, and the operator writes detecting marks in corresponding positions of a visible picture Pv to easily ascertain persons recorded on the visible picture Pv.

A third example:

In cases where a posture of a person detected in the posture detecting section 27 of the detecting section 17 is a sitting posture, a foot position of the person detected in the detecting section 17 is ascertained by an operator, and the operator writes a detecting mark in a corresponding position of a visible picture Pv to easily ascertain the person recorded on the visible picture Pv.

A fourth example:

In cases where a posture of a person detected in the posture detecting section 27 of the detecting section 17 is a sitting posture, a piece of posture information of the person is included in the personal information Ip to inform the detecting section 164 of the sitting posture of the person. Thereafter, a piece of moving body information Im designating that the person does not move so much is produced in the detecting section 164.

A fifth example:

A foot position of a person and a posture of the person detected in the detecting section 17 are included in the personal information Ip to inform the detecting section 164 of position anti posture of the person. Also, the detecting section 164 is composed of a neural network. Thereafter, the learning operation of the neural network is performed by utilizing the personal information Ip as pieces of teaching data. Therefore, a recognizing processing of the person in the detecting section 164 is improved.

A sixth example:

A position of a person which is included in the moving body information Im detected in the detecting section 164 is transferred to the detecting section 17. Thereafter, the learning operation of a neural network composing the detecting section 17 is performed by utilizing the moving body information Im as pieces of teaching data. Therefore, the function of the neural network is improved.

Next, a monitoring system according to the present invention is described with reference to FIG. 38.

Figure 38:
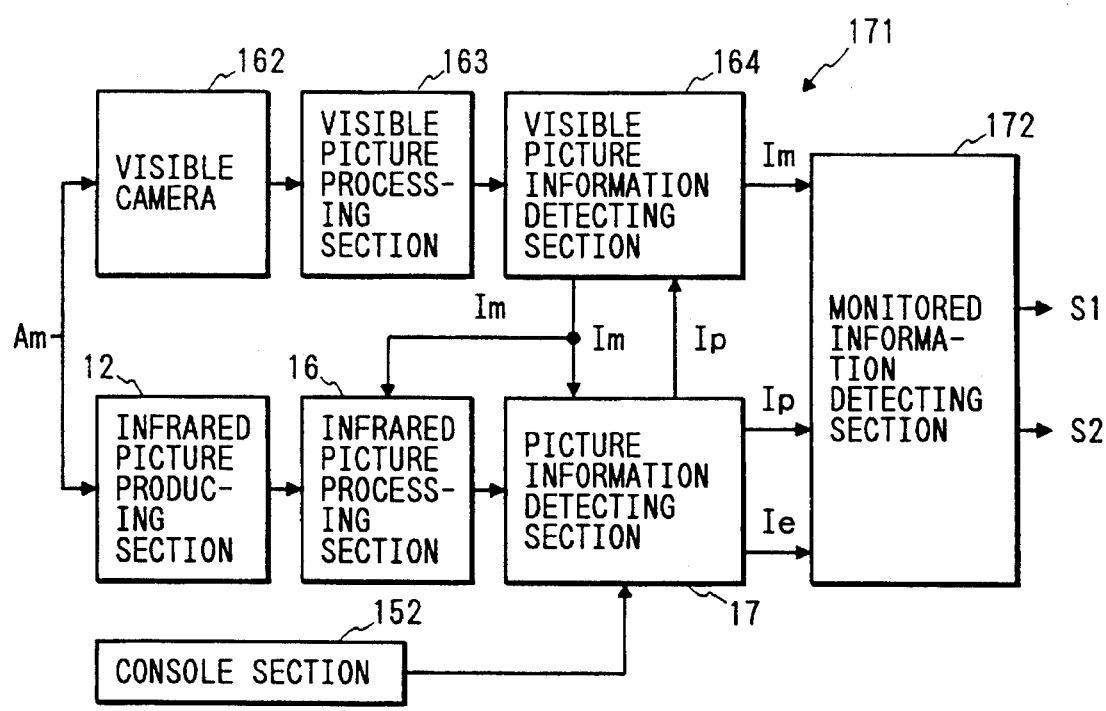
FIG. 38 is a block diagram of a monitorring system according to the present invention.

FIG. 38 is a block diagram of a monitoring system according to the present invention.

As shown in FIG. 38, a monitoring system 171 comprises the infrared picture producing section 12, the picture processing section 16, the picture information detecting section 17, the console section 152, the visible camera 162, the visible picture processing section 163, the visible picture information detecting section 164, and a monitored information detecting section 172 for detecting an uninvited person intruded into the measured area Am according to the moving body information Im detected in the detecting section 164 and the personal information Ip detected in the detecting section 17, detecting unusual conditions such as a fire according to pieces of environmental information Ie detected in the detecting section 17, and outputting an intruder warning signal S1 and an unusual condition detecting signal S2.

In the above configuration, in cases where an uninvited person is unexpectedly intruded into the measured area Am, the uninvited person is detected by the visible camera 162 and the infrared ray sensor 15. Thereafter, a piece of moving body information Im pertaining to the uninvited person is detected in the detecting section 164 and is transferred to the monitored information detecting section 172. Also, a piece of personal information Ip such as a foot position of the uninvited person is detected in the detecting section 17 and is transferred to the monitored information detecting section 172. After a regular time, in cases whore the uninvited person at a sitting posture is detected in the position judging unit 104 of the detecting section 17, a piece of personal information designating the sitting posture of the uninvited person is transferred to the monitored information detecting section 172. Thereafter, in cases where the uninvited person continues sitting for a regular time, an intruder warning signal S1 is output from the detecting section 172.

In cases where a part of the measured area Am is an entrance-forbidden area, an operator inputs a piece of data pertaining to the entrance-forbidden area to the console section 152. Thereafter, in cases where an uninvited person is unexpectedly intruded into the entrance-forbidden area and continues sitting for a regular time, an intruder warning signal S1 is output from the detecting section 172 in the same manner.

Also, in cases where an unusual condition such as a fire occurs in the measured area Am, the unusual condition is detected by the infrared ray sensor 15. Thereafter, a piece of environmental information Ie designating the occurrence of the unusual condition is transferred to the detecting section 172. In the detecting section 172, an unusual condition detecting signal S2 is output.

Accordingly, the monitoring of the measured area Am can be performed in the monitoring system 171 by utilizing a series of infrared pictures Pif and a series of visible pictures Pv.

Next, a personal identification performing apparatus according to the present invention is described with reference to FIG. 39.

Figure 39:
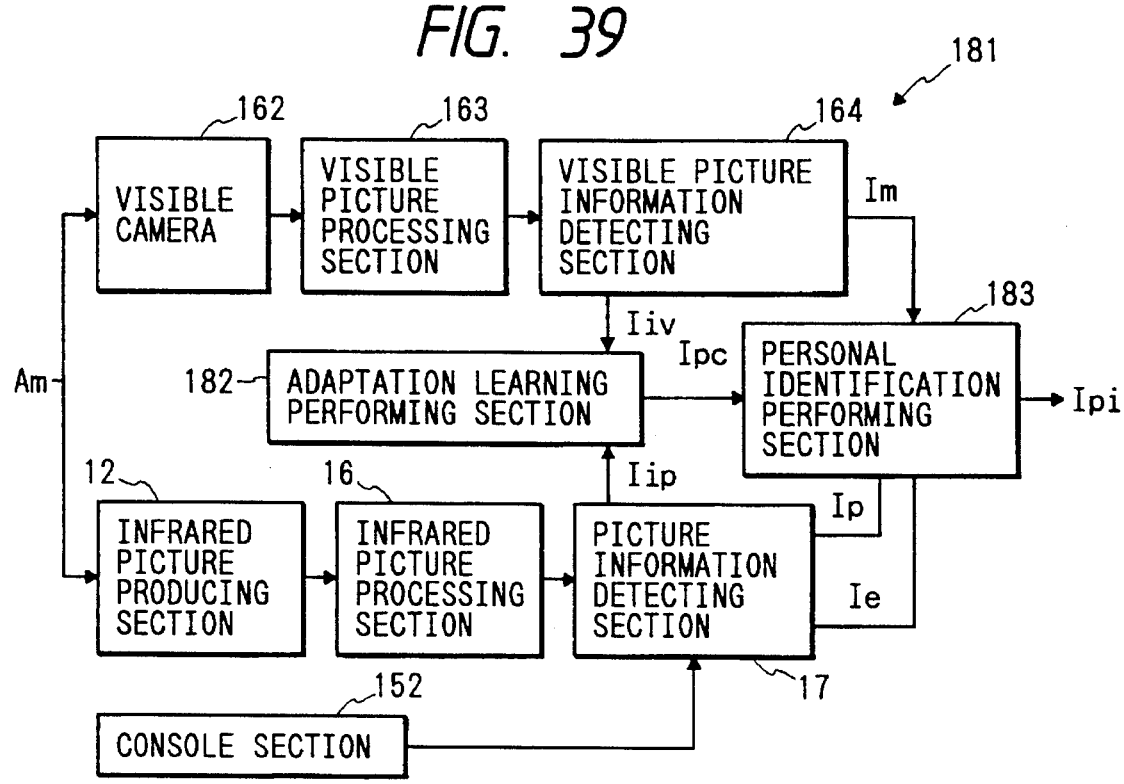
FIG. 39 is a block diagram of a personal identification performing apparatus according to the present invention.

FIG. 39 is a block diagram of a personal identification performing apparatus according to the present invention.

As shown in FIG. 39, a personal identification performing apparatus comprises the infrared picture producing section 12, the picture processing section 16, the picture information detecting section 17, the console section 152, the visible camera 162, the visible picture processing section 163, the visible picture information detecting section 164, an adaptation learning performing section 182 for performing adaptation learning according to pieces of visible personal information Ivp such as clothes colors and physical features of a person detected in the detecting section 164 and pieces of infrared personal information Iip such as a posture and a foot position of the person detected in the detecting section 17 to produce pieces of personal character information Ipc utilized for the identification of the person, and a personal identification performing section 183 for recognizing the person recorded on a visible picture Pv according to a pattern recognition by utilizing the personal character information Ipc obtained in the adapted learning performing section 182 to perform the personal identification of the person and outputting a piece of personal identification information Ipi designating the personal identification of the person.

In the above configuration, in cases where a person staying in the measured area Am is detected by the visible camera 162 and the infrared ray sensor 1S, clothes colors and physical features of the person are detected in the detecting section 184, and a posture and a foot position of the person are detected in the detecting section 17. Thereafter, adaptation learning for identifying the person is performed according to pieces of visible personal information Ivp composed of the clothes colors and the physical features and pieces of infrared personal information Iip composed of the posture and the foot position. Therefore, pieces of personal character information Ipc pertaining to the person are produced and output to the personal identification performing section 183. In the section 183, a pattern recognition of the person recorded on a visible picture Pv is performed according to the personal character information Ipc to identify the person. Therefore, a piece of personal identification information Ipi designating the personal identification of the person is output.

Accordingly, because the personal identification of a person is performed according to the personal character information Ipc pertaining to the clothes colors, the physical features, the posture and the foot position of the person detected by the visual camera 162 and the infrared ray sensor 15, the personal identification can be performed with high accuracy in the personal identification performing apparatus 181.

Also, because the personal identification of a person is performed, the person can be reliably chased.

Next, an integrated picture processing system according to the present invention is described with reference to FIG. 40.

Figure 40:
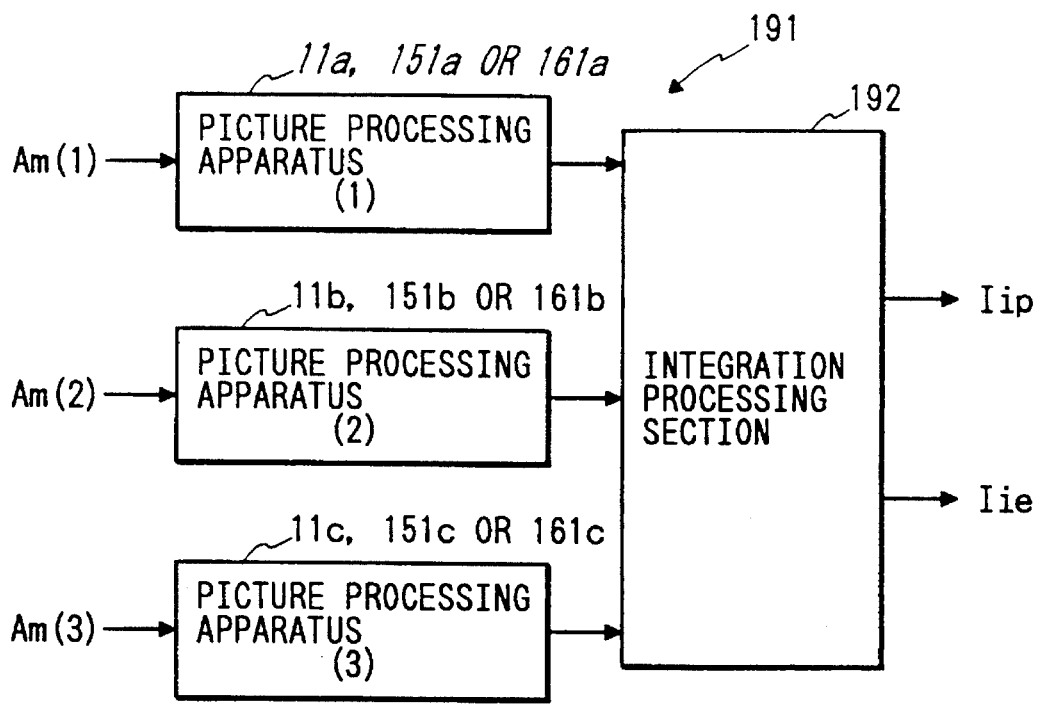
FIG. 40 is a block diagram of an integrated picture processing system according to the present invention.

FIG. 40 is a block diagram of an integrated picture processing system according to the present invention.

As shown in FIG. 40, an integrated picture processing system 191 comprises the picture processing apparatuses 11 (11a, 11b, and 11c), 151 (151a, 151b and 151c) or 161 (161a, 161b and 161c) arranged in parallel for respectively processing an infrared picture Pif and a visible picture Pv recording persons and environments in a different measuring area Am(i) (i=1,2,or 3) or at a different angle, and an integration processing section 192 for processing pieces of personal information Ip(i) and environmental information Ie(i) detected in the picture information detecting sections 17 of the picture processing apparatuses 11, 151, or 161 to integrate in points of time and space the information Ip(i), Ie(i) corresponding to the different measuring areas Am(i) at the different angles into a piece of integrated personal information Iip and a piece of integrated environmental information Iie.

In the above configuration, an infrared picture Pin(i) and a visible picture Pv(i) are produced by observing a measuring area Am(i) or observing the measuring area at a different angle with the visible camera 162 and the infrared ray sensor 15, and the infrared picture Pin(i) and the visible picture Pv(i) are, for example, processed in the picture processing apparatus 161(161a, 161b or 161c). Thereafter, pieces of personal information Ip(i) pertaining to a foot position of a person, a posture of the person and the like and pieces of environmental information Ie(i) are detected in the picture information detecting sections 17 of the picture processing apparatus 161 and are output to the integration processing section 192. In the processing section 192, the personal information Ip(1), Ip(2) and Ip(3) are integrated in points of time and space into a piece of integrated personal information Iip which corresponds to the entire measuring area Am or the entire observing angles. Also, the environmental information Ie(1), Ie(2) and Ie(3) are integrated in points of time and space into a piece of integrated environmental information Iie which corresponds to the entire measuring area Am or the entire observing angles. Hereinafter two examples are described in detail.

A first example:

The measuring area Am is observed in the picture processing apparatuses 151(151a, 151b and 151c) at different angles. In this case, positional relationships among the picture processing apparatuses 151 and observing points of the picture processing apparatuses 151 are preliminarily input to the console sections 152. Thereafter, in cases where two persons overlapped each other at an observing angle are observed in the picture processing apparatus 151a at the same observing angle, the two persons are regarded as a single person, and the personal information Ip(1) designating the detection of the single person is transferred to the integration processing section 192. Also, the two persons are observed in the picture processing apparatuses 151b, 151c and are regarded as two because the two persons are observed at different observing angles. Thereafter, the personal information Ip(2), Ip(3) designating the detection of the two persons are transferred to the integration processing section 192. In the processing section 192, the personal information Ip(1), Ip(2) and Ip(3) are integrated in points of time and space into a piece of integrated personal information Iip designating the detection of the two persons according to the positional relationships and the observing points, and the integrated personal information Iip is output. Accordingly, pieces of information pertaining to the two persons such as positions of person's feet and postures can be accurately detected regardless of a positional relationship between the two persons.

A second example:

The measuring area Am is partitioned into three measuring areas Am(1), Am(2) and Am(3), and the measuring areas Am(i) are observed in the picture processing apparatuses 151(151a, 151b and 151c) in one-to-one correspondence. In this case, positional relationships among the picture processing apparatuses 151 and observing points of the picture processing apparatuses 151 are preliminarily input to the console sections 152. Thereafter, a person staying in the measuring area Am(1) at a first time T1 toes to the measuring area Am(2) at a second time T2. Thereafter, the person moves to the measuring area Am(3) at a third time T3 and stops at a sitting posture. In this case, the movement of the person is integrated in the integration processing section 192 and is output as pieces of integrated personal information Iip produced in series in point of time.

In this embodiment, three picture processing apparatuses are arranged in the integrated picture processing system 191. However, it is applicable that a large number of picture processing apparatuses be arranged.

Next, various applied apparatuses respectively composed of the picture processing apparatus 11, 151 or 161, the monitoring system 171, the personal identification apparatus 181 or the integrated picture processing system 191 are described.

The apparatus described above can be applied as a monitoring apparatus in which the number of pixels in the infrared picture Pif is comparatively low. In cases where a large number of pixels are not required, the picture processing is easy, and a manufacturing cost of the monitoring apparatus is low. In addition, in cases where the infrared picture Pif and the visible picture Pv are utilized, the detecting accuracy of the personal information Ip can be improved.

The apparatus described above can be applied as a nursing apparatus utilized for a medical treatment field or a nursing field. In detail, it is judged in the nursing apparatus whether a sick man is lying on a bed, wakes up, is sitting on the bet, or is sleeping even though a nurse does not stand aside the sick man all day. In addition, the volume of the sick man's clothes, a skin temperature of the sick man can be judged in the nursing apparatus. Also, it is judged in the nursing apparatus whether or not the sick man's blanket is slipped down and whether or not a temperature of the sick man is higher than an ordinary temperature.

Next, a traffic flow control apparatus according to a fourth embodiment of the present invention is described.

A traffic flow is defined as a human flow pertaining to a human carrier such as an elevator or a traffic such as a signal and transportation. In a conventional traffic flow control apparatus, the variation in a cage weight of an elevator is detected to estimate the traffic flow, and the traffic flow is controlled. However, the detection of the number of persons lifted by the elevator is delayed, so that there is a problem that the control of the traffic flow is delayed. In the traffic flow control apparatus according to the present invention, persons waiting for a traffic means is distinguished from pedestrians, and the number of the persons is accurately detected. Thereafter, a traffic flow in the traffic means is controlled according to the detection.

Figure 41:
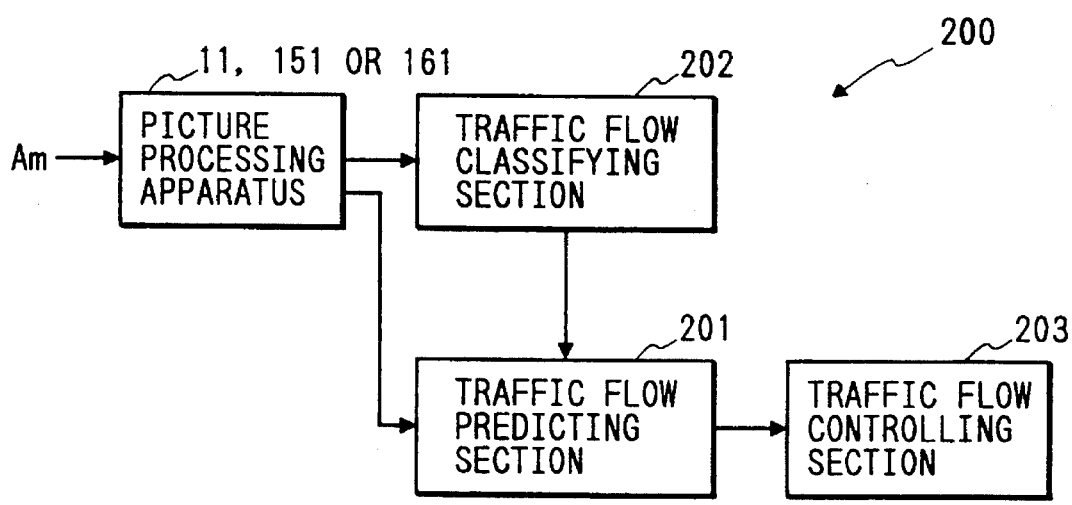
FIG. 41 is a block diagram of a traffic flow control apparatus according to a fourth embodiment of the present invention.

FIG. 41 is a block diagram of a traffic flow control apparatus according to a fourth embodiment of the present invention.

As shown in FIG. 41, a traffic flow control apparatus 200 comprises the picture processing apparatus 11, 151 or 161 for producing pieces of time series data pertaining to the number of persons sequentially detected, a traffic flow classifying section 201 for extracting pieces of character data pertaining to the variation of the number of persons according to the time series data and classifying a traffic flow of the persons detected in the apparatus as a traffic flow pattern, a traffic flow predicting section 202 for predicting the traffic flow of the persons according to the number of persons sequentially detected in the apparatus 11, 151 or 161 and the traffic flow pattern classified in the traffic flow classifying section 201, and a traffic flow controlling section 203 for controlling the traffic flow of the persons according to the traffic flow predicted in the traffic flow predicting section 202.

In the above configuration, the number of persons waiting for a transport means or an elevator in the measuring area Am is detected in the picture processing apparatus 11, 151 or 161, and pieces of time series data pertaining to the number of persons are output. Thereafter, pieces of character data pertaining to the variation of the number of persons are extracted according to the time series data in time traffic flow classifying section 201, and a traffic flow of the persons detected in the apparatus is classified as a traffic flow pattern in the traffic flow classifying section 201. Thereafter, the traffic flow of the persons in the measuring area Am is predicted in the traffic flow predicting section 202 according to the number of persons sequentially detected in the apparatus 11, 151 or 161 and the traffic flow pattern classified in the traffic flow classifying section 201. The traffic flow pattern designates the variation of the number of persons in the measuring area Am, and a rush hour period in which persons crowd in the measuring area Am is indicated by the traffic flow pattern. For example, a rush hour period of the elevator and the number of the floor at which the persons crowd are predicted. Thereafter, the traffic flow of the persons is controlled in the traffic flow controlling section 203 according to the traffic flow predicted. For example, operations of a plurality of elevators are appropriately controlled to reduce the waiting time required for the persons.

Accordingly, the traffic flow of the persons staying in the measured area Am can be appropriately controlled by sequentially detecting the number of persons in the picture processing apparatus 11, 151 or 161.

Having illustrated and described the principles of our invention in a preferred embodiment thereof, it should be readily apparent to those skilled in the art that the invention can be modified in arrangement and detail without departing from such principles. We claim all modifications

What is claimed is:

1. A picture processing apparatus, comprising:

infrared picture producing means for producing an infrared picture designating a heat distribution of a measured area in which one or more persons surrounded by environments stay, the infrared picture being composed of a plurality of pixels having temperatures of the measured area as pixel values;

infrared picture storing means for storing the infrared picture produced by the infrared picture producing means;

partitioned block representative temperature calculating means for partitioning the infrared picture stored in the infrared picture storing means into a plurality of picture blocks and calculating average temperatures of the picture blocks as representative temperatures of the picture blocks;

picking-out temperature determining means for determining a temperature range for each of the picture blocks according to each of the representative temperatures calculated by the partitioned block representative temperature calculating means;

human-area picking out means for picking out one or more human-areas from each of the picture blocks partitioned by the partitioned block representative temperature calculating means on condition that temperatures of pixels in each of the picture blocks are within the temperature range determined by the picking-out temperature determining means, and the persons being placed in the human-areas;

representative point calculating means for calculating a representative point of each of the human-areas picked out by the human-area picking out means;

personal characteristic data extracting means for extracting pieces of personal characteristic data designating characters of the persons from the infrared picture stored in the infrared picture storing means according to the human-areas picked out by the human-area picking out means, the representative points calculated by the representative point calculating means and the environments;

environmental characteristic data extracting means for extracting pieces of environmental characteristic data designating characters of the environments from the infrared picture stored in the infrared picture storing means; and picture information detecting means for detecting pieces of personal information pertaining to the persons or pieces of environmental information pertaining to the environments according to the personal characteristic data extracted by the personal characteristic data extracting means and the environmental characteristic data extracted by the environmental characteristic data extracting means.

2. A picture processing apparatus, comprising infrared picture producing means for producing an infrared picture designating a heat distribution of a measured area in which one or more persons surrounded by environments stay, the infrared picture being composed of a plurality of pixels having temperatures of the measured area as mixed values;

infrared picture storing means for storing the infrared picture produced by the infrared picture producing means;

differential picture producing means for producing a plurality of differential pictures which each are defined as a difference between a pair of infrared pictures stored in the infrared picture storing means, an area of differential pixels in which absolute differential temperatures are larger than a threshold in each of the differential pictures being defined as a moving body area in which a moving body exists;

moving body picture producing means for setting differential temperatures of the differential pixels in the moving body areas of the differential pictures to temperatures of pixels of the infrared pictures corresponding to the differential pixels to produce a moving body picture from each of the differential pictures produced by the differential picture producing means, temperatures of pixels in each of the moving body pictures being not larger than the threshold at an area other than the moving body area;

frequency distribution producing means for producing a frequency distribution of temperatures of the pixels of the moving body pictures produced by the moving body picture producing means, frequencies of the temperatures being distributed in positions of the pixels;

picking-out temperature determining means for determining a temperature range to pick out one or more human-areas from a moving body picture produced by the moving body picture producing means according to the frequency distribution produced by the frequency distribution producing means, temperatures of pixels in the moving body area of the moving body picture being within the temperature range;

human-area picking out means for picking out one or more human-areas from the moving body picture produced by the moving body picture producing means on condition that temperatures of pixels in the moving body picture are within the temperature range determined by the picking-out temperature determining means, the persons being placed in the human-areas;

representative point calculating means for calculating a representative point of each of the human-areas picked out the human-area picking out means;

personal characteristic data extracting means for extracting pieces of personal characteristic data designating characters of the persons from the infrared picture stored in the infrared picture storing means according to the human-areas picked out by the human-area picking out means, the representative points calculated by the representative point calculating means and the environments;

environmental characteristic data extracting means for extracting pieces of environmental characteristic data designating characters of the environments from the infrared picture stored in the infrared picture storing means; and picture information detecting means for detecting pieces of personal information pertaining to the persons or pieces of environmental information pertaining to the environments according to the personal characteristic data extracted by the personal characteristic data extracting means and the environmental characteristic data extracted by the environmental characteristic data extracting means.

3. A picture processing apparatus, comprising infrared picture producing means for producing an infrared picture designating a heat distribution of a measured area in which one or more persons surrounded by environments stay, the infrared picture being composed of a plurality of pixels having temperatures of the measured area as mixed values;

infrared picture storing means for storing the infrared picture produced by the infrared picture producing means;

human-area detecting means for detecting one or more human-areas and representative points of the human-areas from the infrared picture stored by the infrared picture storing means, temperatures of pixels in the human-areas being within a temperature range which depends on a temperature distribution of the measured area, and the persons being placed in the human-areas;

pixel number calculating means for calculating the number of pixels of each of the human-areas detected by the human-area detecting means;

human-area shape recognizing means for recognizing a shape of each of the human-areas detected by the human-area detecting means; and person number detecting means composed of a neural network or a pattern recognizing system for detecting the number of persons in each of the human-areas detected by the human-area detecting means according to the number of pixels calculated by the pixel number calculating means, the representative point of each of the human-areas detected by the human-area detecting means and the shape of each of the human-areas recognized by the human-area shape recognizing means, inside conditions of the neural network or the pattern recognizing system being preliminarily adjusted by inputting pieces of tentative data designating the number of pixels of a tentative area, a representative point of the tentative area and a shape of the tentative area and a piece of teaching data designating the number of persons in the tentative area.

4. An apparatus according to claim 3, the picture processing apparatus further comprising:

human-area number calculating means for calculating the number of human-areas detected by the human-area detecting means.

5. A picture processing apparatus, comprising infrared picture producing means for producing an infrared picture designating a heat distribution of a measured area in which one or more persons surrounded by environments stay, the infrared picture being composed of a plurality of pixels having temperatures of the measured area as pixel values;

infrared picture storing means for storing the infrared picture produced by the infrared picture producing means;

human-area detecting means for detecting one or more human-areas and representative points of the human-areas from the infrared picture stored by the infrared picture storing means, temperatures of pixels in the human-areas being within a temperature range which depends on a temperature distribution of the measured area, and the persons being placed in the human-areas;

temperature extracting means for selecting a representative longitudinal row, in which a representative pixel placed in a lowest level of each of the human-areas detected by the human-area detecting means is included, from longitudinal rows of each of the human-areas and extracting temperatures of pixels existing in the representative longitudinal row; and foot position detecting means composed of a neural network or a pattern recognizing system for detecting a foot position of a person in each of the human-areas detected by the human-area detecting means according to the temperatures of the pixels extracted by the temperature extracting means, the representative point of each of the human-areas and temperatures of peripheral pixels surrounding the representative pixel of each of the human-areas, inside conditions of the neural network or the pattern recognizing system being preliminarily adjusted by inputting pieces of tentative data designating temperatures of tentative pixels and temperatures of peripheral tentative pixels surrounding a pixel placed at a lowest level in the tentative pixels and a piece of teaching data designating a tentative foot position.

6. A picture processing apparatus, comprising infrared picture producing means for producing an infrared picture designating a heat distribution of a measured area in which one or more persons surrounded by environments stay, the infrared picture being composed of a plurality of pixels having temperatures of the measured area as pixel values;

infrared picture storing means for storing the infrared picture produced by the infrared picture producing means;

human-area detecting means for detecting one or more human-areas and representative points of the human-areas from the infrared picture stored by the infrared picture storing means, temperatures of pixels in the human-areas being within a temperature range which depends on a temperature distribution of the measured area, and the persons being placed in the human-areas;

longitudinal side pixel number detecting means for extracting a rectangular pixel-block, which is set to a minimum size on condition that one of the human-areas detected by the human-area detecting means is included in the rectangular pixel-block, from the infrared picture stored in the infrared picture storing means and detecting the number of pixels at a longitudinal side of the rectangular pixel-block;

lateral side pixel number detecting means for extracting the rectangular pixel-block and detecting the number of pixels at a lateral side of the rectangular pixel-block;

block converting means for converting the rectangular pixel-block extracted by the longitudinal side pixel number detecting means into a standardized square pixel-block composed of a plurality of converted pixels; and posture estimating means composed of a neural network or a pattern recognizing system for estimating a posture of a person in the human-area according to the number of pixels detected by the longitudinal side pixel number detecting means, the number of pixels detected by the lateral side pixel number detecting means and temperatures of converted pixels placed in the standardized square pixel-block, inside conditions of the neural network or the pattern recognizing system being preliminarily adjusted by inputting pieces of tentative data designating the number of tentative pixels in the longitudinal direction, the number of tentative pixels in the lateral direction and temperatures of tentative converted pixels in a square pixel-block and a piece of teaching data designating a tentative posture.

7. A picture processing apparatus, comprising infrared picture producing means for producing an infrared picture designating a heat distribution of a measured area in which one or more persons surrounded by environments stay, the infrared picture being composed of a plurality of pixels having temperatures of the measured area as pixel values;

infrared picture storing means for storing the infrared picture produced by the infrared picture producing means;

human-area detecting means for detecting one or more human-areas and representative points of the human-areas from the infrared picture stored by the infrared picture storing means, temperatures of pixels in the human-areas being within a temperature range which depends on a temperature distribution of the measured area, and the persons being placed in the human-areas;

personal characteristic data extracting means for extracting pieces of first personal characteristic data designating temperatures of pixels in each of the human-areas from the infrared picture stored in the infrared picture storing means and pieces of second personal characteristic data designating temperatures of pixels placed in a central longitudinal row of each of the human-areas from the infrared picture stored in the infrared picture storing means;

environmental characteristic data extracting means for extracting pieces of environmental characteristic data designating characters of the environments from the infrared picture stored in the infrared picture storing means;

posture judging means for detecting a posture of a person in a human-area detected by the human-area detecting means according to the first personal characteristic data extracted by the personal characteristic data extracting means and outputting a first possibility that the person is in a sitting posture and a second possibility that the person is in a standing posture;

first position judging means for judging a first foot position of the person who is in a sitting posture according to the second personal character data extracted by the personal characteristic data extracting means;

second position judging means for judging a second foot position of the person who is in a standing posture according to the second personal characteristic data and the environmental characteristic data extracted by the environmental characteristic data extracting means; and foot position estimating means for estimating a foot position of the person according to the first and second possibilities obtained by the posture judging means, the first foot position judged by the first position judging means and the second foot position judged by the second position judging means regardless of whether the person is in a sitting or standing posture.

8. A picture processing apparatus, comprising infrared picture producing means for producing an infrared picture designating a heat distribution of a measured area in which one or more persons surrounded by environments stay, the infrared picture being composed of a plurality of pixels having temperatures of the measured area as pixel values;

infrared picture storing means for storing the infrared picture produced by the infrared picture producing means;

human-area detecting means for detecting one or more human-areas and representative points of the human-areas from the infrared picture stored by the infrared picture storing means, temperatures of pixels in the human-areas being within a temperature range which depends on a temperature distribution of the measured area, and the persons being placed in the human-areas personal characteristic data extracting means for extracting pieces of personal characteristic data designating characters of the persons from the infrared picture stored in the infrared picture storing means according to the human-areas picked out by the human-area picking out means, the representative points calculated by the representative point calculating means and the environments;

posture detecting means for detecting a posture of a person in each of the human-areas detected by the human-area detecting means according to the personal characteristic data extracted by the personal characteristic data extracting means;

human-area partitioning means for standardizing a size of each of the human-areas to a standardized size and partitioning each of the human-areas standardized into a plurality of human blocks according to a partitioning standard pattern determined in dependence on the posture of the person detected by the posture detecting means to partition the person into a plurality of body portions;

human block temperature calculating means for calculating an average temperature of each of the human blocks partitioned by the human-area partitioning means; and temperature comparing means for comparing the average temperatures calculated by the human block temperature calculating means with a threshold temperature to separate a higher temperature part of the human blocks corresponding to uncovered body portions from a lower temperature part of the human blocks corresponding to covered body portions and detecting a highest average temperature of a human block as a skin temperature of the person from among the average temperatures in the higher temperature part of the human blocks.

9. An apparatus according to claim 8, the picture processing apparatus further comprising:

covered body area ratio calculating means for calculating an area ratio of the human blocks corresponding to the uncovered body portions to the human blocks corresponding to the covered body portions separated by the temperature comparing means;

cloth thickness estimating means for estimating a thickness of person's clothes according to a difference in temperature between a group of human blocks corresponding to the uncovered body portions and a group of human blocks corresponding to the covered body portions separated by the temperature comparing means; and cloth volume estimating means for estimating a cloth volume of the person according to the area ratio calculated by the covered body area ratio calculating means and the thickness of person's clothes estimated by the cloth thickness estimating means.

10. A picture processing apparatus, comprising infrared picture producing means for producing an infrared picture designating a heat distribution of a measured area in which one or more persons surrounded by environments stay, the infrared picture being composed of a plurality of pixels having temperatures of the measured area as pixel values;

infrared picture storing means for storing the infrared picture produced by the infrared picture producing means;

human-area detecting means for detecting one or more human-areas and representative points of the human-areas from the infrared picture stored by the infrared picture storing means, temperatures of pixels in the human-areas being within a temperature range which depends on a temperature distribution of the measured area, and the persons being placed in the human-areas;

personal characteristic data extracting means for extracting pieces of personal characteristic data designating characters of the persons from the infrared picture stored in the infrared picture storing means according to the human-areas, the representative points detected by the human-area detecting means and the environments;

foot position detecting means for detecting a foot position of a person in a human-area detected by the human-area detecting means according to the personal characteristic data extracted by the personal characteristic data extracting means; and surrounding temperature detecting means for detecting a surrounding temperature in dependence on temperatures of neighboring pixels placed in the neighborhood of the foot position of the person detected by the foot position detecting means according to the infrared picture stored in the infrared picture storing means;

environmental temperature detecting means for detecting an average temperature of each of environmental blocks defined by partitioning the measured area according to the infrared picture stored in the infrared picture storing means; and heat radiation detecting means for detecting a degree of heat radiation directed from the neighboring pixels and the environmental blocks to the person according to the surrounding temperature detected by the surrounding temperature detecting means and the average temperatures of the environmental blocks detected by the environmental temperature detecting means and outputting the degree of heat radiation.

11. An apparatus according to claim 10 in which the surrounding temperature detecting means comprises:

neighboring pixel specifying means for specifying a plurality of pixels nearest to the foot position of the person as the neighboring pixels; and surrounding temperature calculating means composed of a neural network for calculating the surrounding temperature according to the temperatures of the neighboring pixels, inside conditions of the neural network being preliminarily adjusted by inputting pieces of tentative data designating tentative temperatures and a piece of teaching data designating a tentative surrounding temperature.

12. An apparatus according to claim 10, the picture processing apparatus further comprising:

auxiliary heater detecting means for detecting an auxiliary heater, of which a temperature is higher than a temperature of the person, according to the infrared picture stored in the infrared picture storing means; and floor heater detecting means for detecting a floor heater having a rectangular shape and a size larger than that of the person according to the infrared picture stored in the infrared picture storing means.

13. A picture processing apparatus, comprising infrared picture producing means for producing an infrared picture designating a heat distribution of a measured area in which one or more persons surrounded by environments stay, the infrared picture being composed of a plurality of pixels having temperatures of the measured area as pixel values;

infrared picture storing means for storing the infrared picture produced by the infrared picture producing means;

human-area detecting means for detecting one or more human-areas and representative points of the human-areas from the infrared picture stored in the infrared picture storing means, temperatures of pixels in the human-areas being within a temperature range which depends on a temperature distribution of the measured area, and the persons being placed in the human-areas;

human-area correcting means for correcting a plurality of human-areas erroneously divided by the human-area detecting means by unifying the human-areas to a unified human-area;

static body detecting means for accumulating the representative points of the human-areas detected by the human-area detecting means to find out a group of pixels pertaining to a static body erroneously picked out as a human-area and detect representative points of the environments;

environmental block judging means for judging a moving area in which one or more persons move around to recognize the environments relative to the moving area according to the representative points of the environments detected by the static body detecting means and the infrared picture stored in the infrared picture storing means;

personal characteristic data extracting means for extracting pieces of personal characteristic data designating characters of the persons from the infrared picture stored in the infrared picture storing means according to the human-areas correctly detected by the human-area detecting means, the unified human-area unified by the human-area correcting means, the representative points detected by the human-area detecting means and the environments;

environmental characteristic data extracting means for extracting pieces of environmental characteristic data designating characters of the environments from the infrared picture stored in the infrared picture storing means according to the human-areas detected by the human-area detecting means and the environments recognized by the environmental block judging means; and picture information detecting means for detecting pieces of personal information pertaining to the persons or pieces of environmental information pertaining to the environments according to the personal characteristic data extracted by the personal characteristic data extracting means and the environmental characteristic data extracted by the environmental characteristic data extracting means.

14. An apparatus according to claim 13 in which the human-area correcting means comprises:

adjacent pixel confirming means for confirming whether or not pixels in the human-areas detected by the human-area detecting means are adjacent to each other and outputting a piece of connecting information designating a result of the confirmation for each of the pixels;

isolated pixel detecting means for detecting one or more isolated pixels which each are not adjacent to any pixel of the human-areas according to the connecting information output from the adjacent pixel confirming means and outputting a piece of isolated pixel information designating each of the isolated pixels for each of the isolated pixels; and human-area unifying means for confirming whether or not each of the isolated pixels detected by the isolated pixel detecting means faces an associated pixel of a human-area at one-pixel space and unifying a human-area of an isolated pixel facing an associated pixel and another human-area of the associated pixel to form a unified human-area.

15. An apparatus according to claim 13 in which the static body detecting means:

representative point accumulating means for accumulating a plurality of representative points of the human-areas detected from a series of infrared pictures in the human-area detecting means to store a frequency of the representative points for each of pixels and outputting the frequencies and pieces of positional information designating positions of the representative points;

static body detecting means for detecting a static body distinguished from a moving body according to the frequencies output from the representative point accumulating means;

pixel position storing means for storing a pixel position of the static body detected in the static body detecting means according to a piece of positional information relating to the moving body;

processed data accumulating means for accumulating pieces of processed data obtained by processing the representative points accumulated in the representative point accumulating means; and environment position detecting means for detecting positions of the environments according to the processed data accumulated in the processed data accumulating means.

16. A picture processing apparatus, comprising infrared picture producing means for producing an infrared picture designating a heat distribution of a measured area in which one or more persons surrounded by environments stay, the infrared picture being composed of a plurality of pixels having temperatures of the measured area as pixel values;

infrared picture storing means for storing the infrared picture produced by the infrared picture producing means;

human-area detecting means for detecting one or more human-areas and representative points of the human-areas from the infrared picture stored by the infrared picture storing means, temperatures of pixels in the human-areas being within a temperature range which depends on a temperature distribution of the measured area, and the persons being placed in the human-areas;

person number detecting means for detecting the number of persons in each of the human-areas detected by the human-area detecting means according to the infrared picture stored in the infrared picture storing means and the representative points of the human-areas obtained by the human-area detecting means;

foot position detecting means for detecting a position of person's feet for each of the persons in the human-areas according to the number of persons detected by the person number detecting means and the infrared picture stored in the infrared picture storing means;

posture detecting means for detecting a posture of each of the persons in each of the human-areas detected by the human-area detecting means according to the infrared picture stored in the infrared picture storing means, the positions of the person's feet detected by the foot position detecting means and the number of persons detected by the person number detecting means;

skin temperature detecting means for detecting a skin temperature of each of the persons in each of the human-areas detected by the human-area detecting means according to the infrared picture stored in the infrared picture storing means, the postures of the persons detected by the posture detecting means and the number of persons detected by the person number detecting means; and cloth volume detecting means for detecting a volume of person's clothes for each of the persons in the human-areas according to the skin temperature detected by the skin temperature detecting means.

17. A picture processing apparatus, comprising infrared picture producing means for producing an infrared picture designating a heat distribution of a measured area in which one or more persons surrounded by environments stay, the infrared picture being composed of a plurality of pixels having temperatures of the measured area as pixel values;

infrared picture processing means for processing the infrared picture produced by the infrared picture producing means to extract pieces of personal characteristic data designating characters of the persons and pieces of environmental characteristic data designating characters of the environments from the infrared picture;

picture information detecting means for detecting pieces of personal information pertaining to the persons or pieces of environmental information pertaining to the environments according to the personal characteristic data and the environmental characteristic data processed by the infrared picture processing means; and console means for inputting pieces of environmental information which are not detected from the infrared picture produced by the infrared picture producing means to correct the personal information detected by the picture information detecting means.

18. A picture processing apparatus, comprising:

infrared picture producing means for producing an infrared picture designating a heat distribution of a measured area in which one or more persons surrounded by environments stay, the infrared picture being composed of a plurality of pixels having temperatures of the measured area as pixel values;

infrared picture processing means for processing the infrared picture produced by the infrared picture producing means to extract pieces of personal characteristic data designating characters of the persons and pieces of environmental characteristic data designating characters of the environments from the infrared picture;

picture information detecting means for detecting pieces of personal information pertaining to the persons or pieces of environmental information pertaining to the environments according to the personal characteristic data and the environmental characteristic data processed by the infrared picture processing means;

visible picture producing means for producing a visible picture of the measured area;

visible picture processing means for processing the visible picture produced by the visible picture producing means to extract pieces of visible personal characteristic data designating visible characters of the persons and pieces of visible environmental characteristic data designating visible characters of the environments from the visible picture; and visible picture information detecting means for detecting pieces of visible personal information pertaining to the persons according to the visible personal characteristic data and the visible environmental characteristic data processed by the visible picture processing means and the personal characteristic data and the environmental characteristic data processed by the infrared picture processing means and correcting the personal characteristic data and the environmental characteristic data extracted by the infrared picture processing means and the personal or environmental information detected by the picture information detecting means according to the visible personal information.

19. An apparatus according to claim 18, further including console means for inputting pieces of environmental information which are not detected from the infrared picture produced by the infrared picture producing means to correct the personal information detected by the picture information detecting means.

20. An apparatus according to claim 18 in which pieces of moving information designating movements of the persons are extracted by the visible picture information detecting means.

21. A monitoring system, comprising:

infrared picture producing means for producing an infrared picture designating a heat distribution of a measured area in which one or more persons surrounded by environments stay, the infrared picture being composed of a plurality of pixels having temperatures of the measured area as pixel values;

infrared picture processing means for processing the infrared picture produced by the infrared picture producing means to extract pieces of personal characteristic data designating characters of the persons and pieces of environmental characteristic data designating characters of the environments from the infrared picture;

picture information detecting means for detecting pieces of personal information pertaining to the persons or pieces of environmental information pertaining to the environments according to the personal characteristic data and the environmental characteristic data processed by the infrared picture processing means;

visible picture producing means for producing a visible picture of the measured area;

visible picture processing means for processing the visible picture produced by the visible picture producing means to extract pieces of visible personal characteristic data designating visible characters of the persons and pieces of visible environmental characteristic data designating visible characters of the environments from the visible picture;

visible picture information detecting means for detecting pieces of visible personal information pertaining to the persons according to the visible personal characteristic data and the visible environmental characteristic data processed by the visible picture processing means and the personal characteristic data and the environmental characteristic data processed by the infrared picture processing means and correcting the personal characteristic data and the environmental characteristic data extracted by the infrared picture processing means and the personal or environmental information detected by the picture information detecting means according to the visible personal information; and monitored information detecting means for detecting an uninvited person intruded into the measured area according to the visible personal information detected by the visible picture information detecting means.

22. A monitoring system according to claim 21, further including console means for inputting pieces of environmental information which are not detected from the infrared picture produced by the infrared picture producing means to correct the personal information detected by the picture information detecting means.

23. A personal identification performing apparatus comprises:

infrared picture producing means for producing an infrared picture designating a heat distribution of a measured area in which one or more persons surrounded by environments stay, the infrared picture being composed of a plurality of pixels having temperatures of the measured area as pixel values;

infrared picture processing means for processing the infrared picture produced by the infrared picture producing means to extract pieces of personal characteristic data designating characters of the persons and pieces of environmental characteristic data designating characters of the environments from the infrared picture;

picture information detecting means for detecting pieces of personal information pertaining to the persons or pieces of environmental information pertaining to the environments according to the personal characteristic data and the environmental characteristic data processed by the infrared picture processing means;

visible picture producing means for producing a visible picture of the measured area;

visible picture processing means for processing the visible picture produced by the visible picture producing means to extract pieces of visible personal characteristic data designating visible characters of the persons and pieces of visible environmental characteristic data designating visible characters of the environments from the visible picture;

visible picture information detecting means for detecting pieces of visible personal information pertaining to the persons according to the visible personal characteristic data and the visible environmental characteristic data processed by the visible picture processing means and the personal characteristic data and the environmental characteristic data processed by the infrared picture processing means and correcting the personal characteristic data and the environmental characteristic data extracted by the infrared picture processing means and the personal or environmental information detected by the picture information detecting means according to the visible personal information;

adaptation learning performing means for performing adaptation learning according to the personal information detected by the picture information detecting means and the visible personal information detected by the visible picture information detecting means; and personal identification performing means for recognizing the persons recorded on the visible picture according to the adaptation learning performed by the adaptation learning performing means and identifying the persons.

24. An integrated picture processing system, comprises:

a plurality of picture processing apparatuses arranged in parallel, each of the apparatuses comprising:

infrared picture producing means for producing an infrared picture designating a heat distribution of a measured area in which one or more persons surrounded by environments stay, the infrared picture being composed of a plurality of pixels having temperatures of the measured area as pixel values;

infrared picture processing means for processing the infrared picture produced by the infrared picture producing means to extract pieces of personal characteristic data designating characters of the persons and pieces of environmental characteristic data designating characters of the environments from the infrared picture;

picture information detecting means for detecting pieces of personal information pertaining to the persons or pieces of environmental information pertaining to the environments according to the personal characteristic data and the environmental characteristic data processed by the infrared picture processing means, and integration processing means for processing the personal information or the environmental information detected by the picture information detecting means of the picture processing apparatuses to integrate in points of time and space the personal information or the environmental information.

25. An integrated picture processing system, comprises:

a plurality of picture processing apparatuses arranged in parallel, each of the apparatuses comprising:

infrared picture producing means for producing an infrared picture designating a heat distribution of a measured area in which one or more persons surrounded by environments stay, the infrared picture being composed of a plurality of pixels having temperatures of the measured area as pixel values;

infrared picture processing means for processing the infrared picture produced by the infrared picture producing means to extract pieces of personal characteristic data designating characters of the persons and pieces of environmental characteristic data designating characters of the environments from the infrared picture;

picture information detecting means for detecting pieces of personal information pertaining to the persons or pieces of environmental information pertaining to the environments according to the personal characteristic data and the environmental characteristic data processed by the infrared picture processing means;

visible picture producing means for producing a visible picture of the measured area;

visible picture processing means for processing the visible picture produced by the visible picture producing means to extract pieces of visible personal characteristic data designating visible characters of the persons and pieces of visible environmental characteristic data designating visible characters of the environments from the visible picture;

visible picture information detecting means for detecting pieces of visible personal information pertaining to the persons according to the visible personal characteristic data and the visible environmental characteristic data processed by the visible picture processing means and the personal characteristic data and the environmental characteristic data processed by the infrared picture processing means and correcting the personal characteristic data and the environmental characteristic data extracted by the infrared picture processing means and the personal or environmental information detected by the picture information detecting means according to the visible personal information, and integration processing means for processing the personal information or the environmental information detected by the picture information detecting means and the visible picture information detecting means of the picture processing apparatuses to integrate in points of time and space the personal information or the environmental information.

26. A traffic flow control apparatus, comprises:

infrared picture producing means for sequentially producing a plurality of infrared pictures respectively designating a heat distribution of a measured area in which one or more persons surrounded by environments stay, each of the infrared pictures being composed of a plurality of pixels having temperatures of the measured area as pixel values;

infrared picture processing means for sequentially processing the infrared pictures produced by the infrared picture producing means to extract pieces of personal characteristic data designating characters of the persons and pieces of environmental characteristic data designating characters of the environments from the infrared pictures;

picture information detecting means for detecting pieces of time series data respectively designating the number of persons according to the personal characteristic data and the environmental characteristic data processed by the infrared picture processing means;

traffic flow classifying means for extracting pieces of character data pertaining to the variation of the number of persons recorded on the infrared pictures according to the time series data detected by the picture information detecting means and classifying a traffic flow of the persons as a traffic flow pattern;

traffic flow predicting means for predicting the traffic flow of the persons according to the time series data detected by the picture information detecting means and the traffic flow pattern classified by the traffic flow classifying means; and traffic flow controlling means for controlling the traffic flow of the persons according to the traffic flow predicted by the traffic flow predicting means.

27. A traffic flow control apparatus, comprises:

infrared picture producing means for sequentially producing a plurality of infrared pictures respectively designating a heat distribution of a measured area in which one or more persons surrounded by environments stay, each of the infrared pictures being composed of a plurality of pixels having temperatures of the measured area as pixel values;

infrared picture processing means for sequentially processing the infrared pictures produced by the infrared picture producing means to extract pieces of personal characteristic data designating characters of the persons and pieces of environmental characteristic data designating characters of the environments from the infrared pictures;

picture information detecting means for detecting pieces of time series data respectively designating the number of persons according to the personal characteristic data and the environmental characteristic data processed by the infrared picture processing means;

visible picture producing means for sequentially producing a plurality of visible pictures of the measured area;

visible picture processing means for sequentially processing the visible pictures produced by the visible picture producing means to extract pieces of visible personal characteristic data designating visible characters of the persons and pieces of visible environmental characteristic data designating visible characters of the environments from the visible pictures;

visible picture information detecting means for detecting pieces of visible time series data respectively designating the number of persons according to the visible personal characteristic data and the visible environmental characteristic data processed by the visible picture processing means and the personal characteristic data and the environmental characteristic data processed by the infrared picture processing means and correcting the personal characteristic data and the environmental characteristic data extracted by the infrared picture processing means and the personal or environmental information detected by the picture information detecting means according to the visible personal information;

traffic flow classifying means for extracting pieces of character data pertaining to the variation of the number of persons recorded on the infrared pictures according to the time series data detected by the picture information detecting means and the visible time series data detected by the visible picture information detecting means and classifying a traffic flow of the persons as a traffic flow pattern;

traffic flow predicting means for predicting the traffic flow of the persons according to the time series data detected by the picture information detecting means, the visible time series data detected by the visible picture information detecting means and the traffic flow pattern classified in the traffic flow classifying means; and traffic flow controlling means for controlling the traffic flow of the persons according to the traffic flow predicted by the traffic flow predicting means.

\* \* \* \* \*